(12) United States Patent
Sugimoto

(10) Patent No.: US 10,353,070 B2
(45) Date of Patent: Jul. 16, 2019

(54) DISTANCE MEASUREMENT DEVICE, DISTANCE MEASUREMENT METHOD, AND DISTANCE MEASUREMENT PROGRAM

(71) Applicant: FUJIFILM CORPORATION, Minato-ku, Tokyo (JP)

(72) Inventor: Masahiko Sugimoto, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/921,659

(22) Filed: Mar. 15, 2018

(65) Prior Publication Data

US 2018/0246213 A1 Aug. 30, 2018

Related U.S. Application Data

(63) Continuation of application No. PCT/JP2016/063584, filed on May 2, 2016.

(30) Foreign Application Priority Data

Sep. 28, 2015 (JP) .................................. 2015-190355

(51) Int. Cl.
*G01S 17/42* (2006.01)
*G06T 7/62* (2017.01)
(Continued)

(52) U.S. Cl.
CPC ............ *G01S 17/42* (2013.01); *G01S 7/4817* (2013.01); *G01S 17/87* (2013.01); *G01S 17/89* (2013.01);
(Continued)

(58) Field of Classification Search
CPC ...................................................... G01S 17/42
See application file for complete search history.

(56) References Cited

U.S. PATENT DOCUMENTS 5,761,549 A * 6/1998 Utagawa .................. G02B 7/32
396/109
6,144,443 A * 11/2000 Ide ......................... G01B 11/16
356/30
(Continued)

FOREIGN PATENT DOCUMENTS

JP 2004-205222 A 7/2004
JP 2008-166482 A 7/2008
(Continued)

OTHER PUBLICATIONS

International Search Report issued in International Application No. PCT/JP2016/063584 dated Jul. 19, 2016.
(Continued)

*Primary Examiner* — James M Pontius
(74) *Attorney, Agent, or Firm* — SOLARIS Intellectual Property Group, PLLC

(57) ABSTRACT

A distance measurement device includes an imaging unit, a measurement unit that measures a plurality of distances to the subject by emitting a plurality of directional light rays the subject and receiving reflection light rays, a control unit that controls the imaging unit to image the subject in an angle of view which includes irradiation positions of the directional light rays used in the measurement of the plurality of distances onto the subject, and a deriving unit that derives a dimension of a real-space region corresponding to an interval between a plurality of pixels associated with the in-image irradiation positions based on distances which are related to in-image irradiation positions derived as positions corresponding to the irradiation positions within a captured image acquired through imaging, among the plurality of measured distances, the interval for each distance within the captured image, and a focal length of the imaging unit.

15 Claims, 38 Drawing Sheets

(51) Int. Cl.
  *G06T 7/521* (2017.01)
  *G01S 7/481* (2006.01)
  *G01S 17/89* (2006.01)
  *H04N 5/232* (2006.01)
  *G01S 17/87* (2006.01)

(52) U.S. Cl.
  CPC ............. *G06T 7/521* (2017.01); *G06T 7/62* (2017.01); *H04N 5/23245* (2013.01); *H04N 5/23296* (2013.01); *H04N 5/232933* (2018.08); *G06T 2207/10028* (2013.01); *G06T 2207/10152* (2013.01)

(56) References Cited

U.S. PATENT DOCUMENTS

2010/0061623 A1*  3/2010  Yokoi .................... G01B 11/25
                                                      382/154
2011/0249117 A1   10/2011  Yoshihama et al.
2012/0224164 A1*  9/2012  Hayashi ............... G01C 15/002
                                                      356/3
2015/0268180 A1*  9/2015  Hirose ................. G01N 23/223
                                                      378/44

FOREIGN PATENT DOCUMENTS

JP    2011-232330 A    11/2011
JP    2013-108789 A     6/2013
JP    2014-232095 A    12/2014

OTHER PUBLICATIONS

Written Opinion of the ISA issued in International Application No. PCT/JP2016/063584 dated Jul. 19, 2016.
International Preliminary Report on Patentability issued in International Application No. PCT/JP2016/063584 dated Dec. 1, 2016.

* cited by examiner

LASER BEAM

| INDIVIDUAL DISTANCE MEASUREMENT UNIT (DIRECTION) | POSITION AND DISTANCE CORRESPONDENCE INFORMATION ||
|---|---|---|
| | IN-PROVISIONAL-IMAGE IRRADIATION POSITION | DISTANCE |
| UPPER DISTANCE MEASUREMENT UNIT (FIRST DIRECTION) | $X_1$ | $D_1$ |
| | $X_2$ | $D_2$ |
| | $X_3$ | $D_3$ |
| LOWER DISTANCE MEASUREMENT UNIT (FIRST DIRECTION) | $X_4$ | $D_4$ |
| | $X_5$ | $D_5$ |
| | $X_6$ | $D_6$ |

FIG. 14

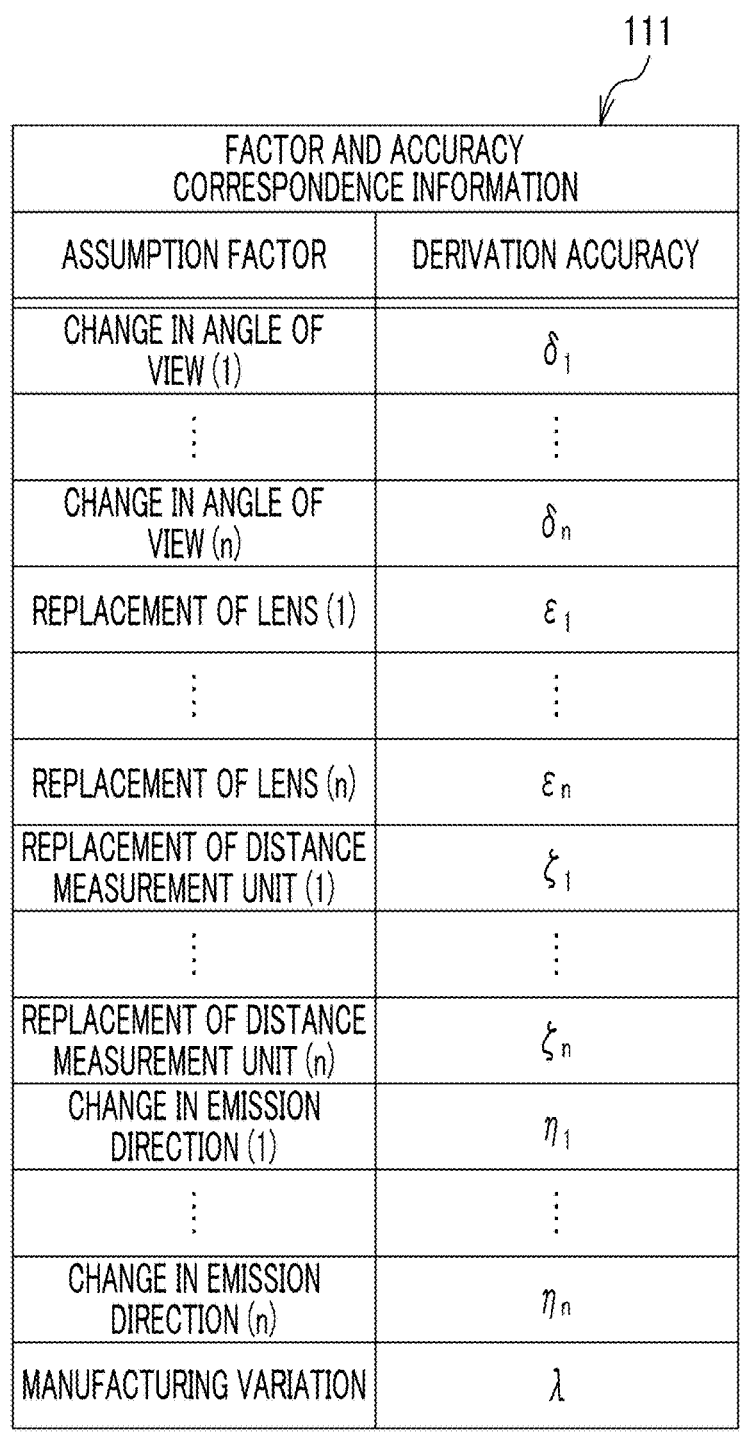

| FACTOR AND ACCURACY CORRESPONDENCE INFORMATION | |
|---|---|
| ASSUMPTION FACTOR | DERIVATION ACCURACY |
| CHANGE IN ANGLE OF VIEW (1) | $\delta_1$ |
| ⋮ | ⋮ |
| CHANGE IN ANGLE OF VIEW (n) | $\delta_n$ |
| REPLACEMENT OF LENS (1) | $\varepsilon_1$ |
| ⋮ | ⋮ |
| REPLACEMENT OF LENS (n) | $\varepsilon_n$ |
| REPLACEMENT OF DISTANCE MEASUREMENT UNIT (1) | $\zeta_1$ |
| ⋮ | ⋮ |
| REPLACEMENT OF DISTANCE MEASUREMENT UNIT (n) | $\zeta_n$ |
| CHANGE IN EMISSION DIRECTION (1) | $\eta_1$ |
| ⋮ | ⋮ |
| CHANGE IN EMISSION DIRECTION (n) | $\eta_n$ |
| MANUFACTURING VARIATION | $\lambda$ |

# DISTANCE MEASUREMENT DEVICE, DISTANCE MEASUREMENT METHOD, AND DISTANCE MEASUREMENT PROGRAM

CROSS-REFERENCE TO RELATED APPLICATION

This application is a continuation application of International Application No. PCT/JP2016/063584, filed May 2, 2016, the disclosure of which is incorporated herein by reference in its entirety. Further, this application claims priority from Japanese Patent Application No. 2015-190355 filed Sep. 28, 2015, the disclosure of which is incorporated herein by reference in its entirety.

BACKGROUND OF THE INVENTION

1. Field of the Invention

A technology of the present disclosure relates to a distance measurement device, a distance measurement method, and a distance measurement program.

2. Description of the Related Art

Initially, in the present specification, distance measurement means that a distance to a subject which is a measurement target from a distance measurement device is measured. In the present specification, a captured image means an image acquired by imaging the subject by an imaging unit that images the subject. In the present specification, irradiation-position pixel coordinates mean two-dimensional coordinates as two-dimensional coordinates for specifying a position of a pixel, among pixels included in the captured image, which corresponds to an irradiation position of directional light in a real space by the distance measurement device on the assumption that distance measurement is performed by using the distance measurement device that performs the distance measurement based on a time during which the directional light (for example, laser beam) emitted by an emission unit toward the subject supposed to be a distance measurement target travels in a reciprocating motion. In the present specification, an in-image irradiation position means a position acquired as a position within the captured image, which corresponds to the irradiation position of the directional light in the real space by the distance measurement device. In other words, the in-image irradiation position means a position of a pixel, among the pixels included in the captured image, which is specified by the irradiation-position pixel coordinates.

In recent years, a distance measurement device provided with an imaging unit has been developed. In such a type of distance measurement device, a subject is irradiated with a laser beam, and the subject is captured in a state in which the subject is irradiated with the laser beam. The captured image acquired by imaging the subject is presented to a user, and thus, an irradiation position of the laser beam is ascertained by the user through the captured image.

In recent years, a distance measurement device having a function of deriving a dimension of a target within an image in a real space as in a measurement device described in JP2014-232095A has been also developed.

The measurement device described in JP2014-232095A includes means for displaying an isosceles trapezoid shape of a structure having an isosceles trapezoid portion captured by the imaging unit and means for specifying four vertices of the displayed isosceles trapezoid shape and acquiring coordinates of the four specified vertices. The measurement device described in JP2014-232095A specifies a distance between two points on a plane including the isosceles trapezoid shape or a distance to one point on a plane from the imaging unit, acquires a shape of the structure from the coordinates of the four vertices and a focal length, and acquires a size of the structure from the specified distance.

Incidentally, in a case where a dimension of a target within the captured image acquired by imaging the subject by the imaging unit in the real space is derived, a plurality of pixels corresponding to a region as a deriving target in the captured image in the real space is designated by the user. The dimension of the region in the real space designated by a plurality of pixels designated by the user is derived based on the distance measured by the distance measurement device. Thus, in a case where the dimension of the region in the real space specified from the plurality of designated pixels is accurately derived, it is preferable that the in-image irradiation position is derived with high accuracy and the acquired in-image irradiation position together with the distance is ascertained by the user.

SUMMARY OF THE INVENTION

However, in the invention described in JP2014-232095A, in a case where the imaging and the distance measurement are performed once, a dimension in a real space related to one target designated as a dimension deriving target is merely derived. Thus, in a case where a plurality of targets desired by the user is present as the dimension deriving target in the captured image acquired by performing the imaging once, the targets are required to be designated one by one whenever the imaging and the distance measurement are performed, and thus, it takes effort to derive the dimension.

One embodiment of the present invention provides a distance measurement device, a distance measurement method, and a distance measurement program capable of rapidly deriving dimensions of a plurality of targets compared to a case where only one dimension deriving target is designated whenever the imaging and the distance measurement are performed once.

A distance measurement device according to a first aspect of the present invention comprises an imaging unit that images a subject, a measurement unit that measures a plurality of distances to the subject by emitting a plurality of directional light rays which are light rays each having directivity to the subject and receiving reflection light rays of the directional light rays by corresponding light receiving units, a control unit that controls the imaging unit to image the subject in an angle of view which includes irradiation positions of the directional light rays used in the measurement of the plurality of distances by the measurement unit onto the subject, and a deriving unit that derives a dimension of a real-space region corresponding to an interval between a plurality of pixels associated with the in-image irradiation positions based on distances which are related to in-image irradiation positions derived as positions corresponding to the irradiation positions within a captured image acquired by imaging the subject by the imaging unit, among the plurality of distances measured by the measurement unit, the interval for each distance within the captured image, and a focal length of the imaging unit.

Therefore, according to the distance measurement device according to the first aspect of the present invention, it is possible to rapidly derive dimensions of a plurality of targets compared to a case where only one dimension deriving target is designated whenever the imaging and the distance measurement are performed once.

According to a distance measurement device according to a second aspect of the present invention, in the distance measurement device according to the first aspect of the present invention, the measurement unit includes a plurality of sets each having an emission unit that emits the directional light ray and a light receiving unit that receives a reflection light ray of the directional light ray emitted by the corresponding emission unit, and an angle at which the directional light ray is emitted is able to be changed for each set of the emission unit and the light receiving unit in a state in which a positional relation between the emission unit and the light receiving unit in each set is fixed.

Therefore, according to the distance measurement device according to the second aspect of the present invention, it is possible to easily change irradiation positions of a plurality of directional light rays compared to a case where an angle at which the directional light is emitted is not able to be changed for each set of the emission unit and the light receiving unit.

According to a distance measurement device according to a third aspect of the present invention, in the distance measurement device according to the second aspect of the present invention, the deriving unit acquires a first correspondence relation between in-provisional-image irradiation positions corresponding to the irradiation positions within a provisional image acquired by provisionally imaging the subject by the imaging unit whenever each of a plurality of distances is provisionally measured by the measurement unit and distances which are provisionally measured by the measurement unit by using the directional light rays corresponding to the in-provisional-image irradiation positions for the sets, and derives the in-image irradiation positions for the sets based on the acquired first correspondence relation.

Therefore, according to the distance measurement device according to the third aspect of the present invention, it is possible to derive the in-image irradiation positions with high accuracy based on the directional light rays emitted by the emission units of the sets compared to a case where the in-image irradiation positions are derived for the sets without acquiring the first correspondence relation.

According to a distance measurement device according to a fourth aspect of the present invention, the distance measurement device according to the third aspect of the present invention further comprises a performing unit that performs a predetermined process as a process of suppressing a decrease in accuracy of the in-image irradiation position in a case where a distance which is actually measured by the measurement unit is out of a range of a distance specified by the first correspondence relation related to the corresponding set.

Therefore, according to the distance measurement device according to the fourth aspect of the present invention, it is possible to increase the accuracy of the in-image irradiation positions based on the directional light rays emitted using the sets compared to a case where the predetermined process as the process of suppressing the decrease in the accuracy of the in-image irradiation position is not performed.

A distance measurement device according to a fifth aspect of the present invention comprises an imaging unit that images a subject, a measurement unit that measures a plurality of distances to the subject by emitting directional light rays which are light rays each having directivity to the subject in a plurality of directions through scanning of the subject with the directional light rays and receiving reflection light rays of the directional light rays in the plurality of directions, a control unit that controls the imaging unit to image the subject in an angle of view which includes irradiation positions of the directional light rays used in the measurement of the plurality of distances by the measurement unit onto the subject, and a deriving unit that derives a dimension of a real-space region corresponding to an interval between a plurality of pixels associated with the in-image irradiation positions based on distances which are related to in-image irradiation positions derived as positions corresponding to the irradiation positions within a captured image acquired by imaging the subject by the imaging unit, among the plurality of distances measured by the measurement unit, the interval for each distance within the captured image, and a focal length of the imaging unit.

Therefore, according to the distance measurement device according to the fifth aspect of the present invention, it is possible to rapidly derive dimensions of a plurality of targets compared to a case where only one dimension deriving target is designated whenever the imaging and the distance measurement are performed once.

According to a distance measurement device according to a sixth aspect of the present invention, in the distance measurement device according to the fifth aspect of the present invention, the deriving unit acquires a first correspondence relation between in-provisional-image irradiation positions corresponding to the irradiation positions within a provisional image acquired by provisionally imaging the subject by the imaging unit whenever each of a plurality of distances is provisionally measured by the measurement unit and distances which are provisionally measured by the measurement unit by using the directional light rays corresponding to the in-provisional-image irradiation positions for each direction, and derives the in-image irradiation positions for each direction based on the acquired first correspondence relation.

Therefore, according to the distance measurement device according to the sixth aspect of the present invention, it is possible to derive the in-image irradiation positions with high accuracy based on the directional light rays emitted by the emission units of the directions compared to a case where the in-image irradiation positions are derived for each direction without acquiring the first correspondence relation.

According to a distance measurement device according to a seventh aspect of the present invention, the distance measurement device according to the sixth aspect of the present invention further comprises a performing unit that performs a predetermined process as a process of suppressing a decrease in accuracy of the in-image irradiation position in a case where a distance which is actually measured by the measurement unit is out of a range of a distance specified by the first correspondence relation related to the corresponding direction.

Therefore, according to the distance measurement device according to the seventh aspect of the present invention, it is possible to increase the accuracy of the in-image irradiation positions based on the directional light rays irradiated in the plurality of directions compared to a case where the predetermined process as the process of suppressing the decrease in the accuracy of the in-image irradiation position is not performed.

According to a distance measurement device according to an eighth aspect, the distance measurement device according to any one of the first to seventh aspects of the present invention further comprises an output unit that derives derivation accuracy corresponding to an actually present factor based on a second correspondence relation between assumption factors assumed as factors influencing the in-image irradiation positions and derivation accuracy derived by the deriving unit, and outputs information based on the derived derivation accuracy.

Therefore, according to the distance measurement device according to the eighth aspect of the present invention, the user can easily ascertain the information based on the derivation accuracy of the dimension of the real-space region compared to a case where the information based on the derivation accuracy of the dimension of the real-space region is not output even though a factor influencing the in-image irradiation position is actually present.

According to a distance measurement device according to a ninth aspect, in the distance measurement device according to the eighth aspect of the present invention, different derivation accuracy are associated with different assumption factors in the second correspondence relation, and the output unit derives the derivation accuracy associated with the assumption factor corresponding to the actually present factor.

Therefore, according to the distance measurement device according to the ninth aspect of the present invention, it is possible to accurately derive the derivation accuracy compared to a case where the derivation accuracy is associated with only a single assumption factor.

According to a distance measurement device according to a tenth aspect, in the distance measurement device according to the ninth aspect of the present invention, in a case where the actually present factor is in plural, the output unit derives the derivation accuracy by integrating the derivation accuracy associated with the assumption factors corresponding to the plurality of actually present factors.

Therefore, according to the distance measurement device according to the tenth aspect of the present invention, it is possible to achieve easy handling of the derivation accuracy compared to a case where the derivation accuracy associated with the assumption factors corresponding to the plurality of factors which is actually present in the distance measurement device as the factors influencing the in-image irradiation position are individually derived.

According to a distance measurement device according to an eleventh aspect, the distance measurement device according to any one of the first to tenth aspects of the present invention further comprises a change unit that is capable of changing an angle at which the directional light ray is emitted. In a case where the in-image irradiation position is out of a default range within the captured image, the control unit controls the measurement unit to measure the distance until the in-image irradiation position falls in a default range, and controls the deriving unit to derive the in-image irradiation position based on the distance measured by the measurement unit and the angle changed by the change unit.

Therefore, according to the distance measurement device according to the eleventh aspect of the present invention, it is possible to perform the distance measurement in a state in which the in-image irradiation position is in the default range within a captured image.

According to a distance measurement device according to a twelfth aspect of the present invention, in the distance measurement device according to the eleventh aspect of the present invention, in a case where the in-image irradiation position is out of the default range, the control unit controls the measurement unit to measure the distance until the in-image irradiation position falls in the default range, controls the change unit to change an angle by driving a power source, and controls the deriving unit to derive the in-image irradiation position based on the distance measured by the measurement unit and the angle changed by the change unit.

Therefore, according to the distance measurement device according to the twelfth aspect of the present invention, it is possible to reduce an effort to position the in-image irradiation position within the default range compared to a case where the angle is changed by the change unit without using the power source.

According to a distance measurement device according to a thirteenth aspect, in the distance measurement device according to any one of the first to twelfth aspects of the present invention, a frame including the in-image irradiation positions is designated for each in-image irradiation position within the captured image, the plurality of pixels is designated inside the frame for each frame, and the deriving unit derives the dimension of the real-space region corresponding to an interval between the plurality of designated pixels based on distances related to the corresponding in-image irradiation positions among the plurality of distances measured by the measurement unit, the interval, and the focal length for each frame.

Therefore, according to the distance measurement device according to the thirteenth aspect of the present invention, it is possible to derive the dimension of the real-space region based on the distance measured based on the directional light ray among the plurality of directional light rays which is desired to be used by the user in the deriving of the dimension of the real-space region compared to a case where the frame including the in-image irradiation position is not designated.

According to a distance measurement device according to a fourteenth aspect, in the distance measurement device according to any one of the first to thirteenth aspects of the present invention, the subject includes a plurality of planar regions of which at least one of an orientation or a position is different, and the measurement unit measures distances to the plurality of planar regions by emitting the directional light rays to the plurality of planar regions and receiving reflection lights of the directional light rays emitted to the plurality of planar regions.

Therefore, according to the distance measurement device according to the fourteenth aspect of the present invention, it is possible to easily derive dimensions of different real-space regions by using the plurality of planar regions as the targets compared to a case where only one directional light ray is emitted to the planar region.

A distance measurement method according to a fifteenth aspect of the present invention comprises controlling an imaging unit which images a subject to image the subject in an angle of view which includes irradiation positions of a plurality of directional light rays which are light rays each having directivity used in measurement of a plurality of distances by a measurement unit which measures the plurality of distances to the subject by emitting the directional light rays to the subject and receiving reflection light rays of the directional light rays by corresponding light receiving units, onto the subject, the imaging unit and the measurement unit being included in a distance measurement device, and deriving a dimension of a real-space region corresponding to an interval between a plurality of pixels associated with the in-image irradiation positions based on distances which are related to in-image irradiation positions derived as positions corresponding to the irradiation positions within a captured image acquired by imaging the subject by the imaging unit, among the plurality of distances measured by the measurement unit, the interval for each distance within the captured image, and a focal length of the imaging unit.

Therefore, according to the distance measurement method according to the fifteenth aspect of the present invention, it is possible to rapidly derive dimensions of a plurality of targets compared to a case where only one dimension deriving target is designated whenever the imaging and the distance measurement are performed once.

A distance measurement method according to a sixteenth aspect of the present invention comprises controlling an imaging unit which images a subject to image the subject in an angle of view which includes irradiation positions of a plurality of directional light rays which are light rays each having directivity used in measurement of a plurality of distances by a measurement unit which measures the plurality of distances to the subject by emitting the directional light rays to the subject and receiving reflection light rays of the directional light rays by corresponding light receiving units, onto the subject, the imaging unit and the measurement unit being included in a distance measurement device, and deriving a dimension of a real-space region corresponding to an interval between a plurality of pixels associated with the in-image irradiation positions based on distances which are related to in-image irradiation positions derived as positions corresponding to the irradiation positions within a captured image acquired by imaging the subject by the imaging unit, among the plurality of distances measured by the measurement unit, the interval for each distance within the captured image, and a focal length of the imaging unit.

Therefore, according to the distance measurement method according to the sixteenth aspect of the present invention, it is possible to rapidly derive dimensions of a plurality of targets compared to a case where only one dimension deriving target is designated whenever the imaging and the distance measurement are performed once.

A distance measurement program according to a seventeenth aspect of the present invention causes a computer to perform a process of controlling an imaging unit which images a subject to image the subject in an angle of view which includes irradiation positions of a plurality of directional light rays which are light rays each having directivity used in measurement of a plurality of distances by a measurement unit which measures the plurality of distances to the subject by emitting the directional light rays to the subject and receiving reflection light rays of the directional light rays by corresponding light receiving units, onto the subject, the imaging unit and the measurement unit being included in a distance measurement device, and deriving a dimension of a real-space region corresponding to an interval between a plurality of pixels associated with the in-image irradiation positions based on distances which are related to in-image irradiation positions derived as positions corresponding to the irradiation positions within a captured image acquired by imaging the subject by the imaging unit, among the plurality of distances measured by the measurement unit, the interval for each distance within the captured image, and a focal length of the imaging unit.

Therefore, according to the distance measurement program according to the seventeenth aspect of the present invention, it is possible to rapidly derive dimensions of a plurality of targets compared to a case where only one dimension deriving target is designated whenever the imaging and the distance measurement are performed once.

A distance measurement program according to an eighteenth aspect of the present invention causes a computer to perform a process of controlling an imaging unit which images a subject to image the subject in an angle of view which includes irradiation positions of a plurality of directional light rays which are light rays each having directivity used in measurement of a plurality of distances by a measurement unit which measures the plurality of distances to the subject by emitting the directional light rays to the subject and receiving reflection light rays of the directional light rays by corresponding light receiving units, onto the subject, the imaging unit and the measurement unit being included in a distance measurement device, and deriving a dimension of a real-space region corresponding to an interval between a plurality of pixels associated with the in-image irradiation positions based on distances which are related to in-image irradiation positions derived as positions corresponding to the irradiation positions within a captured image acquired by imaging the subject by the imaging unit, among the plurality of distances measured by the measurement unit, the interval for each distance within the captured image, and a focal length of the imaging unit.

Therefore, according to the distance measurement program according to the eighteenth aspect of the present invention, it is possible to rapidly derive dimensions of a plurality of targets compared to a case where only one dimension deriving target is designated whenever the imaging and the distance measurement are performed once.

According to one embodiment of the present invention, an effect of rapidly deriving dimensions of a plurality of targets is acquired compared to a case where one dimension deriving target is designated whenever the imaging and the distance measurement are performed once.

BRIEF DESCRIPTION OF THE DRAWINGS

FIG. 14 is a conceptual diagram showing an example of a factor and accuracy table according to the first to seventh embodiments.

DESCRIPTION OF THE PREFERRED EMBODIMENTS

Hereinafter, an example of an embodiment related to a technology of the present disclosure will be described with reference to the accompanying drawings. In the present embodiment, a distance between a distance measurement device and a subject as a measurement target is simply referred to as a distance for the sake of convenience in description. In the present embodiment, an angle of view (an angle of view on a subject image indicating the subject) on the subject is simply referred to as an "angle of view".

First Embodiment

Figure 1:
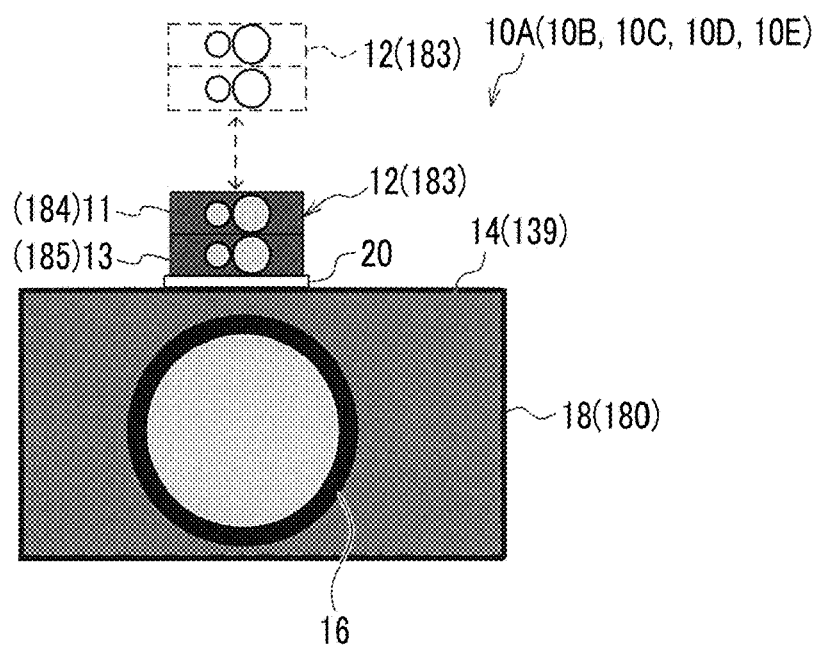
FIG. 1 is a front view showing an example of an external appearance of a distance measurement device according to first to fifth embodiments.

For example, a distance measurement device 10A according to the first embodiment includes a distance measurement unit 12 and an imaging device 14 as shown in FIG. 1. In the present embodiment, the distance measurement unit 12 and a distance measurement control unit 68 (see FIG. 5) to be described below are examples of a measurement unit according to the technology of the present disclosure, and the imaging device 14 is an example of an imaging unit according to the technology of the present disclosure.

The imaging device 14 includes a lens unit 16 and an imaging device main body 18, and the lens unit 16 is detachably attached to the imaging device main body 18.

A hot shoe 20 is provided on a top surface of the imaging device main body 18, and the distance measurement unit 12 is detachably attached to the hot shoe 20.

The distance measurement device 10A has a distance measurement system function of measuring a distance by emitting a laser beam for distance measurement to the distance measurement unit 12, and an imaging system function of causing the imaging device 14 to acquire a captured image by imaging the subject. Hereinafter, the captured image acquired by imaging the subject by using the imaging device 14 by utilizing the imaging system function is simply referred to as an "image" or a "captured image".

The distance measurement unit 12 includes an upper distance measurement unit 11 and a lower distance measurement unit 13, and the upper distance measurement unit 11 is disposed so as to be overlapped on the lower distance measurement unit 13. The upper distance measurement unit 11 and the lower distance measurement unit 13 are examples of a "set" according to the technology of the present disclosure.

The upper distance measurement unit 11 is attached to the lower distance measurement unit 13 so as to be rotated with a plan-view central portion as a rotation axis, and the lower distance measurement unit 13 is attached to a plan-view central portion of the hot shoe 20 so as to be rotated with a plan-view central portion as a rotation axis.

Hereinafter, the upper distance measurement unit 11 and the lower distance measurement unit 13 are referred to as an "individual distance measurement unit" without being assigned the references in a case where it is not necessary to distinguish between these distance measurement units for the sake of convenience in description.

The distance measurement device 10A performs one measurement sequence (see FIG. 7) on the upper distance measurement unit 11 and the lower distance measurement unit 13 according to one instruction by utilizing the distance measurement system function. The distance measurement device 10A finally outputs one distance by performing one distance measurement sequence by using the upper distance measurement unit 11, and finally outputs one distance by performing one distance measurement sequence by using the lower distance measurement unit 13.

In the present embodiment, actual measurement and provisional measurement are selectively performed by utilizing the distance measurement system function according to an instruction of a user. The actual measurement means measurement in which a distance measured by utilizing the distance measurement system function is actually used, and the provisional measurement means measurement performed in a preparation stage of increasing the accuracy of the actual measurement.

The distance measurement device 10A has, as an operation mode of the imaging system function, a still image imaging mode and a video imaging mode. The still image imaging mode is an operation mode for imaging a still image, and the video imaging mode is an operation mode of imaging a motion picture. The still image imaging mode and the video imaging mode are selectively set according to an instruction of the user.

In the present embodiment, the actual imaging and the provisional imaging are selectively performed by utilizing the imaging system function according to an instruction of the user. The actual imaging is imaging performed in synchronization with the actual measurement, and the provisional imaging is imaging performed in synchronization with the provisional measurement. Hereinafter, for the sake of convenience in description, an image acquired by performing actual imaging is also referred to as an actual captured image or an actual image, and an image acquired by performing provisional imaging is also referred to as a provisional captured image or a provisional image. Hereinafter, the actual captured image and the provisional captured image are referred to as an "image" or a "captured image" for the sake of convenience in description in a case where it is not necessary to distinguish between these images.

The distance measurement device 10A has, as an operation mode of the distance measurement system function, a distance deriving mode and a dimension deriving mode. The distance deriving mode is an operation mode in which the distance measurement device 10A measures a distance. The dimension deriving mode is an operation mode in which a dimension of a real-space region designated by the user is derived based on the distance measured by the distance measurement device 10A by utilizing a dimension deriving function.

Hereinafter, an example in which a length between two points in a real space is derived as the dimension of the real-space region will be described for the sake of convenience in description. Hereinafter, a region "between two points in the real space" is also referred to as a "region in the real space" or is simply referred to as a "region" for the sake of convenience in description.

Figure 2:
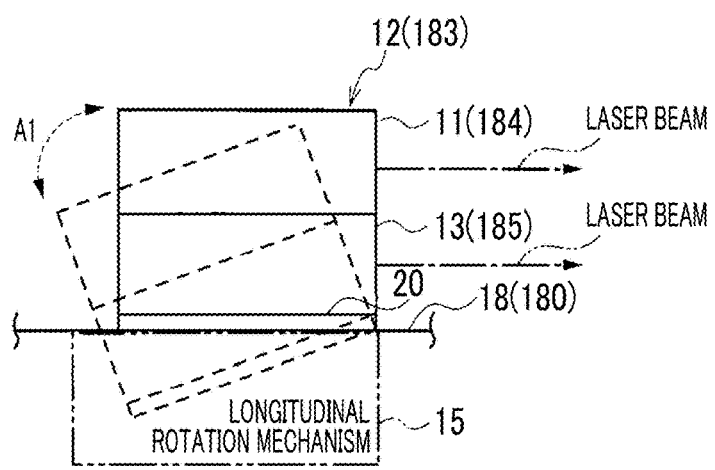
FIG. 2 is a conceptual diagram (schematic side view) showing an example of a schematic configuration of a distance measurement unit and a longitudinal rotation mechanism according to the first to sixth embodiments.

For example, the imaging device main body 18 includes a longitudinal rotation mechanism 15 as shown in FIG. 2. The longitudinal rotation mechanism 15 receives a power generated by a motor 17 (see FIG. 5) to be described below, and rotates the hot shoe 20 in a front-view longitudinal direction with a front end portion of the hot shoe 20 as a rotation axis. Accordingly, the hot shoe 20 to which the distance measurement unit 12 is attached is rotated by the longitudinal rotation mechanism 15 in the longitudinal direction in front view, and thus, an orientation of the longitudinal distance measurement unit 12 is changed in the front-view longitudinal direction (for example, an A1 direction represented in FIG. 2) in the front-view longitudinal direction.

For the sake of convenience in description, although it has been described in the example shown in FIG. 2 that the hot shoe 20 is rotated in the front-view longitudinal direction such that a rear end portion of the hot shoe 20 is buried within the imaging device main body 18, the technology of the present disclosure is not limited thereto. For example, the hot shoe 20 may be rotated in the front-view longitudinal direction such that the rear end of the hot shoe 20 is pushed up from the imaging device main body 18. Hereinafter, for the sake of convenience in description, the front-view longitudinal direction is simply referred to as a "longitudinal direction".

Figure 3:
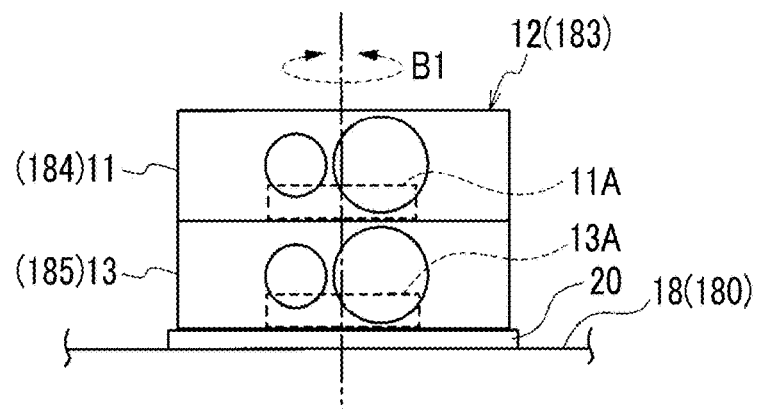
FIG. 3 is a conceptual diagram (schematic front view) showing an example of a schematic configuration of an upper distance measurement unit, an upper horizontal rotation mechanism, a lower distance measurement unit, and a lower horizontal rotation mechanism according to the first to sixth embodiments.

For example, the upper distance measurement unit 11 includes an upper horizontal rotation mechanism 11A, as shown in FIG. 3. The upper horizontal rotation mechanism 11A receives a power generated by a motor 11B (see FIG. 6) to be described below, and rotates the upper distance measurement unit 11 with a plan-view central portion of the lower distance measurement unit 13 as the rotation axis in a front-view horizontal direction. Accordingly, the upper distance measurement unit 11 is rotated in the front-view horizontal direction in a state in which the distance measurement unit 12 is attached to the hot shoe 20, and thus, an orientation of the upper distance measurement unit 11 is changed in the front-view horizontal direction (for example, a direction of an arrow B1 represented in FIG. 3). Hereinafter, for the sake of convenience in description, the front-view horizontal direction is simply referred to as a "horizontal direction".

For example, the lower distance measurement unit 13 includes a lower horizontal rotation mechanism 13A as shown in FIG. 3. The lower horizontal rotation mechanism 13A receives a power generated by a motor 13B (see FIG. 6) to be described below, and rotates the lower distance measurement unit 13 in a horizontal direction with the plan-view central portion of the hot shoe 20 as the rotation axis. Accordingly, the lower distance measurement unit 13 is rotated in the horizontal direction in a state in which the distance measurement unit 12 is attached to the hot shoe 20, and thus, the orientation of the lower distance measurement unit 13 is changed in the horizontal direction (for example, the direction of the arrow B1 represented in FIG. 3).

Figure 4:
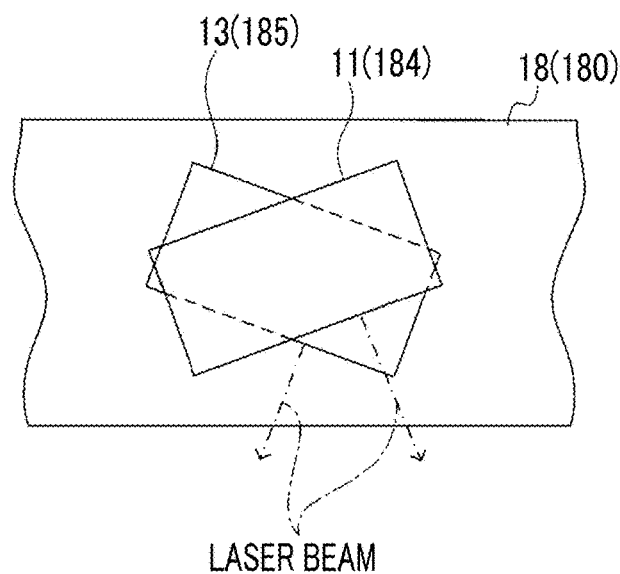
FIG. 4 is a conceptual diagram (schematic plan view) showing an example of a schematic configuration of the upper distance measurement unit and the lower distance measurement unit according to the first to sixth embodiments.

As stated above, since the distance measurement unit 12 includes a set of a plurality of individual distance measurement units (for example, the upper distance measurement unit 11 and the lower distance measurement unit 13) in a longitudinal direction, it is possible to emit a plurality of laser beams to the subject according to one instruction. In a case where the orientations of the upper distance measurement unit 11 and the lower distance measurement unit 13 are changed in the horizontal direction, it is possible to emit the plurality of laser beams in different directions by the upper distance measurement unit 11 and the lower distance measurement unit 13, as shown in FIG. 4. The example shown in FIG. 4 shows a state in which two laser beams are emitted from the distance measurement unit 12.

In the first to sixth embodiments, the upper and lower horizontal rotation mechanisms are referred to as a "horizontal rotation mechanism" without being assigned the reference for the sake of convenience in description in a case where it is not necessary to distinguish between the upper horizontal rotation mechanism 11A and the lower horizontal rotation mechanism 13A. In the first to sixth embodiments, the longitudinal rotation mechanism and the longitudinal rotation mechanism are referred to as a "rotation mechanism" without being assigned the reference for the sake of convenience in description in a case where it is not necessary to distinguish between the longitudinal rotation mechanism 15 and the horizontal rotation mechanism.

Figure 5:
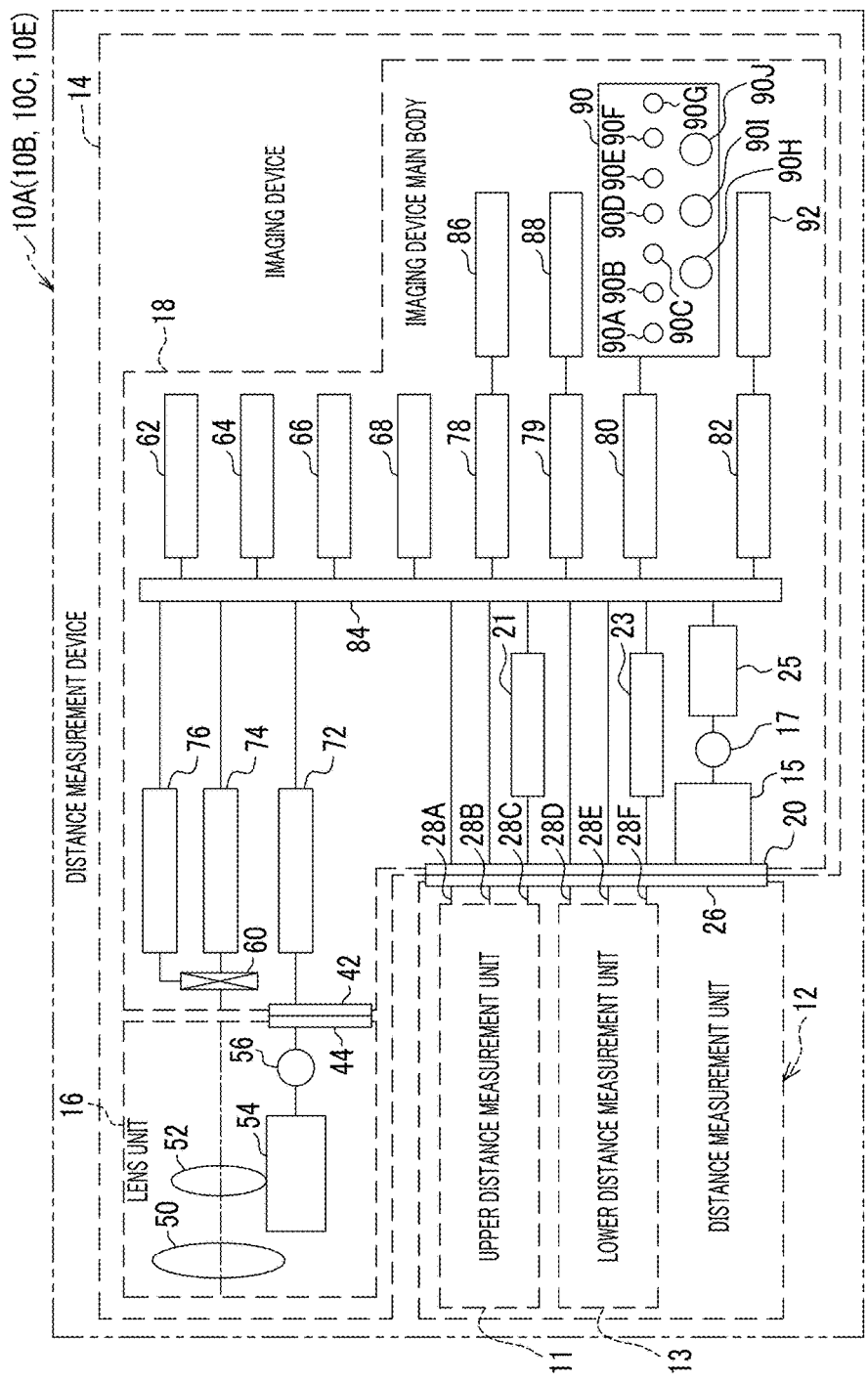
FIG. 5 is a block diagram showing an example of a hardware configuration of main parts of the distance measurement device according to the first to third embodiments and the fifth embodiment.

For example, the distance measurement unit 12 includes a connector 26, as shown in FIG. 5. The upper distance measurement unit 11 includes signal lines 28A, 28B, and 28C, and the lower distance measurement unit 13 includes signal lines 28D, 28E, and 28F. The signal lines 28A, 28B, 28C, 28D, 28E, and 28F are connected to the connector 26.

The connector 26 is able to be connected to the hot shoe 20, and the distance measurement unit 12 is operated under the control of the imaging device main body 18 in a state in which the connector 26 is connected to the hot shoe 20.

Figure 6:
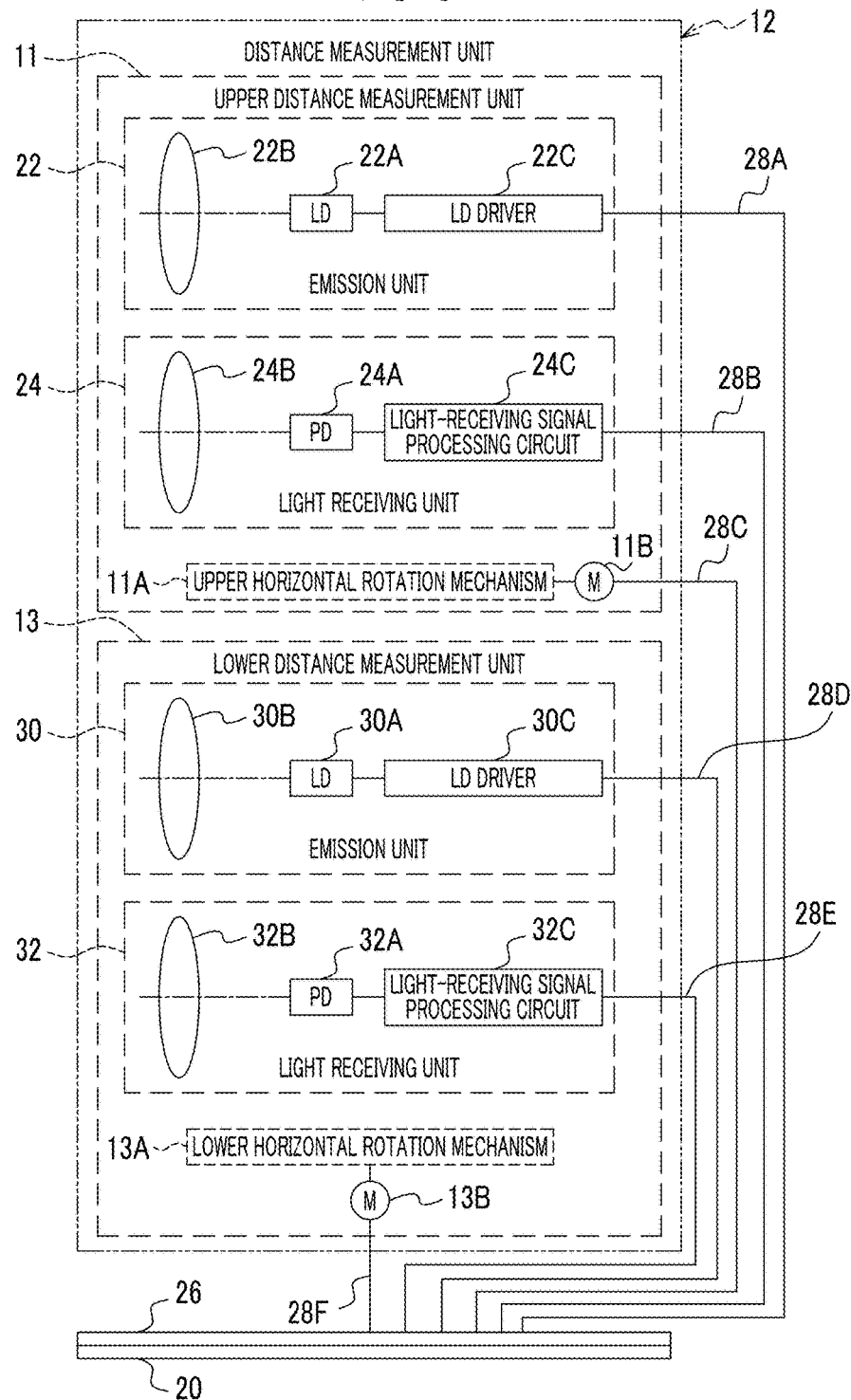
FIG. 6 is a block diagram showing an example of a hardware configuration of main parts of the distance measurement unit according to the first to third embodiments, the fifth embodiment, and the sixth embodiment.

For example, the upper distance measurement unit 11 includes an emission unit 22 and a light receiving unit 24, as shown in FIG. 6. The positional relation between the emission unit 22 and the light receiving unit 24 is fixed.

The emission unit 22 includes a laser diode (LD) 22A, a condenser lens (not shown), an object lens 22B, and an LD driver 22C.

The condenser lens and the object lens 22B are provided along an optical axis of a laser beam emitted by the LD 22A, and the condenser lens and the object lens 22B are arranged in order along the optical axis from the LD 22A.

The LD 22A emits a laser beam for distance measurement which is an example of directional light according to the technology of the present disclosure. The laser beam emitted by the LD 22A is a colored laser beam. For example, as long as the subject is separated from the emission unit 22 in a range of about several meters, an irradiation position of the laser beam is visually recognized in a real space, and is visually recognized from the captured image acquired by imaging the subject by the imaging device 14.

The condenser lens concentrates the laser beam emitted by the LD 22A, and causes the concentrated laser beam to pass. The object lens 22B faces the subject, and emits the laser beam that passes through the condenser lens to the subject.

The LD driver 22C is connected to the LD 22A, and is connected to the connector 26 through the signal line 28A. The LD driver 22C emits the laser beam by driving the LD 22A according to an instruction of the imaging device main body 18.

The light receiving unit 24 includes a photodiode (PD) 24A, an object lens 24B, and a light-receiving signal processing circuit 24C. The object lens 24B is disposed on a light receiving surface of the PD 24A. After the laser beam emitted by the emission unit 22 reaches the subject, a reflection laser beam which is a laser beam reflected from the subject is incident on the object lens 24B. The object lens 24B factors the reflection laser beam to pass, and guides the reflection laser beam to the light receiving surface of the PD 24A. The PD 24A receives the reflection laser beam that passes through the object lens 24B, and outputs an analog signal corresponding to a light reception amount, as a light-receiving signal.

The light-receiving signal processing circuit 24C is connected to the PD 24A, and is connected to the connector 26 through the signal line 28B. The light-receiving signal processing circuit 24C amplifies the light-receiving signal input from the PD 24A by an amplifier (not shown), and performs analog-to-digital (A/D) conversion on the amplified light-receiving signal. The light-receiving signal processing circuit 24C outputs the light-receiving signal digitized through the A/D conversion to the imaging device main body 18.

The upper distance measurement unit 11 includes a motor 11B. The motor 11B is connected to the upper horizontal rotation mechanism 11A so as to transfer the power, and is connected to the connector 26 through the signal line 28C. Accordingly, the upper horizontal rotation mechanism 11A is activated by receiving the power generated by the motor 11B under the control of the imaging device main body 18.

For example, the lower distance measurement unit 13 includes an emission unit 30 and a light receiving unit 32, as shown in FIG. 6. The positional relation between the emission unit 30 and the light receiving unit 32 is fixed.

The emission unit 30 includes an LD 30A, a condenser lens (not shown), an object lens 30B, and an LD driver 30C.

The condenser lens and the object lens 30B are provided along an optical axis of a laser beam emitted by the LD 30A, and the condenser lens and the object lens 30B are arranged in order along the optical axis from the LD 30A.

The LD 30A emits a laser beam for distance measurement which is an example of directional light according to the technology of the present disclosure. The laser beam emitted by the LD 30A is the same laser beam as that of the LD 22A of the emission unit 22 of the upper distance measurement unit 11.

The condenser lens concentrates the laser beam emitted by the LD 30A, and causes the concentrated laser beam to pass. The object lens 30B faces the subject, and emits the laser beam that passes through the condenser lens to the subject.

The LD driver 30C is connected to the LD 30A, and is connected to the connector 26 through the signal line 28D. The LD driver 30C emits the laser beam according to an instruction of the imaging device main body 18 by driving the LD 30A.

The light receiving unit 32 includes a PD 32A, an object lens 32B, and a light-receiving signal processing circuit 32C. The object lens 32B is disposed on a light receiving surface of the PD 32A. After the laser beam emitted by the emission unit 30 reaches the subject, a reflection laser beam which is a laser beam reflected from the subject is incident on the object lens 32B. The object lens 32B factors the reflection laser beam to pass, and guides the reflection laser beam to the light receiving surface of the PD 32A. The PD 32A receives the reflection laser beam that passes through the object lens 32B, and outputs an analog signal corresponding to a light reception amount, as a light-receiving signal.

Hereinafter, the object lenses are referred to as the "object lens" without being assigned the references for the sake of convenience in description in a case where it is not necessary to distinguish between the object lenses 22B, 24B, 30B, and 32B.

The light-receiving signal processing circuit 32C is connected to the PD 32A, and is connected to the connector 26 through the signal line 28E. The light-receiving signal processing circuit 32C amplifies the light-receiving signal input from the PD 32A by an amplifier (not shown), and performs A/D conversion on the amplified light-receiving signal. The light-receiving signal processing circuit 32C outputs the light-receiving signal digitized through the A/D conversion to the imaging device main body 18.

The lower distance measurement unit 13 includes a motor 13B. The motor 13B is connected to the lower horizontal rotation mechanism 13A so as to transfer the power, and is connected to the connector 26 through the signal line 28F. Accordingly, the lower horizontal rotation mechanism 13A is activated by receiving the power generated by the motor 13B under the control of the imaging device main body 18.

For example, the imaging device 14 includes mounts 42 and 44, as shown in FIG. 5. The mount 42 is provided at the imaging device main body 18, and the mount 44 is provided at the lens unit 16. The lens unit 16 is attached to the imaging device main body 18 so as to be replaceable by coupling the mount 42 to the mount 44.

The lens unit 16 includes an imaging lens 50, a zoom lens 52, a zoom lens moving mechanism 54, and a motor 56.

Subject light which is reflected from the subject is incident on the imaging lens 50. The imaging lens 50 factors the subject light to pass, and guides the subject light to the zoom lens 52.

The zoom lens 52 is attached to the zoom lens moving mechanism 54 so as to slide along the optical axis. The motor 56 is connected to the zoom lens moving mechanism 54. The zoom lens moving mechanism 54 receives a power of the motor 56, and factors the zoom lens 52 to slide along an optical axis direction.

The motor 56 is connected to the imaging device main body 18 through the mounts 42 and 44, and the driving of the motor is controlled according to a command from the imaging device main body 18. In the present embodiment, a stepping motor is used as an example of the motor 56. Accordingly, the motor 56 is driven in synchronization with a pulsed power according to a command from the imaging device main body 18.

The imaging device main body 18 includes an imaging element 60, a main control unit 62, an image memory 64, an image processing unit 66, a distance measurement control unit 68, a motor 17, motor drivers 21, 23, 25, and 72, an imaging element driver 74, an image signal processing circuit 76, and a display control unit 78. The imaging device main body 18 includes a touch panel interface (I/F) 79, a reception I/F 80, and a media I/F 82.

The rotation mechanisms, the motors 11B, 13B, and 17, and the motor drivers 21, 23, and 25 are examples of a change unit according to the technology of the present disclosure. For example, the change unit according to the technology of the present disclosure means a mechanism capable of changing an emission angle β to be described below.

The main control unit 62, the image memory 64, the image processing unit 66, the distance measurement control unit 68, the motor driver 72, the imaging element driver 74, the image signal processing circuit 76, and the display control unit 78 are connected to a busline 84. The touch panel I/F 79, the reception I/F 80, and the media I/F 82 are also connected to the busline 84. The signal lines 28A, 28B, 28D, and 28E are also connected to the busline 84 through the connector 26 and the hot shoe 20. The signal line 28C is connected to the busline 84 through the motor driver 21. The signal line 28F is connected to the busline 84 through the motor driver 23.

The imaging element 60 is a complementary metal oxide semiconductor (CMOS) type image sensor, and includes a color filter (not shown). The color filter includes a G filter corresponding to green (G), an R filter corresponding to red (R), and a B filter corresponding to blue (B) which contribute to the acquisition of a brightness signal. The imaging element 60 includes a plurality of pixels (not shown) arranged in a matrix shape, and any filter of the R filter, the G filter, and the B filter included in the color filter is allocated to each pixel.

The subject light that passes through the zoom lens 52 is formed on an imaging surface which is the light receiving surface of the imaging element 60, and electric charges corresponding to the light reception amount of the subject light are accumulated in the pixels of the imaging element 60. The imaging element 60 outputs the charges accumulated in the pixels, as image signals indicating an image corresponding to a subject image acquired by forming the subject light on the imaging surface.

For example, the motor 17 is connected to the longitudinal rotation mechanism 15, and the longitudinal rotation mechanism 15 receives the power generated by the motor 17 and rotates the hot shoe 20 in the longitudinal direction. For example, the distance measurement unit 12 is rotated in the direction of an arrow A1, as shown in FIG. 2.

The main control unit 62 controls the entire distance measurement device 10A through the busline 84.

The motor driver 21 controls the motor 11B (see FIG. 6) according to an instruction of the main control unit 62. The motor driver 23 controls the motor 13B (see FIG. 6) according to an instruction of the main control unit 62. The motor driver 25 controls the motor 17 according to an instruction of the main control unit 62.

The motors 11B, 13B, and 17 are examples of a power source according to the technology of the present disclosure. In the present embodiment, a stepping motor is used as an example of the motors 11B, 13B, and 17. Accordingly, the motors 11B, 13B, and 17 are driven in synchronization with a pulsed power according to a command from the main control unit 62.

The imaging device 14 has an angle-of-view changing function. The angle-of-view changing function is a function of changing an angle of view on the subject by moving the zoom lens 52. In the present embodiment, the angle-of-view changing function is realized by the zoom lens 52, the zoom lens moving mechanism 54, the motor 56, the motor driver 72, and the main control unit 62.

Although it has been described in the present embodiment that the optical angle-of-view changing function using the zoom lens 52 is used, the technology of the present disclosure is not limited thereto, and an electronic angle of view changing function without using the zoom lens 52 may be used.

The imaging element driver 74 is connected to the imaging element 60, and supplies drive pulses to the imaging element 60 under the control of the main control unit 62. The pixels of the imaging element 60 are driven according to the drive pulses supplied by the imaging element driver 74.

The image signal processing circuit 76 is connected to the imaging element 60, and reads image signals corresponding to one frame for every pixel out of the imaging element 60 under the control of the main control unit 62. The image signal processing circuit 76 performs various processing tasks such as correlative double sampling processing, automatic gain adjustment, and A/D conversion on the readout image signals. The image signal processing circuit 76 outputs image signals digitized by performing various processing tasks on the image signals for every frame to the image memory 64 at a specific frame rate (for example, tens of frames/second) prescribed by an analog signal supplied from the main control unit 62. The image memory 64 provisionally retains the image signals input from the image signal processing circuit 76.

The imaging device main body 18 includes a display unit 86, a touch panel 88, a reception device 90, and a memory card 92.

The display unit 86 is connected to the display control unit 78, and displays various information items under the control of the display control unit 78. The display unit 86 is realized by a liquid crystal display (LCD), for example.

The touch panel 88 is layered on a display screen of the display unit 86, and senses touch using a pointer such as a finger of the user and/or a touch pen. The touch panel 88 is connected to the touch panel I/F 79, and outputs positional information indicating a position touched by the pointer to the touch panel I/F 79. The touch panel I/F 79 activates the touch panel 88 according to an instruction of the main control unit 62, and outputs the positional information input from the touch panel 88 to the main control unit 62.

The reception device 90 receives various instructions from the user. The reception device 90 includes an actual measurement and actual imaging button 90A, a provisional measurement and provisional imaging button 90B, an imaging system operation mode switching button 90C, a wide angle instruction button 90D, and a telephoto instruction button 90E. The reception device 90 includes a measurement system operation mode switching button 90F and an irradiation position adjustment button 90G. The reception device 90 includes an upper rotary switch 90H, a lower rotary switch 90I, and a longitudinal rotation rotary switch 90J.

The reception device 90 is connected to the reception I/F 80, and the reception I/F 80 outputs an instruction content signal indicating the content of the instruction received by the reception device 90 to the main control unit 62.

The actual measurement and actual imaging button 90A is a pressing type button that receives an instruction to start the actual measurement and the actual imaging. The provisional measurement and provisional imaging button 90B is a pressing type button that receives an instruction to start the provisional measurement and the provisional imaging. The imaging system operation mode switching button 90C is a pressing type button that receives an instruction to switch between the still image imaging mode and the video imaging mode.

The wide angle instruction button 90D is a pressing type button that receives an instruction to change the angle of view to a wide angle, and a degree of the angle of view changed to the wide angle is determined in an allowable range depending on a pressing time during which the wide angle instruction button 90D is continuously pressed.

The telephoto instruction button 90E is a pressing type button that receives an instruction to change the angle of view to an angle of a telephoto lens, and a degree of the angle of view changed to the angle of the telephoto lens is determined in an allowable range depending on a pressing time during which the telephoto instruction button 90E is continuously pressed.

The measurement system operation mode switching button 90F is a pressing type button that receives an instruction to switch between the distance deriving mode and the dimension deriving mode. The irradiation position adjustment button 90G is a pressing type button that receives an instruction to adjust an in-image irradiation position.

The upper rotary switch 90H is a rotation type switch that receives an instruction to change the orientation of the upper distance measurement unit 11 in the horizontal direction by activating the upper horizontal rotation mechanism 11A. The lower rotary switch 90I is a rotation type switch that receives an instruction to change the orientation of the lower distance measurement unit 13 by activating the lower horizontal rotation mechanism 13A in the horizontal direction. The longitudinal rotation rotary switch 90J is a rotation type switch that receives an instruction to change the orientation of the distance measurement unit 12 in the longitudinal direction by activating the longitudinal rotation mechanism 15.

Hereinafter, the actual measurement and actual imaging button and the provisional measurement and provisional imaging button are referred to as a "release button" for the sake of convenience in description in a case where it is not necessary to distinguish between the actual measurement and actual imaging button 90A and the provisional measurement and provisional imaging button 90B. Hereinafter, the wide angle instruction button and the telephoto instruction button are referred to as an "angle-of-view instruction button" for the sake of convenience in description in a case where it is not necessary to distinguish between the wide angle instruction button 90D and the telephoto instruction button 90E.

In the distance measurement device 10A, a manual focus mode and an auto focus mode are selectively set according to an instruction of the user through the reception device 90. The release button receives two-step pressing operations including an imaging preparation instruction state and an imaging instruction state. For example, the imaging preparation instruction state refers to a state in which the release button is pressed down from a waiting position to an intermediate position (half pressed position), and the imaging instruction state refers to a state in which the release button is pressed down to a finally pressed-down position (fully pressed position) beyond the intermediate position. Hereinafter, for the sake of convenience in description, a "state in which the release button is pressed down from the waiting position to the half pressed position" is referred to as a "half pressed state", and a "state in which the release button is pressed down from the waiting position to the fully pressed position" is referred to as a "fully pressed state".

In the auto focus mode, after an imaging condition is adjusted by setting the release button to be in the half pressed state, actual exposing is subsequently performed by setting the release button to be in the fully pressed state. That is, in a case where the release button is set to be in the half pressed state before the actual exposing is performed, an automatic exposure (AE) function, and thus, exposure is adjusted. Thereafter, a focus is adjusted by performing auto-focus (AF) function, and the actual exposing is performed in a case where the release button is set to be in the fully pressed state. In this example, the actual exposing refers to exposing performed in order to acquire a still image file to be described below. In the present embodiment, the exposing means exposing performed in order to acquire a live view image to be described below and exposition performed in order to acquire a motion picture image file to be described below in addition to the actual exposing. Hereinafter, for the sake of convenience in description, the exposing is simply referred to as "exposing" in a case where it is not necessary to distinguish between these exposing tasks.

In the present embodiment, the main control unit 62 performs the exposure adjustment using the AE function and the focus adjustment using the AF function. Although it has been described in the present embodiment that the exposure adjustment and the focus adjustment are performed, the technology of the present disclosure is not limited to thereto, and the exposure adjustment or the focus adjustment may be performed.

The image processing unit 66 acquires image signals for every frame from the image memory 64 at a specific frame rate, and performs various processing tasks such as gamma correction, luminance and color difference conversion, and compression processing on the acquired image signals.

The image processing unit 66 outputs the image signals acquired by performing various processing tasks to the display control unit 78 for every frame at a specific frame rate. The image processing unit 66 outputs the image signals acquired by performing various processing tasks to the main control unit 62 according to a request of the main control unit 62.

The display control unit 78 outputs the image signals input from the image processing unit 66 to the display unit 86 for every frame at a specific frame rate under the control of the main control unit 62.

The display unit 86 displays image and character information. The display unit 86 displays the image indicated by the image signals input from the display control unit 78 at a specific frame rate, as a live view image. As the live view image, a plurality of images acquired by performing continuous imaging by the imaging device 14 in a sequence of time, that is, continuous frame images acquired by performing imaging in continuous frames is acquired, and the live view image is referred to as a live preview image. The display unit 86 also displays the still image which is a single frame image captured in a single frame. The display unit 86 also displays a playback image and/or a menu screen in addition to the live view image.

Although the image processing unit 66 and the display control unit 78 are realized by an application specific integrated circuit (ASIC) in the present embodiment, the technology of the present disclosure is not limited thereto. For example, the image processing unit 66 and the display control unit 78 may be realized by a field-programmable gate array (FPGA). The image processing unit 66 may be realized by a computer including a central processing unit (CPU), a read only memory (ROM), and a random access memory (RAM). The display control unit 78 may also be realized by a computer including a CPU, a ROM, and a RAM. The image processing unit 66 and the display control unit 78 may be realized by combining of a hardware configuration and a software configuration.

In a case where an instruction to image the still image is received by the release button in the still image imaging mode, the main control unit 62 factors the imaging element 60 to expose one frame by controlling the imaging element driver 74. The main control unit 62 acquires the image signals acquired by exposing one frame from the image processing unit 66, and generates the still image file having a specific still image format by performing a compression process on the acquired image signals. For example, the specific still image format refers to the Joint Photographic Experts Group (JPEG).

In a case where an instruction to image the motion picture is received by the release button in the video imaging mode, the main control unit 62 acquire the image signals output to the display control unit 78 in order to be used as the live view image, by the image processing unit 66 for every frame at a specific frame rate. The main control unit 62 generates a motion picture file having a specific motion picture format by performing the compression process on the image signals acquired from the image processing unit 66. For example, the specific motion picture format refers to the Moving Picture Experts Group (MPEG). Hereinafter, the still image file and the motion picture file are referred to as the image file for the sake of convenience in description in a case where it is not necessary to distinguish between the still image file and the motion picture file.

The media I/F 82 is connected to the memory card 92, and records and reads the image file in and out of the memory card 92 under the control of the main control unit 62. The main control unit 62 performs a decompression process on the image file read out of the memory card 92 by the media I/F 82, and displays the decompressed image file as a playback image on the display unit 86.

The main control unit 62 stores distance measurement information including at least one of distance information input from the distance measurement control unit 68 or dimension information indicating a dimension derived by utilizing a dimension deriving function to be described below in association with the image file in the memory card 92 through the media I/F 82. The distance measurement information together with the image file is read out of the memory card 92 by the main control unit 62 through the media I/F 82. In a case where the distance information is included in the distance measurement information read out by the main control unit 62, the distance indicated by the distance information together with the playback image which is the associated image file is displayed on the display unit 86. In a case where the dimension information is included in the distance measurement information read out by the main control unit 62, the dimension indicated by the dimension information together with the playback image which is the associated image file is displayed on the display unit 86.

The distance measurement control unit 68 controls the distance measurement unit 12 under the control of the main control unit 62. In the present embodiment, the distance measurement control unit 68 is realized by ASIC, but the technology of the present disclosure is not limited thereto. For example, the distance measurement control unit 68 may be realized by FPGA. The distance measurement control unit 68 may be realized by a computer including a CPU, a ROM, and a RAM. The distance measurement control unit 68 may be realized by the combination of the hardware configuration and the software configuration.

Under the control of the main control unit 62, the distance measurement control unit 68 controls the emission of the laser beam from the LD 22A by controlling the LD driver 22C, and acquires light-receiving signal from the light-receiving signal processing circuit 24C. Under the control of the main control unit 62, the distance measurement control unit 68 controls the emission of the laser beam from the LD 30A by controlling the LD driver 30C, and acquires light-receiving signal from the light-receiving signal processing circuit 32C. The distance measurement control unit 68 derives a distance to the subject for every individual distance measurement unit based on a timing when the laser beam is emitted and a timing when the light-receiving signal is acquired, and outputs distance information indicating the derived distance to the main control unit 62.

The measurement of the distance to the subject using the distance measurement control unit 68 using the upper distance measurement unit 11 will be described in more detail. The measurement method of the distance to the subject using the lower distance measurement unit 13 is the same as the measurement of the distance to the subject using the upper distance measurement unit 11, and thus, the description thereof will be omitted.

Figure 7:
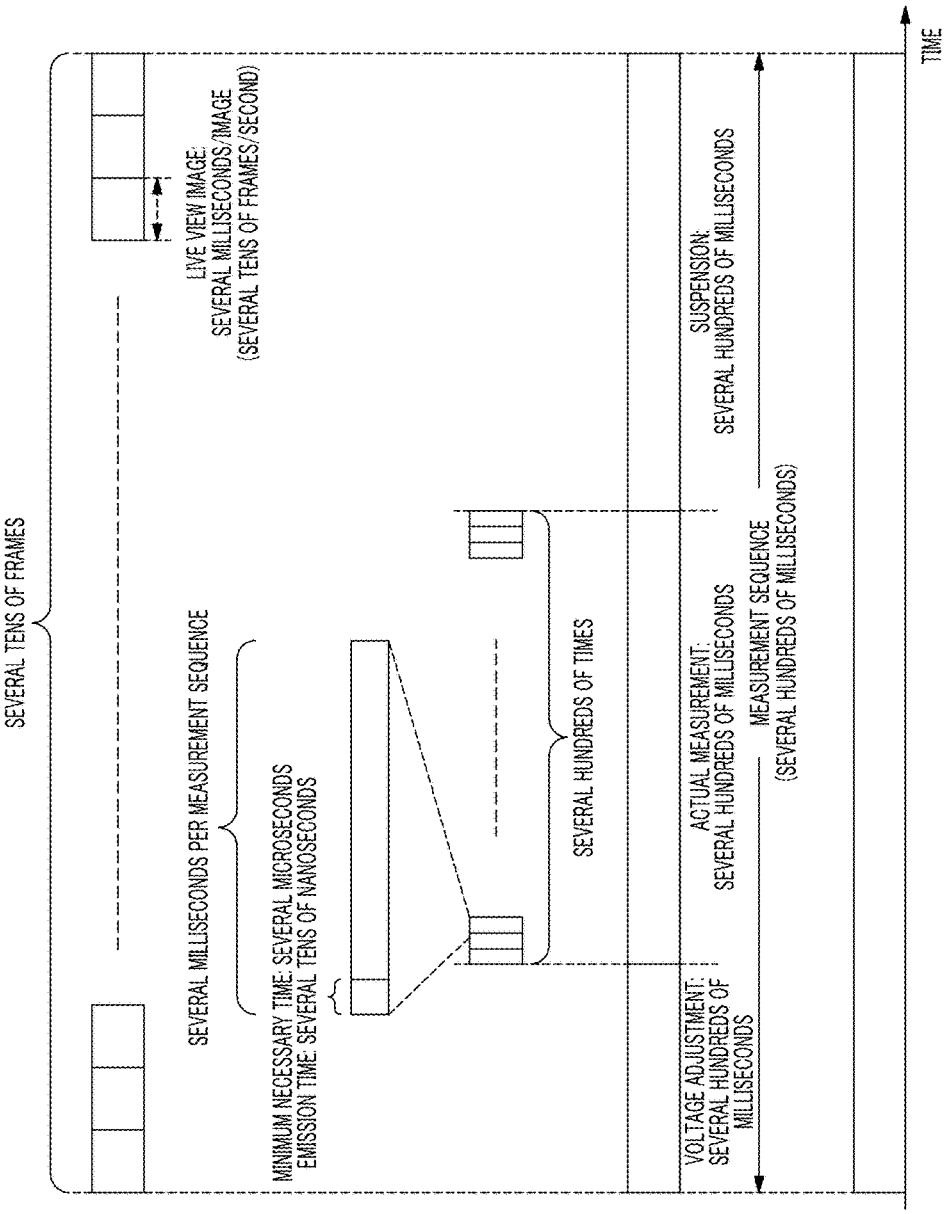
FIG. 7 is a time chart showing an example of a measurement sequence using the distance measurement device according to the first to seventh embodiments.

For example, one measurement sequence using the distance measurement device 10A is prescribed by a voltage adjustment period, an actual measurement period, and a suspension period, as shown in FIG. 7.

The voltage adjustment period is a period during which driving voltages of the LD 22A and the PD 24A are adjusted. The actual measurement period is a period during which the distance to the subject is actually measured. For the actual measurement period, an operation for causing the LD 22A to emit the laser beam and causing the PD 24A to receive the reflection laser beam hundreds of times is repeated several hundreds of times, and the distance to the subject is derived based on the timing when the laser beam is emitted and the timing when the light-receiving signal is acquired. The suspension period is a period during which the driving of the LD 22A and the PD 24A is suspended. Thus, in one measurement sequence, the measurement of the distance to the subject is performed hundreds of times.

In the present embodiment, each of the voltage adjustment period, the actual measurement period, and the suspension period is hundreds of milliseconds.

Figure 8:
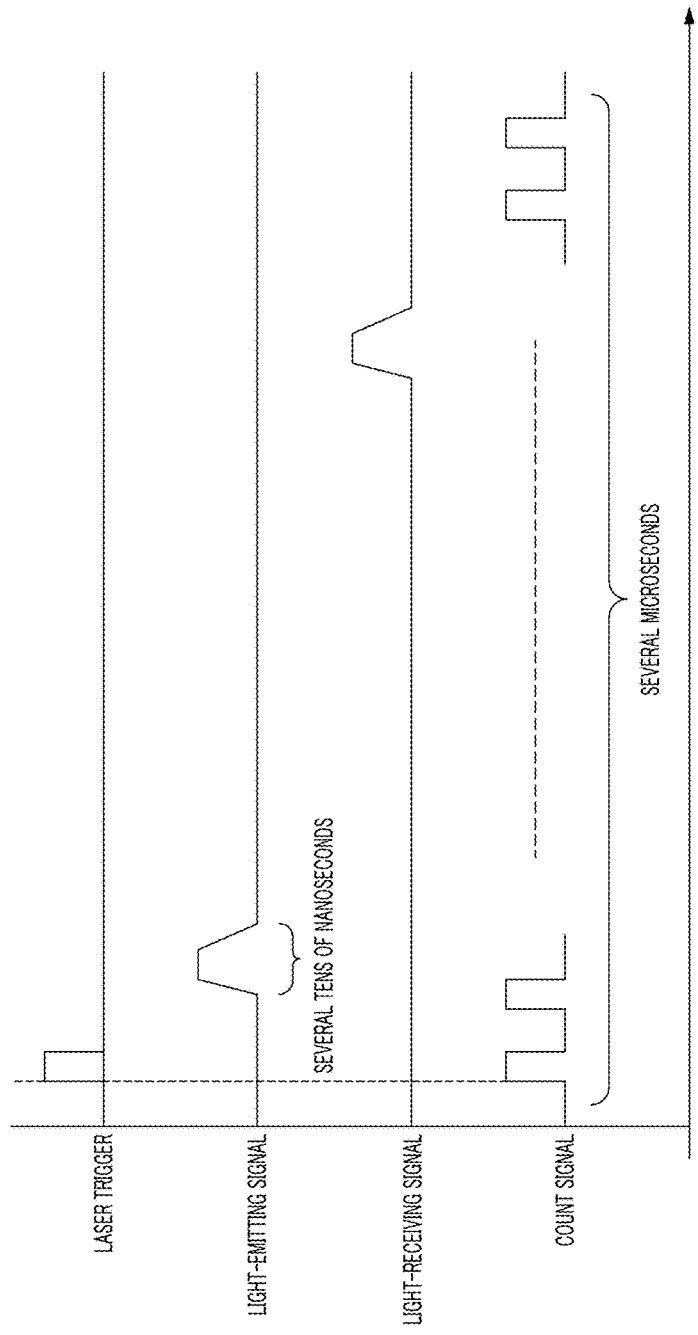
FIG. 8 is a time chart showing an example of a laser trigger, a light-emitting signal, a light-receiving signal, and a count signal required in a case where measurement using the distance measurement device according to the first to seventh embodiments is performed once.

For example, as shown in FIG. 8, count signals that prescribe a timing when the distance measurement control unit 68 outputs an instruction to emit the laser beam and a timing when the distance measurement control unit 68 acquires the light-receiving signal are supplied to the distance measurement control unit 68. In the present embodiment, the count signals are generated by the main control unit 62 and are supplied to the distance measurement control unit 68, but the present embodiment is not limited thereto. The count signals may be generated by a dedicated circuit such as a time counter connected to the busline 84, and may be supplied to the distance measurement control unit 68.

The distance measurement control unit 68 outputs a laser trigger for emitting the laser beam to the LD driver 22C in response to the count signal. The LD driver 22C drives the LD 22A to emit the laser beam in response to the laser trigger.

In the example shown in FIG. 8, a time during which the laser beam is emitted is tens of nanoseconds. A time during which the laser beam emitted to the subject far away from the emission unit 22 by several kilometers is received as the reflection laser beam by the PD 24A is "several kilometers× 2/light speed"=several microseconds. Accordingly, for example, it takes a time of several microseconds as a minimum necessary time to measure the distance to the subject far away by several kilometers, as shown in FIG. 7.

In the present embodiment, for example, although a time during which the measurement is performed once is several milliseconds with consideration for a time during which the laser beam travels in a reciprocating motion as shown in FIG. 7, since the time during which the laser beam travels in the reciprocating motion varies depending on the distance to the subject, the measurement time per one time may vary depending on an assumed distance.

For example, in a case where the distance to the subject is derived based on the measurement values acquired through the measurement performed several hundreds of times in one measurement sequence, the distance measurement control unit 68 derives the distance to the subject by analyzing a histogram of the measurement values acquired through the measurement performed several hundreds of times.

Figure 9:
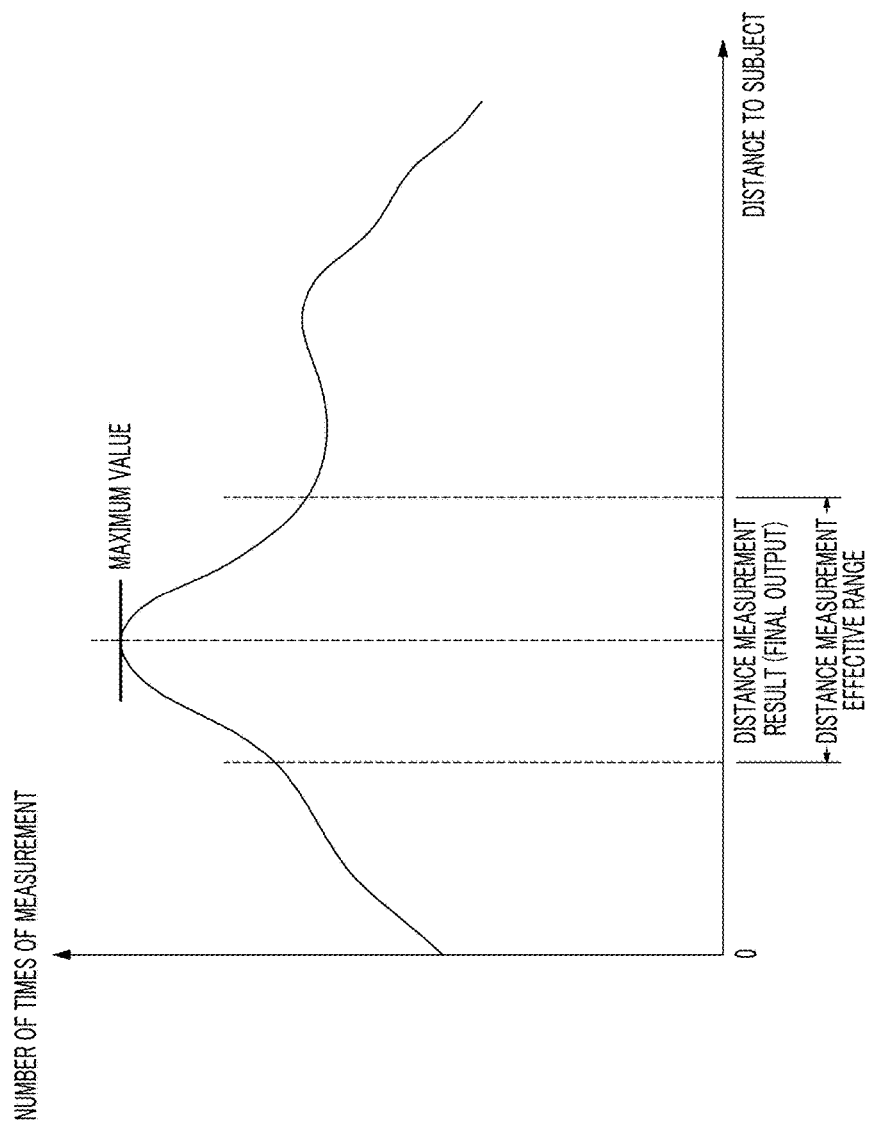
FIG. 9 is a graph showing an example of a histogram (a histogram in a case where a lateral axis represents a distance (measurement value) to the subject and a longitudinal axis represents the number of times the measurement is performed) of measurement values acquired in the measurement sequence using the distance measurement device according to the first to seventh embodiments.

For example, in the histogram of the measurement values acquired through the measurement performed several hundreds of times in one measurement sequence as shown in FIG. 9, a lateral axis represents the distance to the subject, and a longitudinal axis is the number of times the measurement is performed. The distance corresponding to the maximum value of the number of times the measurement is performed is derived as the distance measurement result by the distance measurement control unit 68. The histogram shown in FIG. 9 is merely an example, and the histogram may be generated based on the time during which the laser beam travels in the reciprocating motion (an elapsed time from when the laser beam is emitted to when the laser beam is received) and/or ½ of the time during which the laser beam travels in the reciprocating motion instead of the distance to the subject.

Figure 10:
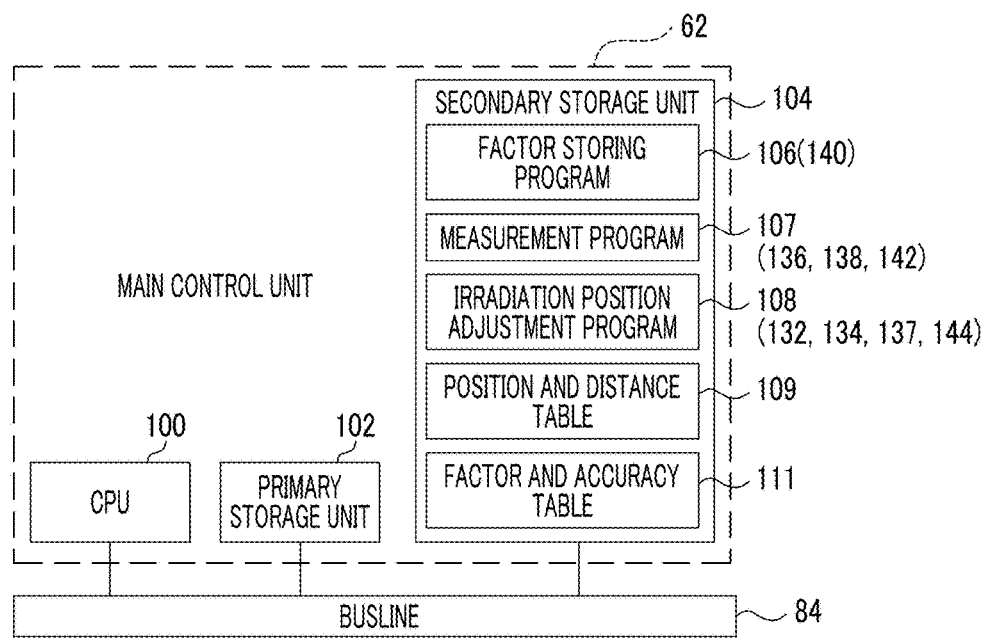
FIG. 10 is a block diagram showing an example of a hardware configuration of a main control unit included in the distance measurement device according to the first to fifth embodiments and the seventh embodiment.

For example, the main control unit 62 includes the CPU 100 which is an example of a control unit, a deriving unit, and an output unit according to the technology of the present disclosure, as shown in FIG. 10. The main control unit 62 includes a primary storage unit 102 and a secondary storage unit 104. The CPU 100 controls the entire distance measurement device 10A. The primary storage unit 102 is a volatile memory used as a work area when various programs are executed. A RAM is used as an example of the primary storage unit 102. The secondary storage unit 104 is a non-volatile memory that previously stores various parameters and/or control programs for controlling the activation of the distance measurement device 10A. Electrically erasable programmable read only memory (EEPROM) and/or a flash memory are used as an example of the secondary storage unit 104. The CPU 100, the primary storage unit 102, and the secondary storage unit 104 are connected to each other through the busline 84.

Figure 11:
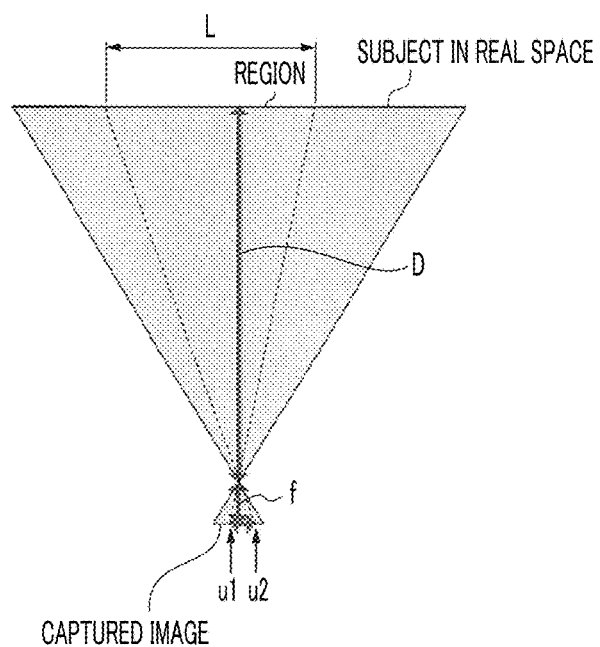
FIG. 11 is an explanatory diagram for describing a method of measuring a dimension (length) of a designated region.

Incidentally, the distance measurement device 10A has the dimension deriving function. For example, as shown in FIG. 11, the dimension deriving function refers to a function of deriving a length L of a region in a real space included in the subject based on addresses u1 and u2 of the designated pixels and a distance D measured by the distance measurement device 10A or deriving an area based on the length L. For example, the "designated pixels" refer to pixels of the imaging element 60 corresponding to two points designated by the user on the live view image. For example, the length L is derived from the following Expression (1). In Expression (1), p is a pitch between pixels included in the imaging element 60, u1 and u2 are addresses of the pixels designated by the user, and f is a focal length of the imaging lens 50.

[Expression 1]

$$L = D \times \left\{ \frac{p(u1 - u2)}{f} \right\} \quad (1)$$

Expression (1) is an expression used on the assumption that a target as a dimension deriving target is captured in a state in which the target faces the imaging lens 50 in front view. Accordingly, in the distance measurement device 10A, for example, in a case where the subject including the target as the dimension deriving target is captured in a state in which the target does not face the imaging lens 50 in front view, a projection conversion process is performed. For example, the projection conversion process refers to a process of converting the captured image acquired through the imaging and/or an image of a square portion of the captured image into a facing view image based on the square image included in the captured image by using the known technology such as affine transformation. The facing view image refers to an image in a state in the subject faces the imaging lens 50 in front view. The addresses u1 and u2 of the pixels of the imaging element 60 are designated through the facing view image, and the length L is derived from Expression (1).

As stated above, it is preferable that an in-image irradiation position is derived with high accuracy and is ascertained together with the distance by the user in order to accurately derive the length L of the region in the real space based on the addresses u1 and u2. The reason is that the derived length L is completely different from the actual length in a case where it is assumed that the in-image irradiation position and the irradiation position of the laser beam in the real space are positions on planes of which orientations and positions are different.

In order to derive the in-image irradiation position with high accuracy, a method of causing the distance measurement device 10A to perform a data acquisition process for deriving the irradiation position (see FIG. 19) to be described is considered. For example, in a case where the data acquisition process for deriving the irradiation position is performed by the distance measurement device 10A, position and distance correspondence information is acquired as deriving data for deriving a parameter (see Table 1) used in the deriving of the in-image irradiation position based on the distance measured by utilizing the distance measurement system function.

Figure 20:
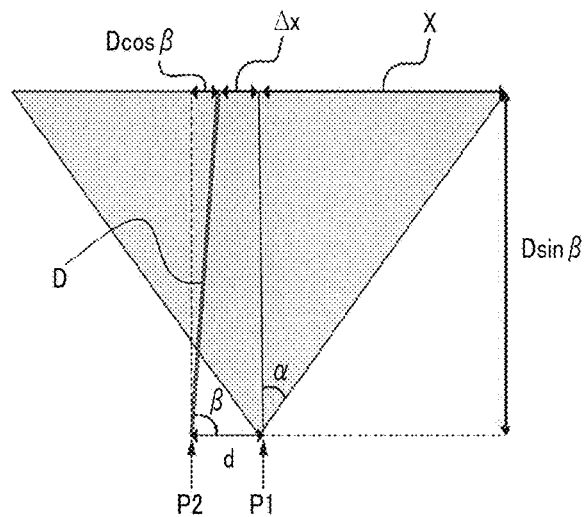
FIG. 20 is an explanatory diagram for describing a parameter that influences an in-image irradiation position.

In the present embodiment, the parameters refer to a half angle of view α, an emission angle β, and an inter-reference-point distance d, as shown in FIG. 20. The half angle of view α refers to half of the angle of view on the subject captured by the imaging device 14. The emission angle β refers to an angle at which the laser beam is emitted from the emission unit 22. The inter-reference-point distance d refers to a distance between a first reference point P1 prescribed for the imaging device 14 and a second base reference point P2 prescribed for the distance measurement unit 12. A main point of the imaging lens 50 is used as an example of the first reference point P1. A point previously set as an origin of coordinates capable of specifying a position of the distance measurement unit 12 in a three-dimensional space is used as an example of the second reference point P2. Specifically, an end of front-view left and right ends of the object lens 22B or one vertex of a housing (not shown) of the upper distance measurement unit 11 in a case where the housing has a cuboid shape.

Incidentally, according to the dimension deriving method of the related art, in a case where the imaging and the distance measurement are performed once, a dimension in the real space related to only one target designated as a dimension deriving target is derived. Thus, in a case where a plurality of targets desired by the user is present as the dimension deriving target in the captured image acquired by performing the imaging once, the targets are required to be designated one by one whenever the imaging and the distance measurement are performed, and thus, it takes effort to derive the dimension.

For example, in the distance measurement device 10A, the secondary storage unit 104 stores a factor storing program 106, a measurement program 107, and an irradiation position adjustment program 108, as shown in FIG. 10. The factor storing program 106, the measurement program 107, and the irradiation position adjustment program 108 are examples of a distance measurement program according to the technology of the present disclosure. In the first embodiment, the factor storing program, the measurement program, and the irradiation position adjustment program are referred to as the "program" without being assigned the references for the sake of convenience in description in a case where it is not necessary to distinguish between the factor storing program 106, the measurement program 107, and the irradiation position adjustment program 108.

Figures 12, 13:
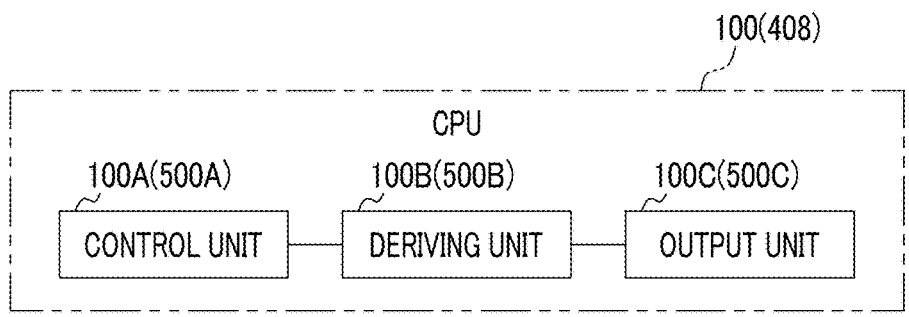
FIG. 12 is a functional block diagram showing an example of functions of main parts realized by a CPU of the distance measurement device according to the first to seventh embodiments.
FIG. 13 is a conceptual diagram showing an example of a position and distance table according to the first to seventh embodiments.

For example, the CPU 100 is operated as a control unit 100A, a deriving unit 100B, and an output unit 100C shown in FIG. 12 by reading the program out of the secondary storage unit 104, loading the program into the primary storage unit 102, and executing the program.

The control unit 100A controls the imaging device 14 to image the subject in an angle of view which includes the irradiation positions of the laser beams used in the actual measurement of the plurality of distances using the individual distance measurement units onto the subject.

The deriving unit 100B derives dimensions in the real space region corresponding to an interval between a plurality of pixels based on the distance regarding the in-actual-image irradiation position corresponding to the irradiation position of the laser beam used in the actual measurement, within the actual image acquired by performing the actual imaging by the imaging device 14 among the plurality of distances actually measured by using the individual distance measurement units, the interval between the plurality of pixels, and the focal length of the imaging device 14. The in-actual-image irradiation position is an example of the in-image irradiation position according to the present invention.

The "interval between the plurality of pixels" means an interval between the plurality of pixels associated with the in-actual-image irradiation position in the actual captured image. The interval between the plurality of pixels is designated for every distance (in other words, for every in-actual-image irradiation position) measured by using the individual distance measurement units.

The output unit 100C derives derivation accuracy corresponding to an irradiation position influence factor which is actually present in the distance measurement device 10A based on a factor and accuracy table 111 (see FIG. 14) to be described below, and outputs information based on the derived derivation accuracy. The irradiation position influence factor is a factor that influences the in-image irradiation position. For example, the irradiation position influence factor includes the replacement of the imaging lens 50 and/or the change of the angle of view.

The derivation accuracy output by the output unit 100C is accuracy of the dimension derived by the deriving unit 100B. In the present embodiment, the information based on the derivation accuracy output by the output unit 100C is an error of the dimension derived by the deriving unit 100B.

For example, the secondary storage unit 104 stores a position and distance table 109 and the factor and accuracy table 111 as shown in FIG. 10.

For example, the position and distance table 109 stores position and distance correspondence information related to the corresponding individual distance measurement unit as shown in FIG. 13. In the example shown in FIG. 13, the position and distance correspondence information related to the upper distance measurement unit 11 and the position and distance correspondence information related to the lower distance measurement unit 13 are represented as examples of the position and distance correspondence information related to the individual distance measurement unit. The position and distance correspondence information is information acquired by associating the distance acquired by performing processes of step 254D and 254E to be described with the in-provisional-image irradiation position for every in-provisional-image irradiation position specified by performing a process of step 254I to be described below.

In the example shown in FIG. 13, in-provisional-image irradiation positions $X_1$, $X_2$, and $X_3$ and distances $D_1$, $D_2$, and $D_3$ are associated with the upper distance measurement unit 11, and the in-provisional-image irradiation positions $X_1$, $X_2$, and $X_3$ and the distances $D_1$, $D_2$, and $D_3$ are updated whenever the data acquisition process for deriving the irradiation position is performed. In the example shown in FIG. 13, in-provisional-image irradiation positions $X_4$, $X_5$, and $X_6$ and distances $D_4$, $D_5$, and $D_6$ are associated with the lower distance measurement unit 13, and the in-provisional-image irradiation positions $X_4$, $X_5$, and $X_6$ and the distances $D_4$, $D_5$, and $D_6$ are updated whenever the data acquisition process for deriving the irradiation position is performed.

The in-provisional-image irradiation position described above refers to a position, which corresponds to the irradiation position of the laser beam onto the subject, within a provisional image acquired by performing the provisional imaging on the subject by the imaging device 14 whenever each of a plurality of distances is provisionally measured by the individual distance measurement units and the distance measurement control unit 68.

In the present embodiment, the irradiation-position pixel coordinates of the in-actual-image irradiation position, the in-provisional-image irradiation position, and an in-live-view-image irradiation position are derived by the CPU 100, and the in-image irradiation position is specified from the derived irradiation-position pixel coordinates. Hereinafter, the in-actual-image irradiation position, the in-provisional-image irradiation position, and the in-live-view-image irradiation position are simply referred to as the "in-image irradiation position" in a case where it is not necessary to distinguish between the in-actual-image irradiation position and the in-provisional-image irradiation position for the sake of convenience in description.

The in-live-view-image irradiation position means a position, which corresponds to the irradiation position of the laser beam used in the measurement, within the live view image acquired through the imaging using the imaging device 14. The in-live-view-image irradiation position is an example of the in-image irradiation position according to the present invention, and is derived by the same deriving method as the deriving method of the in-actual-image irradiation position described above.

The position and distance correspondence information is an example of information indicating a first correspondence relation according to the technology of the present disclosure. The first correspondence relation according to the technology of the present disclosure is a correspondence relation between the in-provisional-image irradiation positions within the provisional image acquired by performing the provisional imaging on the subject whenever each of the plurality of distances is provisionally measured with the distances which are provisionally measured by the individual distance measurement unit and the distance measurement control unit 68 by using the laser beams corresponding to the in-provisional-image irradiation positions.

That is, the in-provisional-image irradiation position specified by the position and distance correspondence information is an example of the "in-provisional-image irradiation position within the provisional image acquired by performing the provisional imaging on the subject image by the imaging unit whenever each of the plurality of distances is provisionally measured" in the first correspondence relation according to the technology of the present disclosure. The distance specified by the position and distance correspondence information is an example of the "distance which is provisionally measured by the measurement unit by using the directional light corresponding to the in-provisional-image irradiation position" in the first correspondence relation according to the technology of the present disclosure.

For example, the factor and accuracy table 111 stores the factor and accuracy correspondence information which is an example of information indicating a second correspondence relation according to the technology of the present disclosure as shown in FIG. 14. The factor and accuracy correspondence information is information acquired by associating an assumption factor assumed as the irradiation position influence factor with the derivation accuracy derived by the deriving unit 100B.

In the present embodiment, the factor and accuracy correspondence information is fixed before the shipment of the distance measurement device 10A is performed. That is, the factor and accuracy table 111 stores the factor and accuracy correspondence information derived from a result of computer simulation based on a design specification of the distance measurement device 10A and/or examination using a real machine of the distance measurement device 10A before the shipment of the distance measurement device 10A is performed.

In the example shown in FIG. 14, derivation accuracy $\delta$, $\epsilon$, $\zeta$, $\eta$, and $\lambda$ in a case where the assumption factor actually occurs are prescribed for the assumption factors. In the example shown in FIG. 14, the change in the angle of view, the replacement of the lens, the replacement of the distance measurement unit, the change in the emission direction, and a manufacturing variation are used as an example of the assumption factor.

The replacement of the lens refers to the replacement of only the imaging lens 50 of the lens unit 16 and the replacement of the lens unit 16 itself. The replacement of the distance measurement unit refers to the replacement of only the object lens of the distance measurement unit 12, and the replacement of the distance measurement unit 12 itself. The change in the angle of view refers to a change in the angle of view by the movement of the zoom lens 52 by pressing the angle-of-view instruction button. The change in the emission direction refers to a change in the direction in which the laser beam is emitted for every individual distance measurement unit. The manufacturing variation is a variation on various characteristics in the manufacturing between a plurality of distance measurement devices 10A of which the types are the same.

(1) . . . (*n*) shown in FIG. 14 are identification codes for identifying that the types of the assumption factors are the same but the contents thereof are different.

For example, the changes in the angle of view (1) . . . (*n*) represent features that the changes in the angle of view are different. Thus, derivation accuracy $\delta_1 \ldots \delta_n$ which are different derivation accuracy are associated with the changes in the angle of view (1) . . . (*n*). A change direction in the angle of view and a difference in the changing amount are used as examples of the features that the changes in the angle of view are different.

For example, the replacements of the lens (1) . . . (*n*) represent features that the replacements of the lens are different. Thus, derivation accuracy $\epsilon_1 \ldots \epsilon_n$ which are different derivation accuracy are associated with the replacements of the lens (1) . . . (*n*). A difference in the focal length of the lens unit 16 is used as examples of the features that the replacements of the lens are different.

For example, the replacements of the distance measurement unit (1) . . . (*n*) represent features that the replacements of the distance measurement unit 12 are different. Thus, derivation accuracy $\zeta_1 \ldots \zeta_n$ which are different derivation accuracy are associated with the replacements of the distance measurement unit (1) . . . (*n*). A difference in the type of the distance measurement unit is used as examples of the features that the replacements of the distance measurement unit 12 are different.

For example, the changes in the emission direction (1) . . . (*n*) represent features that the changes in the emission direction of the laser beam for every individual distance measurement unit are different. Thus, derivation accuracy $\eta_1 \ldots \eta_n$ which are different derivation accuracy are associated with the changes in the emission direction (1) . . . (*n*). For example, a difference in external shapes of the emission units 22 and 30 according to the change of the distance measurement unit 12 with time and/or a difference in the type of the distance measurement unit 12 of which the emission directions of the laser beams are different are used as the features that the changes in the emission direction are different.

The derivation accuracy $\lambda$ uniquely determined for the distance measurement device 10A is associated with a manufacturing variation specific to the distance measurement device 10A.

Next, the actions of the distance measurement device 10A will be described.

Initially, a factor storing process realized by executing the factor storing program 106 in the CPU 100 in a case where a power switch of the distance measurement device 10A is turned on will be described with reference to FIG. 15. Hereinafter, a case where the live view image is displayed on the display unit 86 will be described for the sake of convenience in description. Hereinafter, the irradiation position of the laser beam onto the subject in the real space is referred to as a "real-space irradiation position" for the sake of convenience in description.

Figure 15:
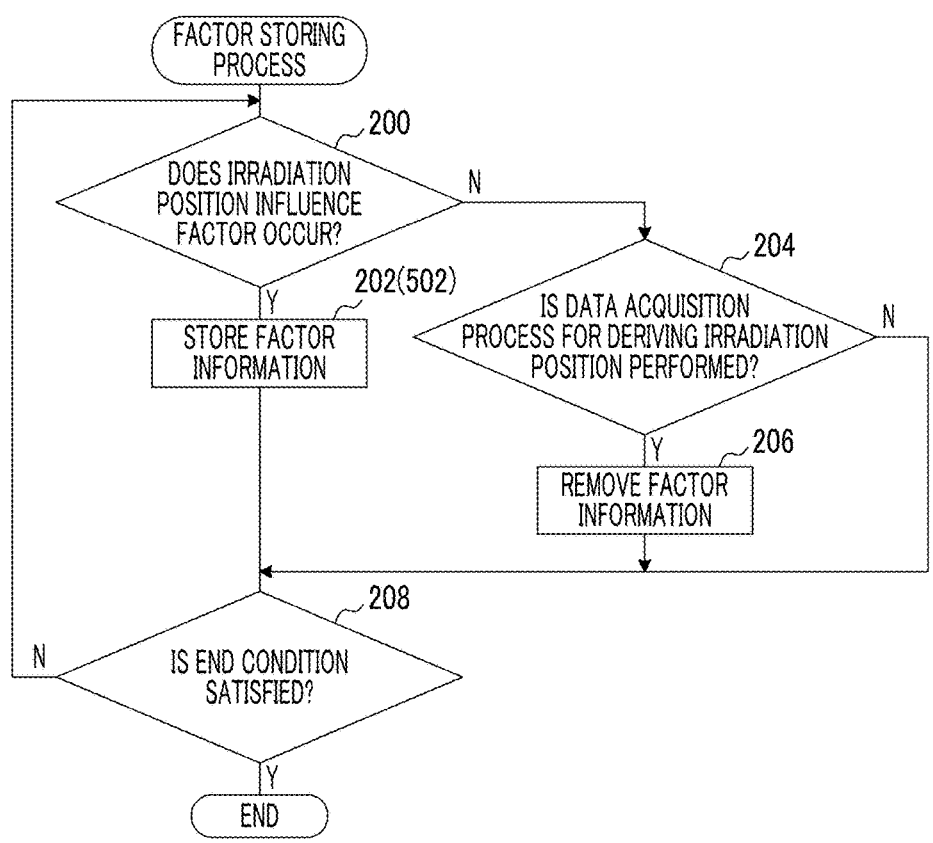
FIG. 15 is a flowchart showing an example of a flow of a factor storing process according to the first to seventh embodiments.

In the factor storing process shown in FIG. 15, the output unit 100C initially determines whether or not a new irradiation position influence factor occurs in step 200. In a case where the new irradiation position influence factor occurs in step 200, the determination result is positive, and the process proceeds to step 202. In a case where the new irradiation position influence factor does not occur in step 200, the determination result is negative, and the process proceeds to step 204.

In step 202, the output unit 100C stores the factor information indicating the occurred new irradiation position influence factor and the feature of the occurred new irradiation position influence factor in the secondary storage unit 104 in a sequence of time for every individual distance measurement unit. Thereafter, the process proceeds to step 208.

For example, the feature of the irradiation position influence factor may be a feature of the change in the angle of view, a feature of the replacement of the lens, a feature of the replacement of the distance measurement unit, and a feature of the change in the emission direction, and may be the same feature as the feature of the corresponding assumption factor. The "same" mentioned herein means that the features are completely the same and are the same in a predetermined error range.

In step 204, the output unit 100C determines whether or not the data acquisition process for deriving the irradiation position (see FIG. 19) is performed. In a case where the data acquisition process for deriving the irradiation position is performed in step 204, the determination result is positive, and the process proceeds to step 206. In a case where the data acquisition process for deriving the irradiation position is not performed in step 204, the determination is negative, and the process proceeds to step 208. Even in a case where the factor information is not stored in the secondary storage unit 104 in step 204, the determination result is negative, and the process proceeds to step 208.

In step 206, the output unit 100C removes the factor information stored in the secondary storage unit 104. Thereafter, the process proceeds to step 208.

In step 208, the output unit 100C determines whether or not an end condition which is a condition in which the actual factor storing process is ended is satisfied. For example, in the actual factor storing process, the end condition is a condition in which an instruction to end the actual factor storing process is received through the touch panel 88.

In a case where the end condition is not satisfied in step 208, the determination result is negative, and the process proceeds to step 200. In a case where the end condition is satisfied in step 208, the determination result is positive, and the actual factor storing process is ended.

Hereinafter, a measurement process realized by executing the measurement program 107 in the CPU 100 in a case where a power switch of the distance measurement device 10A is turned on will be described with reference to FIGS. 16 to 19.

Hereinafter, a case where the live view image is displayed on the display unit 86 will be described for the sake of convenience in description. Hereinafter, for the sake of convenience in description, it will be described on the assumption that the distance deriving mode or the dimension deriving mode is set as the operation mode of the distance measurement system function. Hereinafter, for the sake of convenience in description, it will be described on the assumption that the position of the imaging device 14 is fixed exception that the provisional measurement and the provisional imaging are performed in the data acquisition process for deriving the irradiation position to be described below. Hereinafter, for the sake of convenience in description, it will be described on the assumption that the angle of view is already determined. Hereinafter, for the sake of convenience in description, it will be described on the assumption that the upper distance measurement unit 11 and the lower distance measurement unit 13 emit the laser beams in synchronization with each other.

Hereinafter, the irradiation position of the laser beam onto the subject in the real space is referred to as a "real-space irradiation position" for the sake of convenience in description. Hereinafter, for the sake of convenience in description, it will be described on the assumption that the subject is an external wall portion of an office building and the external wall portion of the office building is a planar wall portion (a planar region) having a square window and/or a square pattern. The "planar" mentioned herein is not limited to the plane, and includes a planar shape in a range in which slightness roughness due to a window or an air vent is allowed. For example, a plane or a planar shape recognized as the "planar" may be used through visual observation or by an existing image analysis technology.

Figure 21:
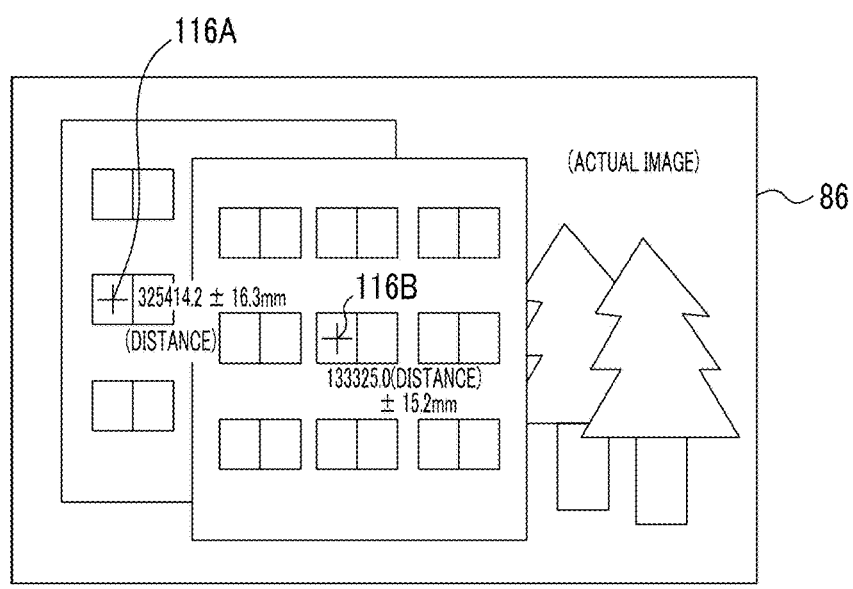
FIG. 21 is a screen diagram showing an example of a screen in which an actual image, a distance, an error, and an irradiation position mark are displayed on a display unit according to the first to seventh embodiments.

Hereinafter, for the sake of convenience in description, it will be described on the assumption that the external wall portion of the office building which is the subject is captured by the distance measurement device 10A in a state in which the external wall portion does not face the imaging lens 50 in front view. Hereinafter, for the sake of convenience in description, it will be described on the assumption that external wall surfaces of different office buildings arranged in the front and the rear in an imaging direction are irradiated with laser beams one by one as shown in FIG. 21.

Although it will be described below that an in-image irradiation position in an X direction which is a front-view left-right direction for the imaging surface of the imaging element 60 included in the imaging device 14 is derived for the sake of convenience in description, an in-image irradiation position in a Y direction which is a front-view upper-lower direction for the imaging surface of the imaging element 60 included in the imaging device 14 is similarly derived. As mentioned above, the in-image irradiation positions ultimately output by deriving the in-image irradiation positions in the X direction and the Y direction are expressed by two-dimensional coordinates.

Hereinafter, for the sake of convenience in description, the front-view left-right direction for the imaging surface of the imaging element 60 included in the imaging device 14 is referred to as the "X direction" or a "row direction", and the front-view upper-lower direction for the imaging surface of the imaging element 60 included in the imaging device 14 is referred to as the "Y direction" or a "column direction".

Figure 16:
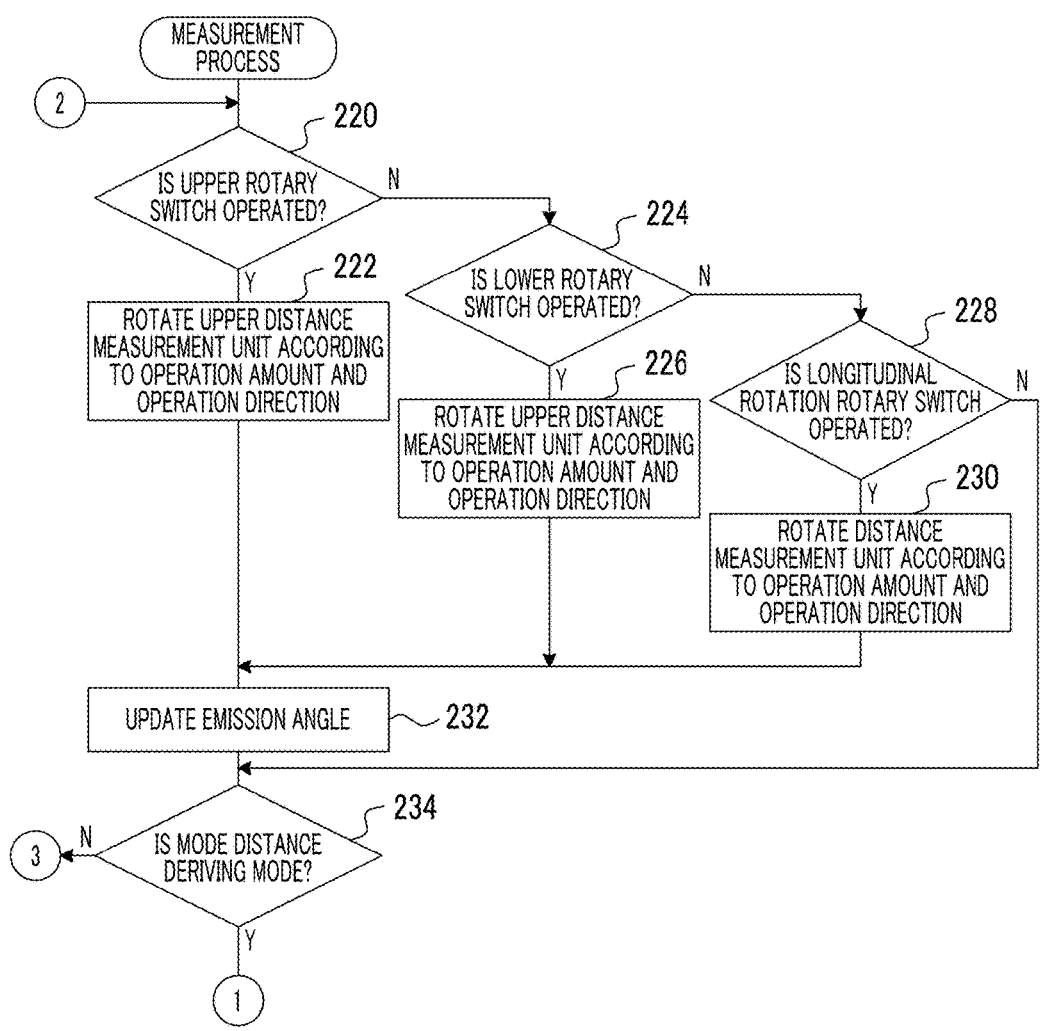
FIG. 16 is a flowchart showing an example of a flow of a measurement process according to the first to third embodiments, the fifth embodiment, and the sixth embodiment.

In the measurement process shown in FIG. 16, the control unit 100A initially determines whether or not the upper rotary switch 90H is operated in step 220. In a case where the upper rotary switch 90H is operated in step 220, the determination result is positive, and the process proceeds to step 222. In a case where the upper rotary switch 90H is not operated in step 220, the determination result is negative, and the process proceeds to step 224.

In step 222, the control unit 100A rotates the upper distance measurement unit 11 in the horizontal direction by activating the upper horizontal rotation mechanism 11A depending on the operation amount and the operation direction of the upper rotary switch 90H, and then the process proceeds to step 232. In a case where the upper rotary switch 90H is operated, the upper distance measurement unit 11 is rotated in the horizontal direction by the rotation amount corresponding to the operation amount within a range in which the real-space irradiation position in a case where the laser beam is emitted by the upper distance measurement unit 11 is included in the angle of view set at a current point of time.

In step 224, the control unit 100A determines whether or not the lower rotary switch 90I is operated. In a case where the lower rotary switch 90I is operated in step 224, the determination result is positive, and the process proceeds to step 226. In a case where the lower rotary switch 90I is not operated in step 224, the determination result is negative, and the process proceeds to step 228.

In step 226, the control unit 100A rotates the lower distance measurement unit 13 in the horizontal direction by activating the lower horizontal rotation mechanism 13A depending on the operation amount and the operation direction of the lower rotary switch 90I. Thereafter, the process proceeds to step 232. In a case where the lower rotary switch 90I is operated, the lower distance measurement unit 13 is rotated in the horizontal direction by the rotation amount corresponding to the operation amount in a range in which the real-space irradiation position in a case where the laser beam is emitted by the lower distance measurement unit 13 is included in the angle of view set at a current point of time.

In step 228, the control unit 100A determines whether or not the longitudinal rotation rotary switch 90J is operated. In a case where the longitudinal rotation rotary switch 90J is operated in step 228, the determination result is positive, and the process proceeds to step 230. In a case where the longitudinal rotation rotary switch 90J is not operated in step 228, the determination result is negative, and the process proceeds to step 234. In a case where the longitudinal rotation rotary switch 90J is operated, the distance measurement unit 12 is rotated in the longitudinal direction by the rotation amount corresponding to the operation amount in a range in which the real-space irradiation position in a case where the laser beam is emitted by the distance measurement unit 12 is included in the angle of view set at a current point of time.

In step 230, the control unit 100A rotates the distance measurement unit 12 in the longitudinal direction by activating the longitudinal rotation mechanism 15 depending on the operation amount and the operation direction of the longitudinal rotation rotary switch 90J. Thereafter, the process proceeds to step 232.

In step 232, the control unit 100A updates the emission angle β according to the rotation direction and the rotation amount of the individual distance measurement unit. Thereafter, the process proceeds to step 234.

The "rotation direction and the rotation amount of the individual distance measurement unit" is roughly divided into the rotation direction and the rotation amount of the upper distance measurement unit 11 and the rotation direction and the rotation amount of the lower distance measurement unit 13. The "rotation direction and the rotation amount of the upper distance measurement unit 11" mean the rotation direction and the rotation amount of the upper distance measurement unit 11 in a case where the upper distance measurement unit 11 is rotated in the horizontal direction and the rotation direction and the rotation amount of the upper distance measurement unit 11 in a case where the upper distance measurement unit 11 is rotated in the longitudinal direction. The "rotation direction and the rotation amount of the lower distance measurement unit 13" mean the rotation direction and the rotation amount of the lower distance measurement unit 13 in a case where the lower distance measurement unit 13 is rotated in the horizontal direction and the rotation direction and the rotation amount of the lower distance measurement unit 13 in a case where the upper distance measurement unit 11 is rotated in the longitudinal direction.

In step 234, the deriving unit 100B determines whether or not the distance deriving mode is set. In a case where the distance deriving mode is not set in step 234, the determination result is negative, and the process proceeds to step 258 shown in FIG. 17. In a case where the distance deriving mode is set in step 234, the determination result is positive, and the process proceeds to step 236 shown in FIG. 18.

In step 236, the deriving unit 100B determines whether or not the actual measurement and actual imaging button 90A is turned on. In a case where the actual measurement and actual imaging button 90A is not turned on in step 236, the determination result is negative, and the process proceeds to step 252. In a case where the actual measurement and actual imaging button 90A is turned on in step 236, the determination result is positive, and the process proceeds to step 238.

In step 238, the deriving unit 100B performs the actual measurement for every individual distance measurement unit by controlling the distance measurement control unit 68. The deriving unit 100B performs the actual imaging by controlling the imaging element driver 74 and the image signal processing circuit 76. Thereafter, the process proceeds to step 240.

In step 240, the deriving unit 100B derives the parameter based on the corresponding position and distance correspondence information stored in the position and distance table 109 for every individual distance measurement unit. Thereafter, the process proceeds to step 242.

The parameter derived by performing the process of step 240 is an uncertain parameter at a current point of time, and varies for every irradiation position influence factor as represented in the following Table 1.

TABLE 1

| Irradiation position influence factor | Parameter |
|---|---|
| Replacement of lens | Half angle of view α, emission angle β |
| Replacement of distance measurement unit | Emission angle β, inter-reference-point distance d |
| Change in angle of view | Half angle of view α |
| Change in emission direction | Emission angle β |

The number of uncertain parameters may be one to three. For example, in the example shown in Table 1, in a case where both the replacement of the distance measurement unit and the change in the angle of view are performed, the number of uncertain parameters is three such as the half angle of view α, the emission angle β, and the inter-reference-point distance d. In a case where only the replacement of the lens is performed, the number of uncertain parameters is two such as the half angle of view α and the emission angle β. In a case where only the replacement of the distance measurement unit is performed, the number of uncertain parameters is two such as the emission angle β, and the inter-reference-point distance d. In a case where only the change in the angle of view is performed, the number of uncertain parameters is one such as the half angle of view α. In a case where only the change in the emission direction is performed, the number of uncertain parameters is one such as the emission angle β.

For example, the parameters are derived from the following Expressions (2) to (4) in step 240. In Expressions (2) and (3), the distances D are distances specified from the position and distance correspondence information, and the distances specified from the position and distance correspondence information related to the upper distance measurement unit 11 are the distances $D_1$, $D_2$, and $D_3$ in the example shown in FIG. 13. In the example shown in FIG. 13, the distances specified from the position and distance correspondence information related to the lower distance measurement unit 13 are the distances $D_4$, $D_5$, and $D_6$. In Expression (4), "row-direction pixels of the irradiation positions" are in-image irradiation positions in a row direction, and "half of the number of row-direction pixels" is half of the number of pixels in the row direction in the imaging element 60. For example, in the present embodiment, the half angle of view $\alpha$ is derived from the following Expression (5). In Expression (5), "f" is a focal length. For example, it is preferable that the focal length f substituted into Expression (5) is a focal length used in the actual imaging of step 230.

[Expression 2]

$$\Delta x = d - D \cos \beta \quad (2)$$

[Expression 3]

$$X = D \sin \beta \tan \alpha \quad (3)$$

[Expression 4]

(row-direction pixel of irradiation position):(half of number of row-direction pixels)=$\Delta x$ : $X$ \quad (4)

[Expression 5]

$$\alpha = \operatorname{atan}\left\{\frac{(\text{dimension of imaging pixel})}{2 \times f}\right\} \quad (5)$$

In step 240, the in-provisional-image irradiation positions specified from the position and distance correspondence information stored in the position and distance table 109 are the "row-direction pixels of the irradiation positions". In the example shown in FIG. 13, the in-provisional-image irradiation positions specified from the position and distance correspondence information related to the upper distance measurement unit 11 are $X_1$, $X_2$, and $X_3$. In the example shown in FIG. 13, the in-provisional-image irradiation positions specified from the position and distance correspondence information related to the lower distance measurement unit 13 are $X_4$, $X_5$, and $X_6$. The distances specified from the position and distance correspondence information stored in the position and distance correspondence table 109 are used as the distances D in Expressions (2) and (3) for every corresponding in-provisional-image irradiation position (corresponding "row-direction pixel of the irradiation position"). The parameter closest to each of the "row-direction pixels of the irradiation positions" is derived by the deriving unit 100B.

The deriving method of the parameter will be described using the position and distance correspondence information related to the upper distance measurement unit 11 of the position and distance correspondence information items stored in the position and distance table 109 shown in FIG. 13.

For example, the in-provisional-image irradiation position $X_1$ is used as the "row-direction pixel of the irradiation position" in Expression (4), the distance $D_1$ is used as the distance D in Expressions (2) and (3). The in-provisional-image irradiation position $X_2$ is used as the "row-direction pixel of the irradiation position" in Expression (4), the distance $D_2$ is used as the distance D in Expressions (2) and (3). The in-provisional-image irradiation position $X_3$ is used as the "row-direction pixel of the irradiation position" in Expression (4), the distance $D_3$ is used as the distance D in Expressions (2) and (3). The half angle of view $\alpha$, the emission angle $\beta$, and the inter-reference-point distance d closest to the in-provisional-image irradiation positions $X_1$, $X_2$, and $X_3$ are derived from Expressions (2) to (4).

In step 242, the deriving unit 100B derives the in-actual-image irradiation position for every individual distance measurement unit based on the parameter derived in step 240. Thereafter, the process proceeds to step 244.

For example, the in-actual-image irradiation position is derived from Expressions (2) to (4) in step 242. That is, the parameter derived in step 240 is substituted into Expressions (2) to (4), and the distance acquired by performing the actual measurement in step 238 is substituted as the distance D into Expressions (2) to (4). Accordingly, the "row-direction pixel of the irradiation position" is derived as the in-actual-image irradiation position.

In step 244, the output unit 100C derives derivation accuracy associated with a specific assumption factor from the factor and accuracy correspondence information for every individual distance measurement unit. The output unit 100C derives an error of the in-actual-image irradiation position derived by the deriving unit 100B for every individual distance measurement unit based on the derived derivation accuracy. Thereafter, the process proceeds to step 246.

In step 244, the specific assumption factor is an assumption factor corresponding to the irradiation position influence factor which is actually present in the distance measurement device 10A. Specifically, the specific assumption factor is an assumption factor of the assumption factors included in the factor and accuracy correspondence information, which corresponds to the factor information stored in the secondary storage unit 104 at a current point of time and the manufacturing variation of the assumption factor included in the factor and accuracy correspondence information. In a case where the factor information is not stored in the secondary storage unit 104 at the current point of time, the specific assumption factor is the manufacturing variation of the assumption factors included in the factor and accuracy correspondence information.

For example, in a case where the assumption factor corresponding to the factor information stored in the secondary storage unit 104 at the current point of time is the change in the angle of view (1), the derivation accuracy corresponding to the specific assumption factor are the derivation accuracy $\delta_1$, and $\lambda$. For example, in a case where the factor information is not stored in the secondary storage unit 104 at the current point of time, the derivation accuracy corresponding to the specific assumption factor is the derivation accuracy $\lambda$.

For example, in a case where the specific assumption factors are the change in the angle of view (1) and the manufacturing variation as stated above in step 244, the derivation accuracy $\delta_1$ and $\lambda$ are integrated, and the errors of the in-actual-image irradiation positions are derived for the individual distance measurement units based on the integrated derivation accuracy. For example, in a case where the specific assumption factor is the manufacturing variation, the errors of the in-actual-image irradiation position are derived for the individual distance measurement units based on the derivation accuracy $\lambda$. That is, in a case where the actual measurement process is performed by activating the distance measurement device 10A for the first time after the shipment of the distance measurement device 10A is performed, the errors of the in-actual-image irradiation positions are derived for the individual distance measurement units based on the derivation accuracy λ.

For example, the derivation accuracy acquired by integrating the multiple derivation accuracy is derivation accuracy acquired by a dependent variable integrated by a polynomial including the derivation accuracy associated with the specific assumption factor as an independent variable. The following Expression (6) is used as an example of the polynomial. In Expression (6), Q is a dependent variable, and F(δ), G(ε), H(ζ), J(η), and K(λ) are functions. In Expression (6), F(δ) is a function prescribed by the derivation accuracy δ which is an independent variable. In Expression (6), G(ε) is a function prescribed by the derivation accuracy ε which is an independent variable. In Expression (6), H(ζ) is a function prescribed by the derivation accuracy ζ which is an independent variable. In Expression (6), J(η) is a function prescribed by the derivation accuracy η which is an independent variable. In Expression (6), K(λ) is a function prescribed by the derivation accuracy λ which is an independent variable.

[Expression 6]

$$Q=F(δ)+G(ε)+H(ζ)+J(η)+K(λ) \qquad (6)$$

The derivation accuracy acquired by integrating the multiple derivation accuracy may be the dependent variable Q of Expression (6), or may be a value acquired by adjusting the dependent variable Q. For example, the value acquired by adjusting the dependent variable Q is a value acquired by multiplying the dependent variable Q by a coefficient (for example, a coefficient instructed by the user through the touch panel 88).

For example, in step 244, the error is derived based on a position error table (not shown) acquired by previously associating the derivation accuracy and the coordinates of the in-image irradiation positions and the errors corresponding to the derivation accuracy and the coordinates of the in-image irradiation positions, but the technology of the present disclosure is not limited thereto. For example, the error may be derived based on a calculation expression in which the derivation accuracy and the coordinates of the in-image irradiation positions are used as the independent variables and the errors are used as the dependent variables.

For example, in step 246, the output unit 100C displays the actual image, the distance, the error, and irradiation position marks 116A and 116B on the display unit 86 as shown in FIG. 21. Thereafter, the process proceeds to step 248.

In the example shown in FIG. 21, the actual image displayed on the display unit 86 is an image acquired through the actual imaging by performing the process of step 238.

The irradiation position mark 116A is a mark indicating the in-actual-image irradiation position derived by performing the process of step 242 based on the laser beam emitted by the upper distance measurement unit 11. The irradiation position mark 116B is a mark indicating the in-actual-image irradiation position derived by performing the process of step 242 based on the laser beam emitted by the lower distance measurement unit 13. Hereinafter, the irradiation position marks are referred to as the irradiation position mark 116 in a case where it is not necessary to distinguish between the irradiation position marks 116A and 116B.

For example, in a case where the process of step 246 is performed, the distance for every individual distance measurement unit is displayed on the display unit 86 as shown in FIG. 21. The distance for every individual distance measurement unit is roughly divided into the distance measured using the upper distance measurement unit 11 and the distance measured using the lower distance measurement unit 13. The distance measured using the upper distance measurement unit 11 is a distance measured by performing the process of step 238 based on the laser beam emitted by the upper distance measurement unit 11. The distance measured using the lower distance measurement unit 13 is a distance measured by performing the process of step 238 based on the laser beam emitted by the lower distance measurement unit 13.

In the example shown in FIG. 21, a value of "325414.2" corresponds to the distance measured using the upper distance measurement unit 11, and a unit is millimeters. In the example shown in FIG. 21, a value of "133325.0" corresponds to the distance measured using the lower distance measurement unit 13, and a unit is millimeters.

For example, in a case where the process of step 246 is performed, the error for every individual distance measurement unit is displayed on the display unit 86, as shown in FIG. 21. The error for every individual distance measurement unit is roughly divided into an error of the in-actual-image irradiation position using the upper distance measurement unit 11 and an error of the in-actual-image irradiation position using the lower distance measurement unit 13. The error of the in-actual-image irradiation position using the upper distance measurement unit 11 is an error of the in-actual-image irradiation position derived by performing the process of step 242 based on the laser beam emitted by the upper distance measurement unit 11. The error of the in-actual-image irradiation position using the lower distance measurement unit 13 is an error of the in-actual-image irradiation position derived by performing the process of step 242 based on the laser beam emitted by the lower distance measurement unit 13.

In the example shown in FIG. 21, a value of "±16.3" corresponds to the error of the in-actual-image irradiation position using the upper distance measurement unit 11, and a unit is millimeters. In the example shown in FIG. 21, a value of "±15.2" corresponds to the error of the in-actual-image irradiation position using the lower distance measurement unit 13, and a unit is millimeters.

In step 248, the output unit 100C determines whether or not at least one of the errors derived by performing the process of step 244 or step 286 to be described below for the individual distance measurement units exceeds a threshold value. The threshold value is a preferable value on which the data acquisition process for deriving the irradiation position (see FIG. 19) is to be performed, and is a value previously acquired based on a result of computer simulation based on a design specification of the distance measurement device 10A and/or examination using a real machine of the distance measurement device 10A. A case where the error derived by performing the process of step 244 or step 286 exceeds the threshold value in step 248 means that the derivation accuracy of the in-actual-image irradiation position using the deriving unit 100B is less than predetermined derivation accuracy.

In a case where all the errors derived for the individual distance measurement units by performing the process of step 244 or step 286 are equal to or less than the threshold values in step 248, the determination result is negative, and the process proceeds to step 252. In a case where at least one of the errors derived by performing the process of step 244 or step 286 exceeds the threshold value in step 248, the determination result is positive, and the process proceeds to step 250.

Figure 22:
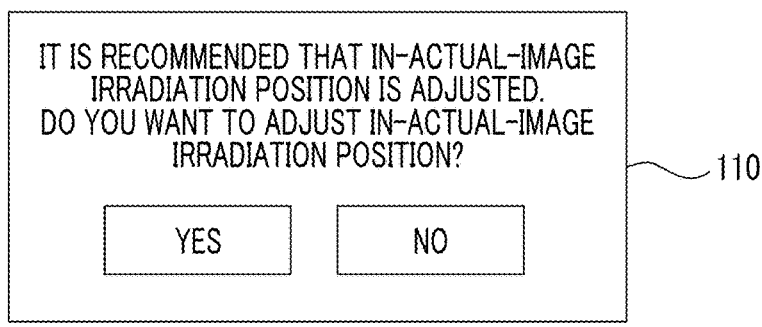
FIG. 22 is a screen diagram showing an example of an irradiation position adjustment recommendation screen according to the first to seventh embodiments.

For example, in step 250, the output unit 100C displays an irradiation position adjustment recommendation screen 110 on the display unit 86 as shown in FIG. 22. Thereafter, the process proceeds to step 252.

The irradiation position adjustment recommendation screen 110 is a screen for recommending the adjustment of the in-actual-image irradiation position. In the example shown in FIG. 22, a message of "it is recommended to adjust the in-actual-image irradiation position" is displayed on the irradiation position adjustment recommendation screen 110. In the example shown in FIG. 22, a soft key of "yes" designated for announcing an intention to adjust the adjustment of the in-actual-image irradiation position is displayed on the irradiation position adjustment recommendation screen 110. In the example shown in FIG. 22, a soft key of "no" designated for announcing an intention not to adjust the in-actual-image irradiation position is displayed on the irradiation position adjustment recommendation screen 110.

As stated above, in step 250, the irradiation position adjustment recommendation screen 110 is displayed as a warning indicating that the derivation accuracy derived by the output unit 100C is less than predetermined derivation accuracy on the display unit 86.

In step 252, the output unit 100C determines whether or not the soft key of "yes" of the irradiation position adjustment recommendation screen 110 is turned on. In a case where the soft key of "yes" of the irradiation position adjustment recommendation screen 110 is turned on in step 252, the determination result is positive, and the process proceeds to step 254. In a case where the soft key of "no" of the irradiation position adjustment recommendation screen 110 is turned on in step 252 and in a case where a default time (for example, 30 seconds) elapses after the irradiation position adjustment recommendation screen 110 is displayed, the determination result is negative, and the process proceeds to step 256.

Figure 19:
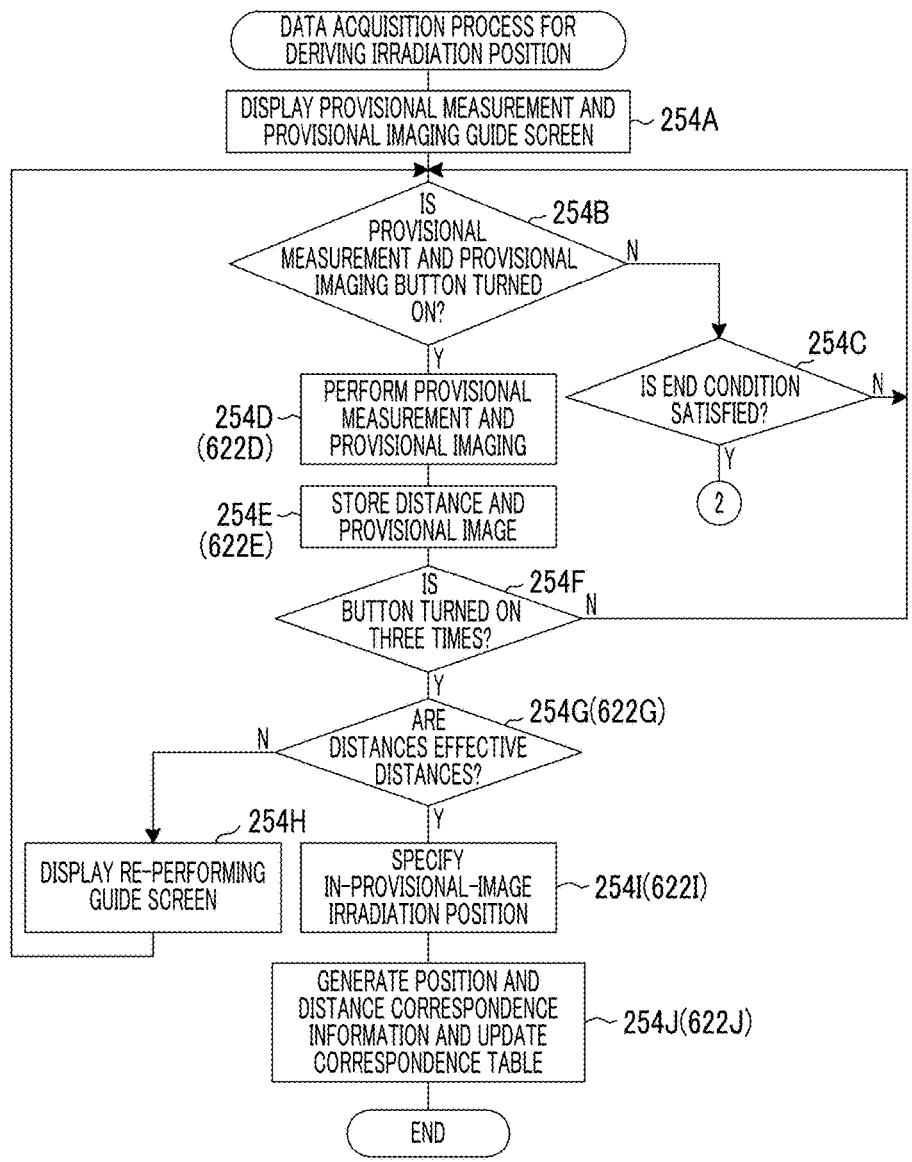
FIG. 19 is a flowchart showing an example of a flow of a data acquisition process for deriving an irradiation position according to the first to seventh embodiments.

For example, in step 254, the deriving unit 100B performs the data acquisition process for deriving the irradiation position shown in FIG. 19. Thereafter, the process proceeds to step 256.

Figure 23:
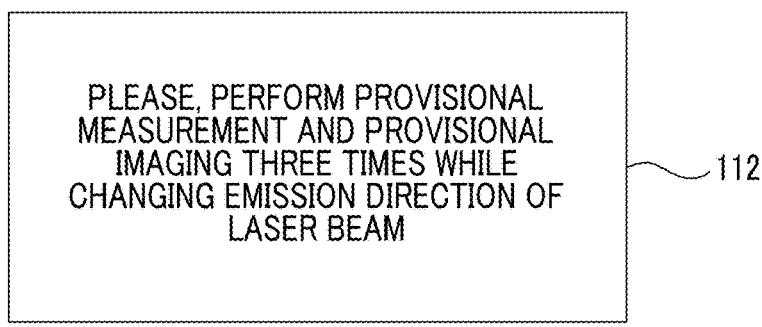
FIG. 23 is a screen diagram showing an example of a provisional measurement and provisional imaging guide screen according to the first to seventh embodiments.

For example, the deriving unit 100B displays a provisional measurement and provisional imaging guide screen 112 on the display unit 86 as shown in FIG. 23 in step 254A in the data acquisition process for deriving the irradiation position shown in FIG. 19. Thereafter, the process proceeds to step 254B.

The provisional measurement and provisional imaging guide screen 112 is a screen for guiding the user information indicating that the provisional measurement and the provisional imaging are performed multiple times (for example, three times in the present embodiment) while changing the emission direction of the laser beam. In the example shown in FIG. 23, a message of "please, perform the provisional measurement and provisional imaging three times while changing the emission direction of the laser beam" is displayed on the provisional measurement and provisional imaging guide screen 112.

In step 254B, the deriving unit 100B determines whether or not the provisional measurement and provisional imaging button 90B is turned on. In a case where the provisional measurement and provisional imaging button 90B is not turned on in step 254B, the determination result is negative, and the process proceeds to step 254C. In a case where the provisional measurement and provisional imaging button 90B is turned on in step 254B, the determination result is positive, and the process proceeds to step 254D.

In step 254C, the deriving unit 100B determines whether or not an end condition which is a condition in which the data acquisition process for deriving an actual irradiation position is ended is satisfied. For example, in the data acquisition process for deriving the actual irradiation position, the end condition is a condition in which an instruction to end the data acquisition process for deriving the actual irradiation position is received through the touch panel 88.

In a case where the end condition is not satisfied in step 254C, the determination result is negative, and the process proceeds to step 254B. In a case where the end condition is satisfied in step 254C, the determination result is positive, and the process proceeds to step 220.

In step 254D, the deriving unit 100B performs the provisional measurement for the individual distance measurement unit by controlling the distance measurement control unit 68. The deriving unit 100B performs the provisional imaging by controlling the imaging element driver 74 and the image signal processing circuit 76. Thereafter, the process proceeds to step 254E. The provisional measurement and the provisional imaging are performed while changing the imaging direction whenever the provisional measurement and provisional imaging button 90B is turned on. For example, a case where the imaging direction is changed may mean that the orientation of the distance measurement device 10A is changed.

In step 254E, the deriving unit 100B stores the provisional image which is the image acquired by performing the provisional imaging and the distance acquired by performing the provisional measurement using the distance measurement unit in the primary storage unit 102 for every individual distance measurement unit. Thereafter, the process proceeds to step 254F.

In step 254F, the deriving unit 100B determines whether or not the provisional measurement and the provisional imaging are performed three times by determining whether or not the provisional measurement and provisional imaging button 90B is turned on three times. In a case where the provisional measurement and the provisional imaging are not performed three times in step 254F, the determination result is negative, and the process proceeds to step 254B. In a case where the provisional measurement and the provisional imaging are performed three times in step 254F, the determination result is positive, and the process proceeds to step 254G.

Subsequently, the deriving unit 100B determines whether or not the relation between a plurality of provisionally measured distances (for example, three distances) is not a predetermined relation satisfying that these distances do not effectively contribute to the construction of the position and distance correspondence information used in the deriving of the in-actual-image irradiation position for every individual distance measurement unit. That is, in step 254G the deriving unit 100B determines whether or not the three distances stored in the primary storage unit 102 in step 254E are effective distances for every individual distance measurement unit. The effective distances refer to distances having the relation satisfying that the three distances stored in the primary storage unit 102 effectively contribute to the construction (generation) of position and distance correspondence information used in the deriving of the in-actual-image irradiation position. For example, the relation satisfying that distances effectively contribute to the construction of the position and distance correspondence information used in the deriving of the in-actual-image irradiation position means a relation satisfying that the three distances are separated from each other by a predetermined distance or more (for example, 0.3 meters or more).

In a case where three distances stored in the primary storage unit 102 in step 254E are not effective distances for at least one of the individual distance measurement units in step 254G, the determination result is negative, and the process proceeds to step 254H. In a case where the three distances stored in the primary storage unit 102 in step 254E are effective distances for all the individual distance measurement units in step 254G, the determination result is positive, and the process proceeds to step 254I.

Figure 24:
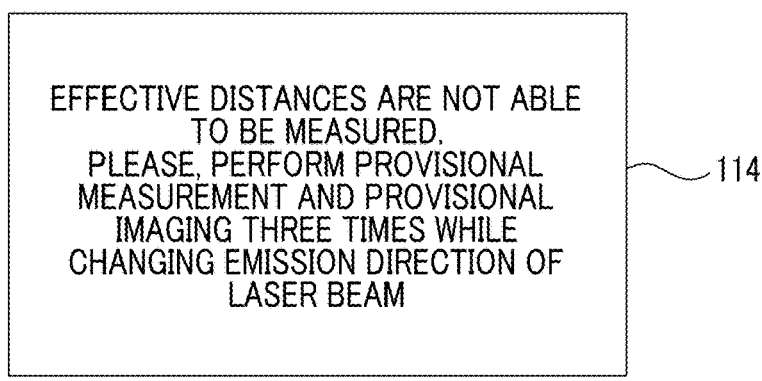
FIG. 24 is a screen diagram showing an example of a re-performing guide screen according to the first to seventh embodiments.

For example, in step 254H, the deriving unit 100B displays a re-performing guide screen 114 on the display unit 86 as shown in FIG. 24. Thereafter, the process proceeds to step 254B.

The re-performing guide screen 114 is a screen for guiding the user the re-performing of the provisional measurement and the provisional imaging. In the example shown in FIG. 24, a message of "effective distances are not able to be measured. please, perform the provisional measurement and provisional imaging three times while changing the emission direction of the laser beam" is displayed on the re-performing guide screen 114.

In step 254I, the deriving unit 100B specifies the in-provisional-image irradiation position for every provisional image stored in the primary storage unit 102 for every individual distance measurement unit in step 254E. Thereafter, the process proceeds to step 254J. For example, the in-provisional-image irradiation position is specified from a difference between the image acquired before the provisional measurement and the provisional imaging are performed (for example, previous frame) in the live view image and the provisional image acquired by performing the provisional imaging. The user can visually recognize the irradiation position of the laser beam from the provisional image in a case where the distance at which the provisional measurement is about several meters. In this case, the irradiation position visually recognized from the provisional image may be designated by the user through the touch panel 88, and the designated position may be specified as the in-provisional-image irradiation position.

In step 254J, the deriving unit 100B updates the position and distance table 109 for every individual distance measurement unit by generating the position and distance correspondence information and overwriting the generated position and distance correspondence information in the position and distance table 109 for every individual distance measurement unit. Thereafter, the data acquisition process for deriving the actual irradiation position is ended.

Figure 18:
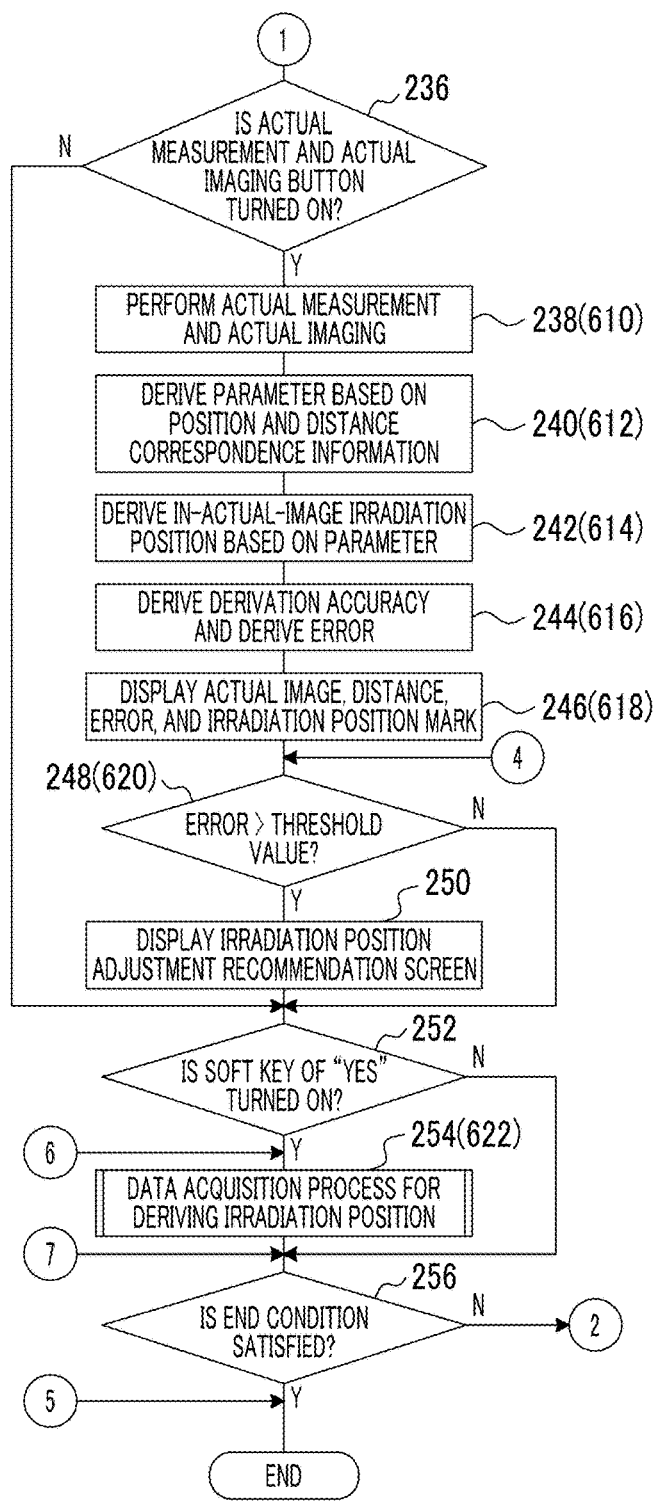
FIG. 18 is a flowchart subsequent to the flowcharts shown in FIGS. 16 and 48.

Meanwhile, in the measurement process shown in FIG. 18, in step 256, the deriving unit 100B determines whether or not an end condition which is a condition in which the actual measurement process is ended is satisfied. For example, in the actual measurement process, the end condition is a condition in which an instruction to end the actual measurement process is received through the touch panel 88.

In a case where the end condition is not satisfied in step 256, the determination result is negative, and the process proceeds to step 220. In a case where the end condition is satisfied in step 256, the determination result is positive, and the actual measurement process is ended.

Figure 17:
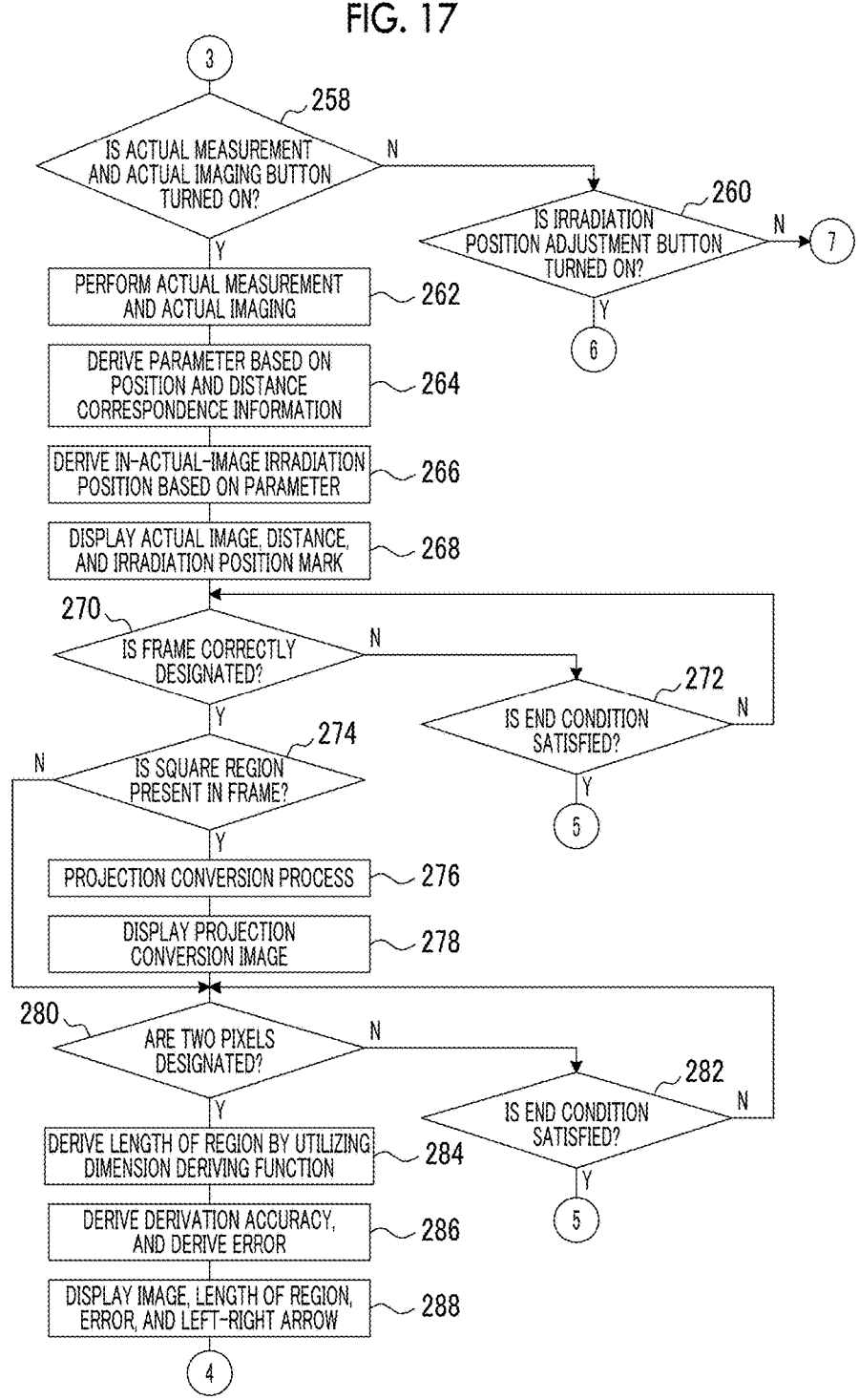
FIG. 17 is a flowchart subsequent to the flowcharts shown in FIGS. 16 and 36.

Meanwhile, in step 258 shown in FIG. 17, the deriving unit 100B determines whether or not the actual measurement and actual imaging button 90A is turned on. In a case where the actual measurement and actual imaging button 90A is not turned on in step 258, the determination result is negative, and the process proceeds to step 260. In a case where the actual measurement and actual imaging button 90A is turned on in step 258, the determination result is positive, and the process proceeds to step 262.

In step 260, the deriving unit 100B determines whether or not the irradiation position adjustment button 90G is turned on. In a case where the irradiation position adjustment button 90G is turned on in step 260, the determination result is positive, and the process proceeds to step 254 shown in FIG. 18. In a case where the irradiation position adjustment button 90G is not turned on in step 260, the determination result is negative, and the process proceeds to step 256 shown in FIG. 18.

In step 262, the deriving unit 100B performs the actual measurement for every individual distance measurement unit by controlling the distance measurement control unit 68. The deriving unit 100B performs the actual imaging by controlling the imaging element driver 74 and the image signal processing circuit 76. Thereafter, the process proceeds to step 264.

In step 264, the deriving unit 100B derives the parameter based on the position and distance correspondence information stored in the position and distance table 109 for every individual distance measurement unit. Thereafter, the process proceeds to step 266.

In step 266, the deriving unit 100B derives the in-actual-image irradiation position for every individual distance measurement unit based on the parameter derived in step 264. Thereafter, the process proceeds to step 268.

For example, the in-image irradiation position is derived from Expressions (2) to (4) in step 266. That is, the parameter derived in step 264 is substituted into Expressions (2) to (4), and the distance acquired by performing the actual measurement in step 262 is substituted as the distance D into Expressions (2) to (4). Accordingly, the "row-direction pixel of the irradiation position" is derived as the in-actual-image irradiation position.

Figure 25:
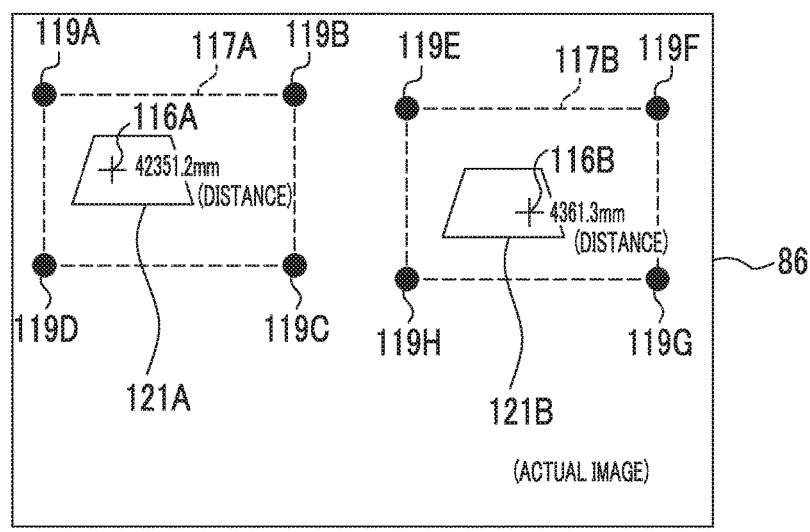
FIG. 25 is a screen diagram showing an example of a screen in which a plurality of square frames each including an irradiation position mark is designated in a display region within an actual image.
Figure 26:
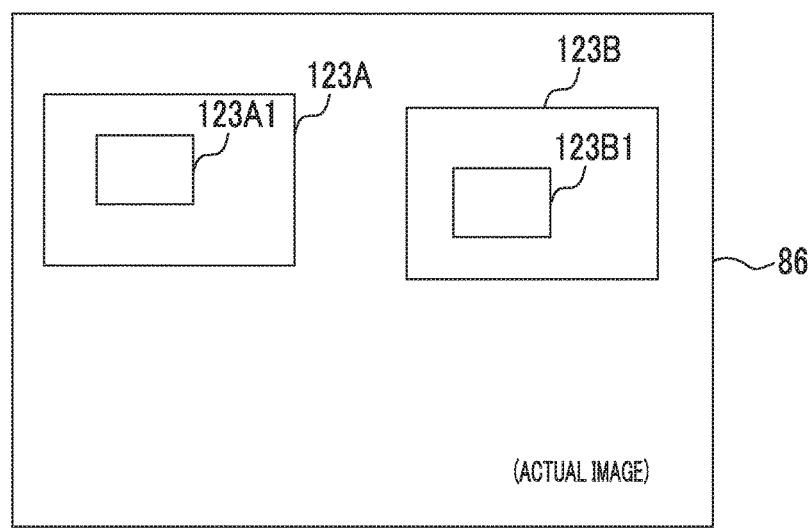
FIG. 26 is a screen diagram showing an example of a screen in which an actual image including a projection conversion image acquired by performing a projection conversion process on an image region within the square frame is displayed.

For example, in step 268, the deriving unit 100B displays the actual image, the distance, and the irradiation position marks 116A and 116B on the display unit 86 as shown in FIG. 25.

In the example shown in FIG. 25, the actual image displayed on the display unit 86 is an image acquired through the actual imaging by performing the process of step 262.

In the example shown in FIG. 25, the irradiation position mark 116A is a mark indicating the in-actual-image irradiation position derived by performing the process of step 266 based on the laser beam emitted by the upper distance measurement unit 11. In the example shown in FIG. 25, the irradiation position mark 116B is a mark indicating the in-actual-image irradiation position derived by performing the process of step 266 based on the laser beam emitted by the lower distance measurement unit 13.

For example, in a case where the process of step 268 is performed, the distance for every individual distance measurement unit is displayed on the display unit 86 as shown in FIG. 25. The distance for every individual distance measurement unit is roughly divided into the distance measured using the upper distance measurement unit 11 and the distance measured using the lower distance measurement unit 13. The distance measured using the upper distance measurement unit 11 is a distance measured by performing the process of step 262 based on the laser beam emitted by the upper distance measurement unit 11. The distance measured using the lower distance measurement unit 13 is a distance measured by performing the process of step 262 based on the laser beam emitted by the lower distance measurement unit 13.

In the example shown in FIG. 25, a value of "42351.2" corresponds to the distance measured using the upper distance measurement unit 11, and a unit is millimeters. In the example shown in FIG. 25, a value of "4361.3" corresponds to the distance measured using the lower distance measurement unit 13, and a unit is millimeters.

In a case where a screen including the actual image, the distance, and the irradiation position marks 116A and 116B is displayed on the display unit 86, the user designates a frame in a display region of the actual image through the touch panel 88.

In the next step 270, the deriving unit 100B determines whether or not the frame is correctly designated in the display region of the actual image through the touch panel 88. For example, the correctly designated frame is a square frame 117A including the irradiation position mark 116A in the display region of the actual image and a square frame 117B including the irradiation position mark 116B in the display region of the actual image, as shown in FIG. 25.

For example, the frame 117A is defined by four points of points 119A, 119B, 119C, and 119D, as shown in FIG. 25. A region surrounded by the frame 117A is a region designated in association with the in-actual-image irradiation position specified from the irradiation position mark 116A.

For example, the frame 117B is defined by four points of points 119E, 119F, 119G, and 119H, as shown in FIG. 25. A region surrounded by the frame 117B is a region designated in association with the in-actual-image irradiation position specified from the irradiation position mark 116B.

In a case where the frame is not correctly designated in the display region of the actual image through the touch panel 88 in step 270, the determination result is negative, and the process proceeds to step 272. In a case where the frame is correctly designated in the display region of the actual image through the touch panel 88 in step 270, the determination result is positive, and the process proceeds to step 274.

In step 272, the deriving unit 100B determines whether or not an end condition which is a condition in which the actual measurement process is ended is satisfied. In a case where the end condition is not satisfied in step 272, the determination result is negative, and the process proceeds to step 270. In a case where the end condition is satisfied in step 272, the determination result is positive, and the actual measurement process is ended.

In step 274, the deriving unit 100B determines whether or not a square region is present inside at least one of the frame 117A or 117B. For example, the square region refers to trapezoid regions 121A and 121B as shown in FIG. 25. In a case where portions corresponding to the trapezoid regions 121A and 121B of the external wall portion of the office building are captured in a state in which the portions corresponding to the trapezoid regions face the imaging lens 50 in front view, the portions corresponding to the trapezoid regions are represented as rectangular regions in the actual image.

In a case where the square regions are not presented inside both the frame 117A and 117B in step 274, the determination result is negative, and the process proceeds to step 280. In a case where the square region is present inside at least one of the frame 117A or 117B in step 274, the determination result is positive, and the process proceeds to step 276.

Hereinafter, for the sake of convenience in description, the frames 117A and 117B are referred to as a "frame 117" in a case where it is not necessary to distinguish between these frames. Hereinafter, for the sake of convenience in description, the trapezoid regions 121A and 121B are referred to as a "trapezoid region 121" in a case where it is not necessary to distinguish between these trapezoid regions.

In step 276, the deriving unit 100B performs the projection conversion process on the image region surrounded by the frame 117 including the trapezoid region 121. Thereafter, the process proceeds to step 278.

That is, in step 276, the deriving unit 100B initially derives a projection conversion coefficient which is a coefficient for projection conversion based on the square region included in the frame 117. The deriving unit 100B performs the projection conversion process on the latest actual image (the actual image acquired in the process of step 262) by using the derived projection conversion coefficient. Thereafter, the process proceeds to step 278. The process of step 278 is performed, and the latest actual image is converted into an image corresponding to the facing view image.

The square region included in the frame 117A is the trapezoid region 121A, and the square region included in the frame 117B is the trapezoid region 121B. Accordingly, in a case where the process of step 278 is performed, a first projection conversion coefficient is derived based on the trapezoid region 121A, and a second projection conversion coefficient is derived based on the trapezoid region 121B.

The projection conversion process is performed on an image region (for example, a square image region of which an outer edge is defined by the frame 117A) surrounded by the frame 117A based on the first projection conversion coefficient. The projection conversion process is performed on an image region (for example, a square image region of which an outer edge is defined by the frame 117B) surrounded by the frame 117B based on the second projection conversion coefficient.

In step 276, the projection conversion process is not performed on an image region surrounded by the frame 117 which does not include the trapezoid region 121. Hereinafter, for the sake of convenience in description, it will be described on the assumption that the process of step 276 is performed in a case where the frame 117A includes the trapezoid region 121A and the frame 117B includes the trapezoid region 121B.

In step 278, the deriving unit 100B displays projection conversion images 123A and 123B acquired by performing the projection conversion process in step 276 on the display unit 86.

For example, the projection conversion image 123A is an image corresponding to the image acquired through the imaging in a state in which the portion corresponding to the image region surrounded by the frame 117A faces the imaging lens 50 in front view. That is, the projection conversion image 123A is an image including a rectangular region 123A1 acquired by performing the projection conversion process on the trapezoid region 121A.

For example, the projection conversion image 123B is an image corresponding to the image acquired through the imaging in a state in which the portion corresponding to the image region surrounded by the frame 117B faces the imaging lens 50 in front view. That is, the projection conversion image 123B is an image including a rectangular region 123B1 acquired by performing the projection conversion process on the trapezoid region 121B.

Hereinafter, the projection conversion images 123A and 123B are referred to as the "projection conversion image" without being assigned for the sake of convenience in description the references in a case where it is not necessary to distinguish between these projection conversion images.

In a case where a screen including the projection conversion image is displayed on the display unit 86, the user designates a region by designating two points, that is, two pixels in a display region of the projection conversion image through the touch panel 88. The designated region is a region in the real space corresponding to an interval between two pixels.

In the next step 280, the deriving unit 100B determines whether or not two pixels of a region-length deriving target image which is the image used in the deriving of the length of the designated region are designated.

For example, in a case where the processes of steps 276 and 278 are performed, the region-length deriving target images are the projection conversion images 123A and 123B. For example, in a case where the processes of steps 276 and 278 are not performed, the region-length deriving target images are images of the regions surrounded by the frames 117A and 117B of the actual image.

The two pixels designated among the region-length deriving target image are treated as pixels associated with the in-actual-image irradiation position specified from the irradiation position mark 116 later. For example, in a case where the processes of steps 276 and 278 are performed, the two pixels designated in the projection conversion image 123A are treated as pixels associated with the in-actual-image irradiation position specified from the irradiation position mark 116A later. For example, in a case where the processes of steps 276 and 278 are not performed, the two pixels designated in the image of the region surrounded by the frame 117A are treated as pixels associated with the in-actual-image irradiation position specified from the irradiation position mark 116A later.

In a case where the two pixels of the region-length deriving target image are not designated through the touch panel 88 in step 280, the determination result is negative, and the process proceeds to step 282. In a case where the two pixels of the region-length deriving target image are designated through the touch panel 88 in step 280, the determination result is positive, and the process proceeds to step 284.

In step 282, the deriving unit 100B determines whether or not the end condition which is the condition in which the actual measurement process is ended is satisfied. In a case where the end condition is not satisfied in step 282, the determination result is negative, and the process proceeds to step 280. In a case where the end condition is satisfied in step 282, the determination result is positive, and the actual measurement process is ended.

In step 284, the deriving unit 100B derives the length of the region corresponding to the interval between the two pixels designated by the user through the touch panel 88 for every region-length deriving target image by utilizing the dimension deriving function. Thereafter, the process proceeds to step 286.

In step 284, the length of the region corresponding to the interval between the two pixels designated by the user through the touch panel 88 is derived from Expression (1). In this case, u1 and u2 (see FIG. 11) of Expression (1) are addresses of the two pixels designated by the user through the touch panel 88.

In step 286, the output unit 100C derives the derivation accuracy associated with the specific assumption factor from the factor and accuracy correspondence information, and derives the error of the length of the region derived by the deriving unit 100B based on the derived derivation accuracy.

Thereafter, the process proceeds to step 288. The error of the length of the region is derived for every region-length deriving target image.

In step 286, the specific assumption factor is an assumption factor corresponding to the irradiation position influence factor which is actually present in the distance measurement device 10A. Specifically, the specific assumption factor is an assumption factor of the assumption factors included in the factor and accuracy correspondence information, which corresponds to the factor information stored in the secondary storage unit 104 at a current point of time and the manufacturing variation of the assumption factor included in the factor and accuracy correspondence information.

In a case where the factor information is not stored in the secondary storage unit 104 at the current point of time, the specific assumption factor is the manufacturing variation of the assumption factors included in the factor and accuracy correspondence information. Accordingly, in a case where the distance measurement device 10A is activated in a default state, since the factor information is not stored in the secondary storage unit 104, the error based on the assumption factor related to the manufacturing variation is derived by performing the process of step 244 or step 286. The error based on the assumption factor related to the manufacturing variation is displayed on the display unit 86 by performing the process of step 246 or step 288 to be described below.

Similarly to step 244, in step 286, in a case where the multiple derivation accuracy are derived from the factor and accuracy correspondence information, the multiple derivation accuracy are integrated, and the error of the length of the region is derived based on the integrated derivation accuracy. For example, in a case where the specific assumption factor is the manufacturing variation, the error of the length of the region is derived based on the derivation accuracy $\lambda$. That is, in a case where the actual measurement process is performed by activating the distance measurement device 10A for the first time after the shipment of the distance measurement device 10A is performed, the error of the length of the region is derived based on the derivation accuracy $\lambda$.

Similarly to step 244, the multiple derivation accuracy are integrated based on Expression (6) in step 286. For example, it has been described in step 286 that the error is derived based on a length error table (not shown) previously associated with the derivation accuracy, the length of the region, and the error, the technology of the present disclosure is not limited thereto. For example, the error may be derived based on a calculation expression in which the derivation accuracy and the length of the region are used as the independent variables and the error is used as the dependent variable.

Figure 27:
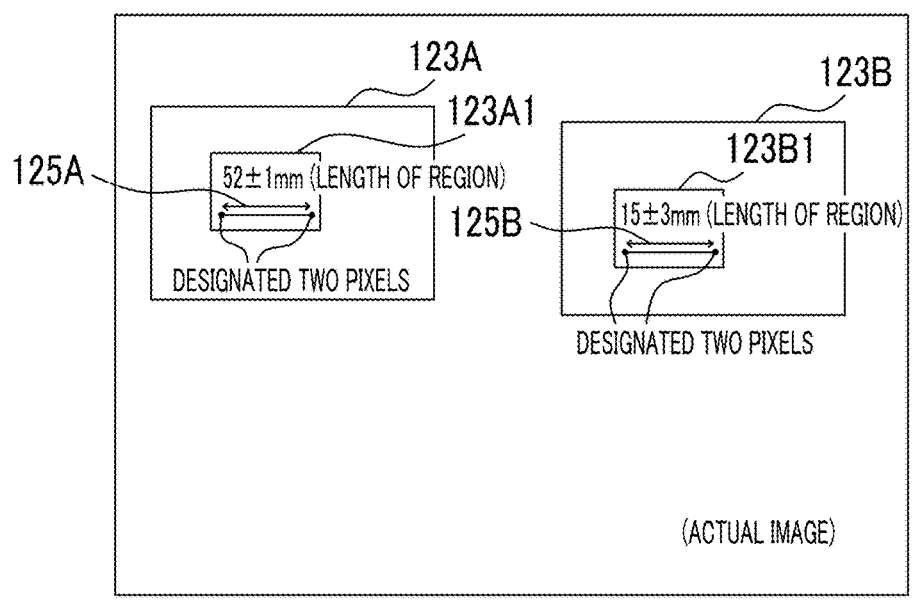
FIG. 27 is a screen diagram showing an example of a screen in which a length of a region, an error, and a left-right arrow are displayed so as to be superimposed on the projection conversion image.

For example, in step 288, the output unit 100C displays the image, the length of the region, the error, and left-right arrows 125A and 125B on the display unit 86 as shown in FIG. 27. Thereafter, the process proceeds to step 248.

The image displayed on the display unit 86 by performing the process of step 288 is the actual image or the projection conversion image 123. That is, the projection conversion image 123 is displayed only when the process of step 276 is performed, and the actual image acquired through the actual imaging in step 262 is displayed on the display unit 86 in other cases.

The length of the region displayed on the display unit 86 by performing the process of step 288 is the length of the region derived by performing the process of step 284. In the example shown in FIG. 27, a value of "52" and a value of "15" correspond to the lengths of the regions, and a unit is millimeters.

The error displayed on the display unit 86 by performing the process of step 288 is the error derived by performing the process of step 286. In the example shown in FIG. 27, a value of "±1" and a value of "±3" correspond to the errors, and a unit is millimeters.

The left-right arrows 125A and 125B displayed on the display unit 86 by performing the process of step 288 are arrows for specifying the two pixels designated by the user through the touch panel 88.

Next, the irradiation position adjustment process realized by executing the irradiation position adjustment program 108 in the CPU 100 in a case where the irradiation position adjustment button 90G is pressed in a state in which the live view image is displayed on the display unit 86 will be described with reference to FIG. 28.

Although an example in which the upper distance measurement unit 11 is rotated will be described for the sake of convenience in description, the same is true of a case where the lower distance measurement unit 13 is rotated. Hereinafter, a case where the live view image is displayed on the display unit 86 at a specific frame rate will be described for the sake of convenience in description.

Figure 28:
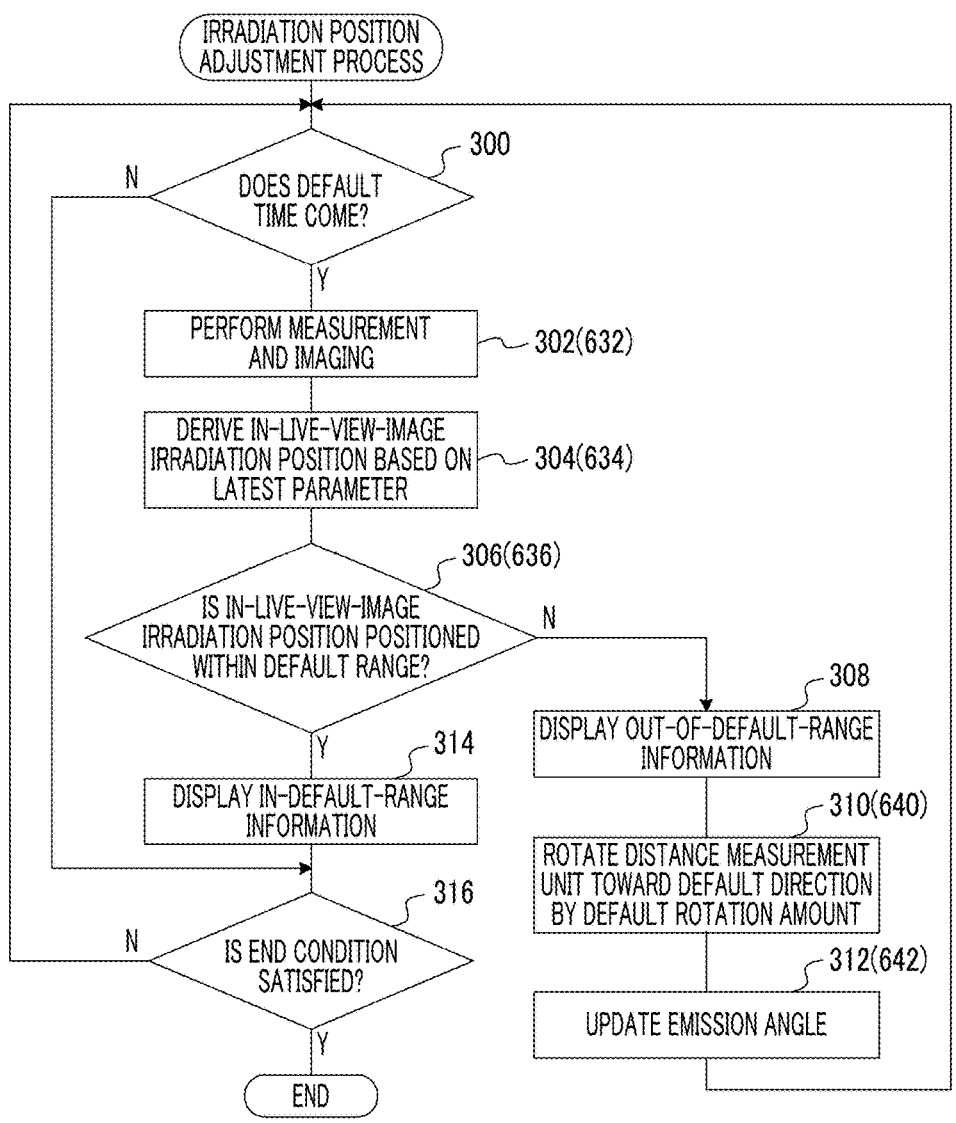
FIG. 28 is a flowchart showing an example of a flow of an irradiation position adjustment process according to the first embodiment and the fifth to seventh embodiments.

In the irradiation position adjustment process shown in FIG. 28, the control unit 100A initially determines whether or not a default time comes in step 300. For example, the default time means a time whenever the live view image is displayed in three frames. The default time is not limited to the time whenever the live view image is displayed in three frames, and the number of frames in which the live view image is displayed may not be three, or may be prescribed by a predetermined time such as 3 seconds or 5 seconds. The default time may be a time previously determined according to an instruction received through the touch panel 88.

In a case where the default time comes in step 300, the determination result is positive, and the process proceeds to step 302. In a case where the default time does not come in step 300, the determination result is negative, and the process proceeds to step 316.

In step 302, the control unit 100A performs the measurement of the distance by controlling the distance measurement control unit 68. The control unit 100A performs the imaging by controlling the imaging element driver 74 and the image signal processing circuit 76. Thereafter, the process proceeds to step 304.

In step 304, the control unit 100A causes the deriving unit 100B to derive the in-live-view-image irradiation position based on the latest parameter. Therefore, the process proceeds to step 306. For example, the latest parameter is a parameter used in the deriving of the in-actual-image irradiation position in a case where the in-image irradiation position derived last before the process of step 304 is performed is the in-actual-image irradiation position derived by performing the process of step 242 (see FIG. 18). For example, in a case where the process of step 312 to be described below after the process of previous step 304 is performed, the latest parameter is a parameter other than an emission angle β of the parameters used in the deriving of the latest in-live-view-image irradiation position and an emission angle β updated in step 312.

For example, the in-live-view-image irradiation position is derived from Expressions (2) to (4) in step 304. That is, the latest parameter is substituted into Expressions (2) to (4), and the distance acquired by performing the measurement in step 302 is substituted as the distance D into Expressions (2) to (4). Accordingly, the "row-direction pixel of the irradiation position" is derived as the in-live-view-image irradiation position.

Figure 29:
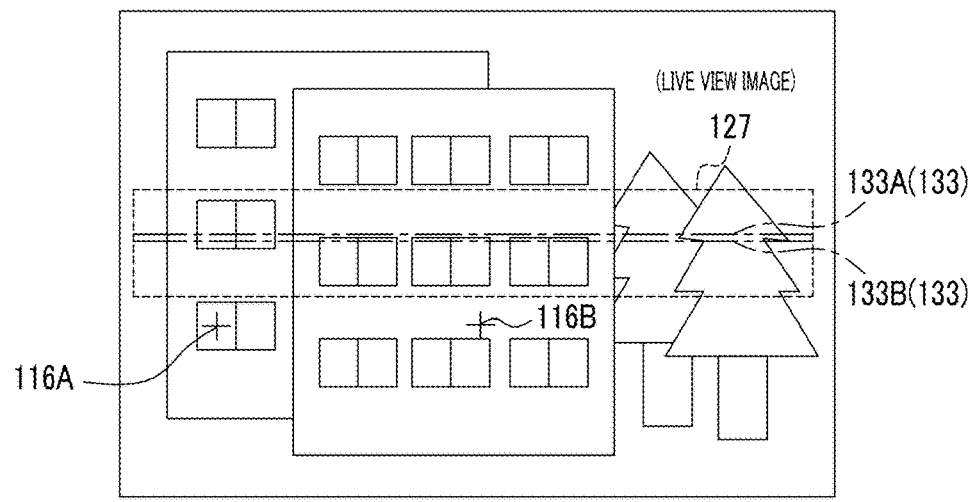
FIG. 29 is a screen diagram showing an example of a live view image, a frame, and an irradiation position mark displayed on the display unit by performing the irradiation position adjustment process.
Figure 30:
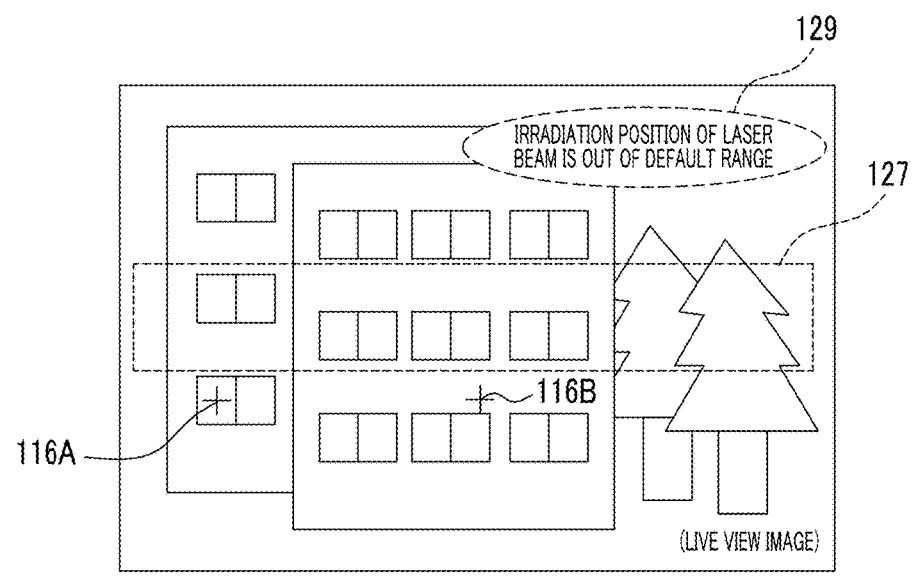
FIG. 30 is a screen diagram showing an example of a live view image, a frame, an irradiation position mark, and a message corresponding to out-of-default-range information displayed on the display unit by performing the irradiation position adjustment process.
Figure 31:
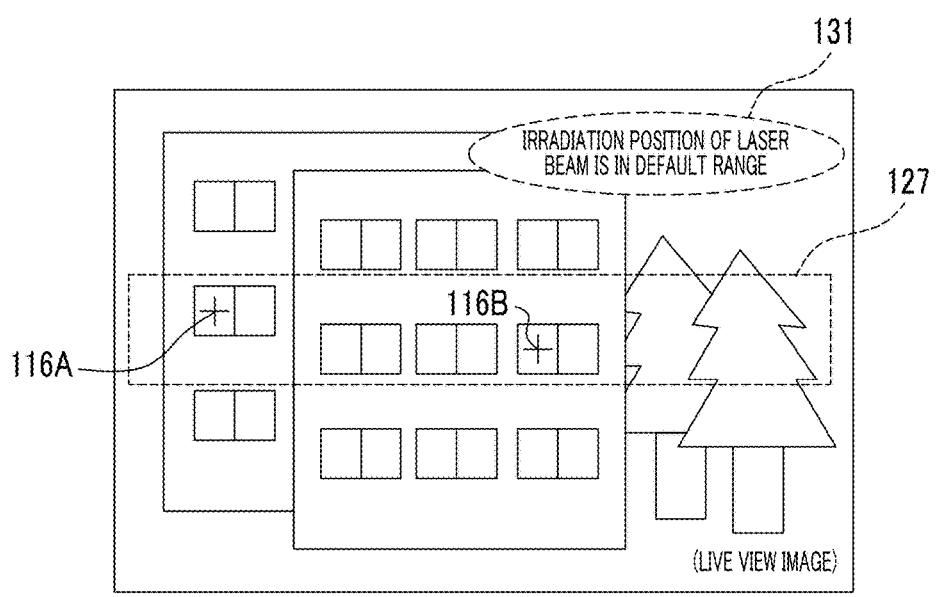
FIG. 31 is a screen diagram showing an example of a live view image, a frame, an irradiation position mark, and a message corresponding to in-default-range information displayed on the display unit by performing the irradiation position adjustment process.

For example, as shown in FIGS. 29 to 31, the control unit 100A controls the display unit 86 to display an irradiation position mark 116A which is a mark indicating the in-live-view-image irradiation position derived by performing the process of step 304 in a display region of the live view image. Therefore, according to the distance measurement device 10A, the user can easily ascertain the latest in-live-view-image irradiation position compared to a case where the irradiation position mark 116A is not displayed. In the example of FIGS. 29 to 31, the irradiation position mark 116B which is the mark indicating the in-live-view-image irradiation position derived based on the laser beam emitted by the lower distance measurement unit 13 is displayed on the display unit 86.

In step 306, the control unit 100A determines whether or not the in-live-view-image irradiation position derived by the deriving unit 100B by performing the process of step 304 is in the default range. For example, the default range is an inside region of the rectangular frame 127 having a predetermined size, as shown in FIG. 30. The frame 127 is not limited to the shape and position shown in FIG. 30, and the frame 127 may be a frame surrounding a specific partial region in the display region of the captured image. Although it has been described in the present embodiment that the frame 127 is displayed in the display region of the captured image, the technology of the present disclosure is not limited thereto, and the frame 127 may not be displayed. The display and the non-display of the frame 127 performed by the display unit 86 may be selectively switched by the control unit 100A according to an instruction received through the touch panel 88.

In a case where the in-live-view-image irradiation position is out of the default range in step 306, the determination result is negative, and the process proceeds to step 308. For example, as shown in FIG. 30, in a case where both the irradiation position marks 116A and 116B are positioned outside the frame 127 in step 306, it is determined that the in-live-view-image irradiation position is out of the default range. In a case where at least one of the irradiation position mark 116A or 116B is positioned inside the frame 127 in step 306, it is determined that the in-live-view-image irradiation position is in the default range.

In step 308, the control unit 100A displays out-of-default-range information on the display unit 86 such that the out-of-default-range information is superimposed on the live view image. Therefore, the process proceeds to step 310. The out-of-default-range information is information indicating that the in-live-view-image irradiation position derived by the deriving unit 100B by performing the process of step 304 is out of the default range.

For example, as the out-of-default-range information, there is a message 129 of the "irradiation position of the laser beam is out of the default range" displayed on the display unit 86, as shown in FIG. 30. This message is merely an example. For example, in a case where the frame 127 is displayed, a message of the "frame is not irradiated with the laser beam" may be displayed as the out-of-default-range information on the display unit 86. For example, the message is not limited to be visually displayed on the display unit 86, and may be audibly indicated by being output as sound by a sound playback device (not shown). Permanent visual display using an image forming device (not shown)

may be performed, or at least two of the visual display, the audible indication, or the permanent visual display may be performed.

As stated above, the out-of-default-range information is displayed by the display unit 86 by performing the process of step 308, and thus, notification indicating that the in-live-view-image irradiation position is out of the default range is presented to the user.

In step 310, the control unit 100A rotates the upper distance measurement unit 11 to a default direction by a default rotation amount by controlling the rotation mechanism through the motor driver 23. Thereafter, the process proceeds to step 312.

For example, the default rotation amount means a constant rotation amount. For example, the default rotation amount is a rotation amount needed to change the emission angle β by a predetermined angle (for example, 3 degrees).

The default direction is a direction in which a distance between the in-live-view-image irradiation position derived by the deriving unit 100B by performing the process of step 304 and reference straight lines 133 (see FIG. 29) crossing the center of the frame 127 decreases. The reference straight lines 133 are formed for the individual distance measurement units, and the reference straight lines for the individual distance measurement units are set in positions separated by a distance corresponding to a shift amount in a height direction between an optical axis of the laser beam of the emission unit 22 and an optical axis of the laser beam of the emission unit 30 within the frame 127.

The reference straight lines 133 are roughly classified into reference straight lines 133A and 133B. The reference straight line 133A is a straight line used for the upper distance measurement unit 11, and the reference straight line 133B is a straight line used for the lower distance measurement unit 13.

Thus, in the present embodiment, the default direction is uniquely determined from a positional relation between the in-live-view-image irradiation position derived by the deriving unit 100B by performing the process of step 304 and the reference straight line 133A corresponding to the upper distance measurement unit 11.

In step 312, the control unit 100A updates the emission angle β according to the rotation direction and the rotation amount of the upper distance measurement unit 11 rotated by performing the process of step 310. Thereafter, the process proceeds to step 300.

In a case where the in-live-view-image irradiation position is in the default range in step 306, the determination result is positive, and the process proceeds to step 314.

In step 314, the control unit 100A displays in-default-range information on the display unit 86 such that the in-default-range information is superimposed on the live view image. Thereafter, the process proceeds to step 316. The in-default-range information is information indicating that the in-live-view-image irradiation position derived by the deriving unit 100B by performing the process of step 304 is in the default range.

For example, as the in-default-range information, there is a message 131 of the "irradiation position of the laser beam is in the default range" displayed on the display unit 86, as shown in FIG. 31. This message is merely an example. For example, in a case where the frame 127 is displayed, a message of the "frame is irradiated with the laser beam" may be displayed as the in-default-range information on the display unit 86. For example, the message is not limited to be visually displayed on the display unit 86, and may be audibly indicated by being output as sound by a sound playback device (not shown). Permanent visual display using an image forming device (not shown) may be performed, or at least two of the visual display, the audible indication, or the permanent visual display may be performed.

As mentioned above, the in-default-range information is displayed on the display unit 86 by performing the process of step 314, and thus, notification indicating that the in-live-view-image irradiation position is in the default range is presented to the user.

In step 316, the control unit 100A determines whether or not an end condition which is a condition in which an actual irradiation position adjustment process is ended is satisfied. In the actual irradiation position adjustment process, the end condition is, for example, a condition in which the irradiation position adjustment button 90G is pressed again and/or a condition in which a predetermined time (for example, 1 minute) elapses after the performing of the actual irradiation position adjustment process is started.

In a case where the end condition is not satisfied in step 316, the determination result is negative, and the process proceeds to step 300. In a case where the end condition is satisfied in step 316, the determination result is positive, and the actual irradiation position adjustment process is ended.

As described above, in the distance measurement device 10A, the subject is irradiated with the plurality of laser beams by the distance measurement unit 12. The control unit 100A controls the imaging device 14 to perform the imaging in an angle of view which includes the real-space irradiation positions using the plurality of laser beams (step 262). The deriving unit 100B derives the in-actual-image irradiation position as the position corresponding to the real-space irradiation position (step 266). The length of the region corresponding to the interval between the two pixels associated with the region-length deriving target image for every in-actual-image irradiation position is derived based on the distance measured by utilizing the distance measurement system function, the interval between the designated two pixels, and the focal length of the imaging device 14 (step 284). Therefore, according to the distance measurement device 10A, it is possible to rapidly derive a plurality of regions compared to a case where only one region is designated whenever the imaging and the distance measurement are performed once.

In the distance measurement device 10A, the orientation of the laser beam may be changed for individual distance measurement unit. Therefore, according to the distance measurement device 10A, it is possible to easily change the irradiation positions of the plurality of laser beams.

In the distance measurement device 10A, the position and distance correspondence information is generated for the individual distance measurement unit (step 254J), and the in-actual-image irradiation position is derived for every individual distance measurement unit based on the generated position and distance correspondence information (steps 264 and 266). Therefore, according to the distance measurement device 10A, it is possible to derive the in-actual-image irradiation positions related to the individual distance measurement units with high accuracy compared to a case where the in-actual-image irradiation positions are derived for the individual distance measurement units without generating the position and distance correspondence information.

In the distance measurement device 10A, the length of the region corresponding to the interval between the two pixels associated with the region-length deriving target image is derived based on the distance measured by utilizing the distance measurement system function, the interval between the designated two pixels, and the focal length of the imaging device 14. The output unit 100C derives the derivation accuracy corresponding to the assumption factor as the irradiation position influence factor which is actually present in the distance measurement device 10A based on the position and distance correspondence information, and derives the error of the length of the region based on the derived derivation accuracy (step 286). The output unit 100C displays the derived error on the display unit 86 (step 288). Therefore, according to the distance measurement device 10A, the user can easily ascertain the error of the length of the region compared to a case where the error of the length of the region is not displayed even though the irradiation position influence factor is actually present.

In the distance measurement device 10A, the factor and accuracy correspondence information items acquired by associating different derivation accuracy with different assumption factors are stored in the factor and accuracy table 111. The output unit 100C derives the derivation accuracy associated with the assumption factor corresponding to the irradiation position influence factor which is actually present in the distance measurement device 10A from the factor and accuracy correspondence information (step 286). Therefore, according to the distance measurement device 10A, it is possible to accurately derive the derivation accuracy compared to a case where the derivation accuracy is associated with only a single assumption factor.

In the distance measurement device 10A, in a case where a plurality of irradiation position influence factors is actually present, the derivation accuracy associated with the assumption factors corresponding to the plurality of irradiation position influence factors which is actually present in the distance measurement device 10A are integrated, and the integrated derivation accuracy is derived (step 286). Therefore, according to the distance measurement device 10A, it is possible to achieve easy handling of the derivation accuracy compared to a case where the derivation accuracy associated with the assumption factors corresponding to the plurality of irradiation position influence factors which is actually present in the distance measurement device 10A are individually derived.

In the distance measurement device 10A, the derivation accuracy are integrated by Expression (6) which is a polynomial. Therefore, according to the distance measurement device 10A, it is possible to easily integrate the derivation accuracy compared to a case where a monomial is used.

In the distance measurement device 10A, the irradiation position influence factor includes the replacement of the lens, the replacement of the distance measurement unit, the change in the angle of view, the change in the emission direction, and the manufacturing variation. Therefore, according to the distance measurement device 10A, it is possible to derive the derivation accuracy with consideration for the influence of the applied factor compared to a case where any of the replacement of the lens, the replacement of the distance measurement unit, the change in the angle of view, the change in the emission direction, and the manufacturing variation is not used as the irradiation position influence factor.

In the distance measurement device 10A, the factor and accuracy correspondence information is stored in the factor and accuracy table 111 before the shipment of the distance measurement device 10A is performed. Therefore, according to the distance measurement device 10A, it is possible to rapidly derive the derivation accuracy compared to a case where the factor and accuracy correspondence information is generated after the shipment of the distance measurement device 10A is performed and the generated factor and accuracy correspondence information is stored in the factor and accuracy table 111.

In the distance measurement device 10A, a warning is issued by displaying the irradiation position adjustment recommendation screen 110 on the display unit 86 in a case where the error derived by the output unit 100C exceeds the threshold value (steps 248 and 250). Therefore, according to the distance measurement device 10A, the user can easily recognize that the error exceeds the threshold value compared to a case where the warning is not issued even though the error exceeds the threshold value.

In the distance measurement device 10A, in a case where the in-live-view-image irradiation position is out of the default range within the captured image (step 306: N), the measurement performed by the distance measurement control unit 68 is performed until the in-live-view-image irradiation position is positioned within the frame 127 (step 302). The in-live-view-image irradiation position is derived based on the distance measured by the distance measurement control unit 68 and the latest parameter including the latest emission angle (step 304). Therefore, according to the distance measurement device 10A, it is possible to perform the distance measurement in a state in which the in-live-view-image irradiation position is positioned within the frame 127.

In the distance measurement device 10A, in a case where the in-live-view-image irradiation position is out of the default range within the captured image, the measurement is performed by the distance measurement control unit 68, and the emission angle $\beta$ is changed by the rotation mechanism by deriving the motors 11B, 13B, and 17 until the in-live-view-image irradiation position is positioned within the frame 127. The in-live-view-image irradiation position is derived based on the distance measured by the distance measurement control unit 68 and the latest parameter including the latest emission angle $\beta$. Therefore, according to the distance measurement device 10A, it is possible to reduce an effort to position the in-live-view-image irradiation position within the frame 127 compared to a case where the emission angle $\beta$ is changed without using the motors 11B, 13B, and 17 and the rotation mechanism.

In the distance measurement device 10A, the frame 117 including the irradiation position mark 116 is designated for every in-actual-image irradiation position. Two pixels inside the frame 117 are designated for every frame 117 by the user through the touch panel 88. The deriving unit 100B derives the length of the region corresponding to the interval between the designated two pixels based on the distance related to the in-actual-image irradiation position within the frame 117 which is measured through the actual measurement, the interval between the designated two pixels, and the focal length (step 284). Therefore, according to the distance measurement device 10A, it is possible to derive the length of the region based on the distance measured based on the laser beam among the plurality of laser beams which is desired to be used by the user in the deriving of the length of the region compared to a case where the frame 117 including the irradiation position mark 116 is not designated.

In the distance measurement device 10A, two laser beams are emitted by the distance measurement unit 12. One laser beam is emitted to an external wall portion on a front surface of one of the office buildings arranged in the front and the rear in the imaging direction, and the other laser beam is emitted to an external wall portion on a front surface of the other one of the office buildings arranged in the front and the rear in the imaging direction (see, for example, FIGS. 21, and 29 to 31). The distance measurement control unit 68 measures the distances based on the laser beams, and the deriving unit 100B derives the lengths of the region designated by the user for the measured distances (step 284). Therefore, according to the distance measurement device 10A, it is possible to easily derive the lengths of the different regions by using the two office buildings as the targets compared to a case where only one laser beam is emitted to the office buildings.

Although it has been described in the first embodiment that the position of the frame 127 is fixed, the technology of the present disclosure is not limited thereto. For example, the position of the frame 127 may be changed according to an instruction received through the touch panel 88. The size of the frame 127 may be fixed, and may be changed according to, for example, an instruction received through the touch panel 88.

Although it has been described in the first embodiment that the frame 127 has the rectangular shape, the technology of the present disclosure is not limited thereto, and may have, for example, a frame having another shape such as an oval shape, a square shape, or a triangular shape formed in a closed region.

Although it has been described in the first embodiment that the emission angle is updated according to the rotation of the individual distance measurement unit, the technology of the present disclosure is not limited thereto, and the inter-reference-point distance d together with the emission angle may also be updated. For example, in a case where the inter-reference-point distance d is updated, the in-actual-image irradiation position and/or the in-live-view-image irradiation position may be derived based on the latest parameter including the updated inter-reference-point distance d in step 304 shown in FIG. 28.

Although it has been described in the first embodiment that the derivation accuracy is derived by the output unit 100C based on the factor and accuracy correspondence information, the technology of the present disclosure is not limited thereto. For example, the derivation accuracy may be derived based on a calculation expression in which the assumption factor is used as the independent variable and the derivation accuracy is used as the dependent variable. As stated above, the derivation accuracy may be output by the output unit 100C based on the calculation expression or the factor and accuracy correspondence information acquired by prescribing the correspondence relation between the assumption factors and the derivation accuracy.

Although it has been described in the first embodiment that the error is derived as an example of the "information based on the derivation accuracy" according to the technology of the present disclosure based on the derivation accuracy derived by the output unit 100C and the derived error is displayed on the display unit 86, the technology of the present disclosure is not limited thereto. For example, the derivation accuracy itself derived as an example of the information based on the derivation accuracy" according to the technology of the present disclosure by the output unit 100C may be displayed on the display unit 86. For example, both the error and the derivation accuracy derived as the example of the "information based on the derivation accuracy" according to the technology of the present disclosure may be displayed on the display unit 86.

Although it has been described in the first embodiment that the factor and accuracy table 111 is previously stored in the secondary storage unit 104 before the shipment of the distance measurement device 10A is performed, the technology of the present disclosure is not limited thereto. That is, the factor and accuracy table 111 may be stored in the secondary storage unit 104 until the output unit 100C is activated for the first time. For example, the factor and value table 111 may be downloaded until the output unit 100C is activated for the first time after the shipment of the distance measurement device 10A is performed.

Although it has been described in the first embodiment that the factor and accuracy correspondence information stored in the factor and accuracy table 111 is fixed, the technology of the present disclosure is not limited thereto. For example, the factor and accuracy correspondence information may be rewritten according to an instruction received through the touch panel 88 after the shipment of the distance measurement device 10A is performed.

Although it has been described in the first embodiment that the output unit 100C integrates the multiple derivation accuracy by using the polynomial, the technology of the present disclosure is not limited thereto, and the multiple derivation accuracy may be integrated by using an integration table (not shown) from which the same output as that of the polynomial is acquired by the output unit 100C.

Although it has been described in the first embodiment that the length of the region is derived, the technology of the present disclosure is not limited, and an area of the real-space region corresponding to an image region defined by a plurality of pixels designated by the user may be derived by utilizing the dimension deriving function. For example, the "image region defined by the plurality of designated pixels" is an image region surrounded by three or more designated pixels.

Although it has been described in the first embodiment on the assumption that the external wall portion of the office building is captured by the distance measurement device 10A in a state in which the external wall portion of the office building does not face the imaging lens 50 in front view, the technology of the present disclosure is not limited thereto. That is, the external wall portion of the office building may be captured by the distance measurement device 10A in a state in which the external wall portion of the office building faces the imaging lens 50 in front view. In this case, the processes of steps 276 and 278 included in the measurement process may be omitted.

Although it has been described in the first embodiment that separate office buildings (office buildings constructed in separated positions) are used as the examples and the office buildings are irradiated with the laser beam, the technology of the present disclosure is not limited thereto. For example, one office building may be irradiated with the plurality of laser beams. Of one office building, planar regions (for example, external wall surfaces) of which at least one of a position and an orientation is different may be irradiated with the laser beam.

Although it has been described in the first embodiment that the error based on the manufacturing variation is displayed on the display unit 86, the technology of the present disclosure is not limited thereto, and the error of the manufacturing variation may be displayed on the display unit 86.

Although it has been described in the first embodiment that the change in the angle of view, the replacement of the lens, the replacement of the distance measurement unit, the change in the emission direction, and the manufacturing variation are included in the factor and accuracy correspondence information, the technology of the present disclosure is not limited thereto. For example, the manufacturing variation may be included in the factor and accuracy correspondence information. As stated above, at least one of the change in the angle of view, the replacement of the lens, the replacement of the distance measurement unit, the change in the emission direction, or the manufacturing variation may be removed from the factor and accuracy correspondence information.

Although it has been described in the first embodiment that the irradiation position mark 116 is displayed, the technology of the present disclosure is not limited thereto. The parameters derived by performing the processes of steps 240 and 264 may also be displayed.

Although it has been described in the first embodiment that since it is assumed that three parameters such as the half angle of view α, the emission angle β, and the inter-reference-point distance d are uncertain parameters, the provisional measurement and the provisional imaging are performed three times, the technology of the present disclosure is not limited thereto. Even though three parameters such as the half angle of view α, the emission angle β, and the inter-reference-point distance d are the uncertain parameters, the provisional measurement and the provisional imaging may be performed four or more times. The greater the number of times the provisional measurement and the provisional imaging are performed, the higher the accuracy. In a case where the uncertain parameters are two, the provisional measurement and the provisional imaging may be performed at least two times, and in a case where the uncertain parameter is one, the provisional measurement and the provisional imaging may be performed at least one time.

Although it has been described in the first embodiment that the replacement of the lens, the replacement of the distance measurement unit, the change in the angle of view, the change in the emission direction, and the manufacturing variation are used as the irradiation position influence factor, the technology of the present disclosure is not limited thereto. At least one thereof may be used as the irradiation position influence factor. For example, an event that a predetermined period (for example, 30 days) elapses after the parameter is derived in the previous stage may be used as the irradiation position influence factor. An event that an absolute value of a change amount of at least one of temperature or humidity exceeds a reference value may be used as the irradiation position influence factor. An event that a specific constituent member of the distance measurement unit 12 or the imaging device 14 is replaced or an event that the specific constituent member is removed may be used as the irradiation position influence factor.

A detection unit that detects that the irradiation position influence factor occurs may be provided in the distance measurement device 10A, or information indicating that the irradiation position influence factor occurs may be input by the user through the touch panel 88. A detection unit that detects that the plurality of irradiation position influence factors occurs may be provided in the distance measurement device 10A, or information indicating that the plurality of irradiation position influence factors occurs may be input by the user through the touch panel 88.

Although it has been described in the first embodiment that the distance measurement control unit 68 is built in the imaging device main body 18, the distance measurement control unit 68 may be provided in not the imaging device main body 18 but the distance measurement unit 12. In this case, the entire distance measurement unit 12 may be controlled by the distance measurement control unit 68 built in the distance measurement unit 12 under the control of the main control unit 62.

Second Embodiment

Although it has been described in the first embodiment that the in-live-view-image irradiation position is derived regardless of a dissimilarity between the distances before and after the measurement is performed, it will be described in a second embodiment that whether or not to derive the in-live-view-image irradiation position depending on the dissimilarity between the distances before and after the measurement is performed. In the second embodiment, since the same constituent elements as the constituent elements described in the first embodiment will be assigned the same references, the description thereof will be omitted, and only portions different from those of the first embodiment will be described.

The distance measurement device 10B (see FIGS. 1 and 5) according to the second embodiment is different from the distance measurement device 10A in that an irradiation position adjustment program 132 instead of the irradiation position adjustment program 108 is stored in the secondary storage unit 104 (see FIG. 10).

Figure 32:
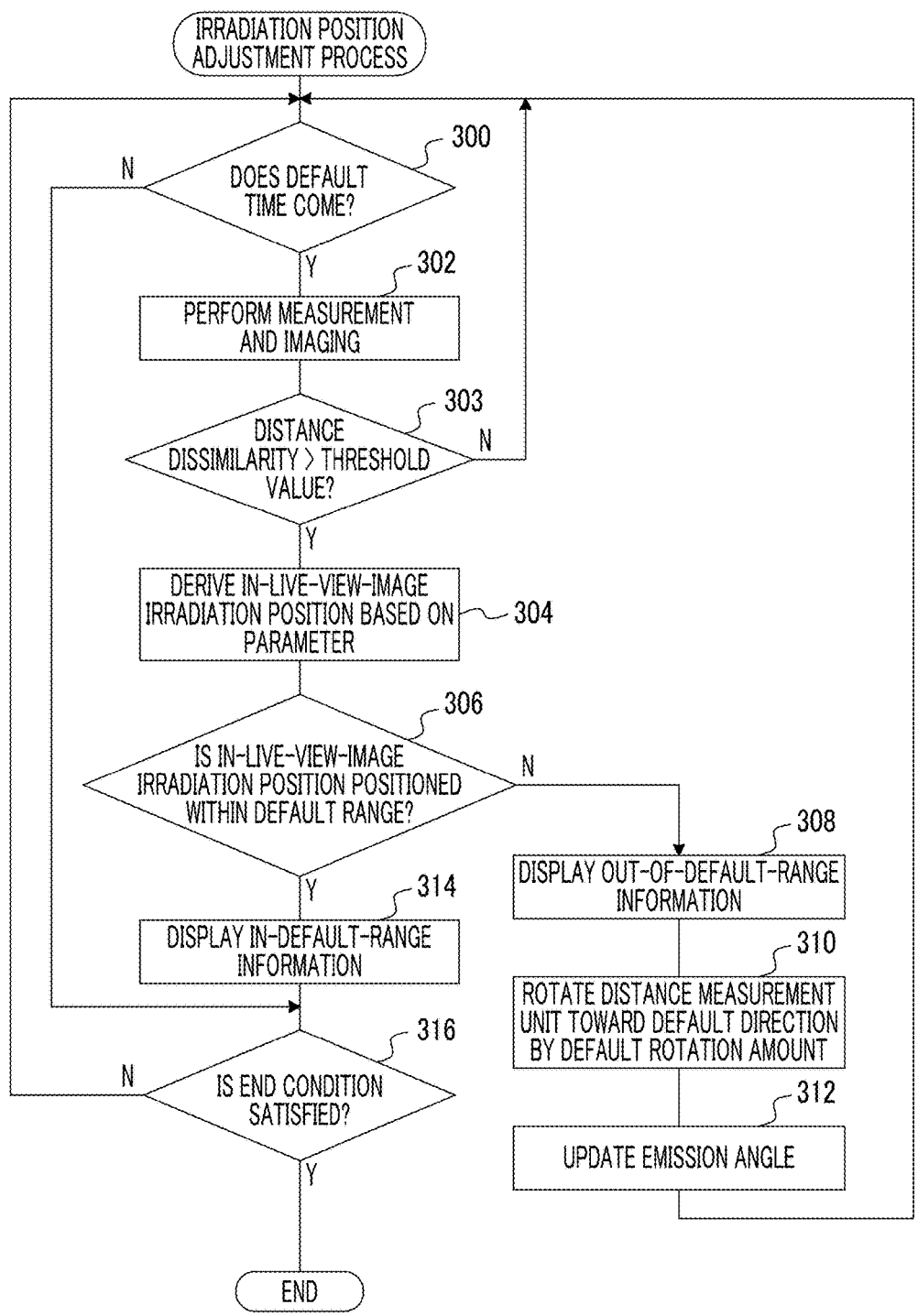
FIG. 32 is a flowchart showing an example of a flow of an irradiation position adjustment process according to the second embodiment.

A distance measurement device 10B according to the second embodiment is different from the distance measurement device 10A in that an irradiation position adjustment process shown in FIG. 32 is performed instead of the irradiation position adjustment process shown in FIG. 28.

Next, an irradiation position adjustment process which is realized as the action of the distance measurement device 10B by performing the irradiation position adjustment program 132 in the CPU 100 will be described with reference to FIG. 32. The same steps as those of the flowcharts shown in FIG. 28 will be assigned the same step numbers, and thus, the description thereof will be omitted. Hereinafter, for the sake of convenience in description, it will be described on the assumption that the process of step 242 and step 266 of the distance measurement process described in the first embodiment is already performed.

The irradiation position adjustment process shown in FIG. 32 is different from the irradiation position adjustment process shown in FIG. 28 in that step 303 is provided between the step 302 and step 304.

In step 303, the control unit 100A derives a distance dissimilarity, and determines whether or not the derived distance dissimilarity exceeds a threshold value. In a case where the process of step 304 is already performed, the distance dissimilarity is a dissimilarity between the distance used in the previous deriving task of the in-live-view-image irradiation position performed by the deriving unit 100B and the latest distance measured by performing the process of step 302.

In step 303, in a case where the process of step 304 is already performed, an absolute value of a difference between the distance used in the previous deriving task of the in-live-view-image irradiation position performed by the deriving unit 100B and the latest distance measured by performing the process of step 302 is used as an example of the distance dissimilarity.

For example, in a case where the process of step 304 is not performed yet, the distance dissimilarity is a dissimilarity between the distance used in the deriving of the in-actual-image irradiation position performed by the deriving unit 100B and the latest distance measured by performing the process of step 302.

In step 303, in a case where the process of step 304 is not performed yet, an absolute value of a difference between the distance used in the deriving of the in-actual-image irradiation position performed by the deriving unit 100B and the latest distance measured by performing the process of step 302 is used as the example of the distance dissimilarity.

Although the absolute value of the difference is used as the example of the distance dissimilarity, the technology of the present disclosure is not limited thereto. For example, in a case where the process of step 304 is not performed yet, a ratio of the latest distance measured by performing the process of step 302 to the distance used in the deriving of the in-actual-image irradiation position performed by the deriving unit 100B may be used as the distance dissimilarity. For example, a ratio of the latest distance measured by performing the process of step 302 to the distance used in the previous deriving task of the in-live-view-image irradiation position performed by the deriving unit 100B may be used as the distance dissimilarity.

In a case where the distance dissimilarity exceeds the threshold value in step 303, the determination result is positive, and the process proceeds to step 304. In a case where the distance dissimilarity is equal to or less than the threshold value in step 303, the determination result is negative, and the process proceeds to step 300.

As described above, in the distance measurement device 10B, the distance measurement is intermittently measured by performing the process of step 300 (step 302). In a case where the latest distance dissimilarity is equal to or greater than the threshold value (step 303: Y), the processes subsequent to step 304 are performed.

Therefore, according to the distance measurement device 10B, it is possible to easily to maintain the in-live-view-image irradiation position in the frame 127 compared to a case where the processes subsequent to step 304 are not performed in a case where the distance dissimilarity is equal to or greater than the threshold value.

Third Embodiment

Although it has been described in the second embodiment that the in-live-view-image irradiation position is able to be adjusted under the condition in which the default time comes, it will be described in a third embodiment that the in-live-view-image irradiation position is able to be adjusted under the condition in which the release button is half pressed. In the third embodiment, since the same constituent elements as the constituent elements described in the first and second embodiments will be assigned the same references, the description thereof will be omitted, and only portions different from those of the first and second embodiments will be described.

The distance measurement device 10C according to the third embodiment is different from the distance measurement device 10B in that an irradiation position adjustment program 134 instead of the irradiation position adjustment program 132 is stored in the secondary storage unit 104 (see FIG. 10).

Figure 33:
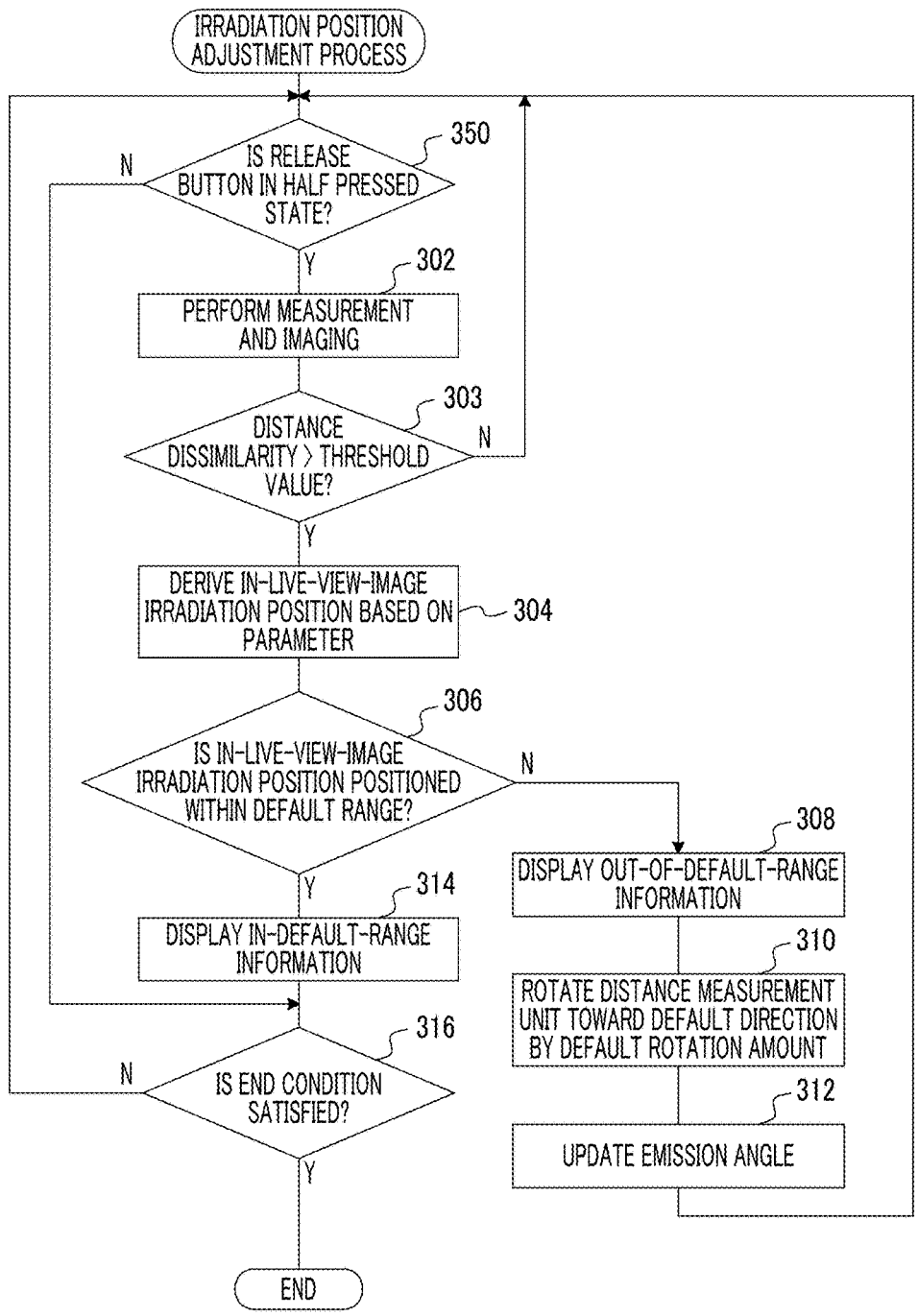
FIG. 33 is a flowchart showing an example of a flow of an irradiation position adjustment process according to the third embodiment.

A distance measurement device 10C (see FIGS. 1 and 5) according to the third embodiment is different from the distance measurement device 10B in that an irradiation position adjustment process shown in FIG. 33 is performed instead of the irradiation position adjustment process shown in FIG. 32.

Next, an irradiation position adjustment process which is realized as the action of the distance measurement device 10C by performing the irradiation position adjustment program 134 in the CPU 100 will be described with reference to FIG. 33. The same steps as those of the flowcharts shown in FIG. 32 will be assigned the same step numbers, and thus, the description thereof will be omitted.

The irradiation position adjustment process shown in FIG. 33 is different from the irradiation position adjustment process shown in FIG. 32 in that step 350 is provided instead of step 300.

In step 350, the control unit 100A determines whether or not the release button is in the half pressed state. In a case where the release button is in the half pressed state in step 350, the determination result is positive, and the process proceeds to step 302. In a case where the release button is not in the half pressed state in step 350, the determination result is negative, and the process proceeds to step 316.

As described above, in the distance measurement device 10C, in a case where the release button is in the half pressed state (step 350: Y), the processes subsequent to step 302 are performed.

Therefore, according to the distance measurement device 10C, it is possible to prevent the in-live-view-image irradiation position from entering a state in which the in-live-view-image irradiation position is not positioned within the frame 127 at the time of the actual exposing compared to a case where the processes subsequent to step 302 are not performed in a case where the release button is in the half pressed state.

Fourth Embodiment

Although it has been described in the first to third embodiments that the individual distance measurement unit is rotated by activating the rotation mechanism by the power generated by the motors 11B, 13B, and 17, it will be described in a fourth embodiment that the individual distance measurement unit is manually rotated. In the fourth embodiment, since the same constituent elements as the constituent elements described in the first to third embodiments will be assigned the same references, the description thereof will be omitted, and only portions different from those of the first to third embodiments will be described.

Figure 34:
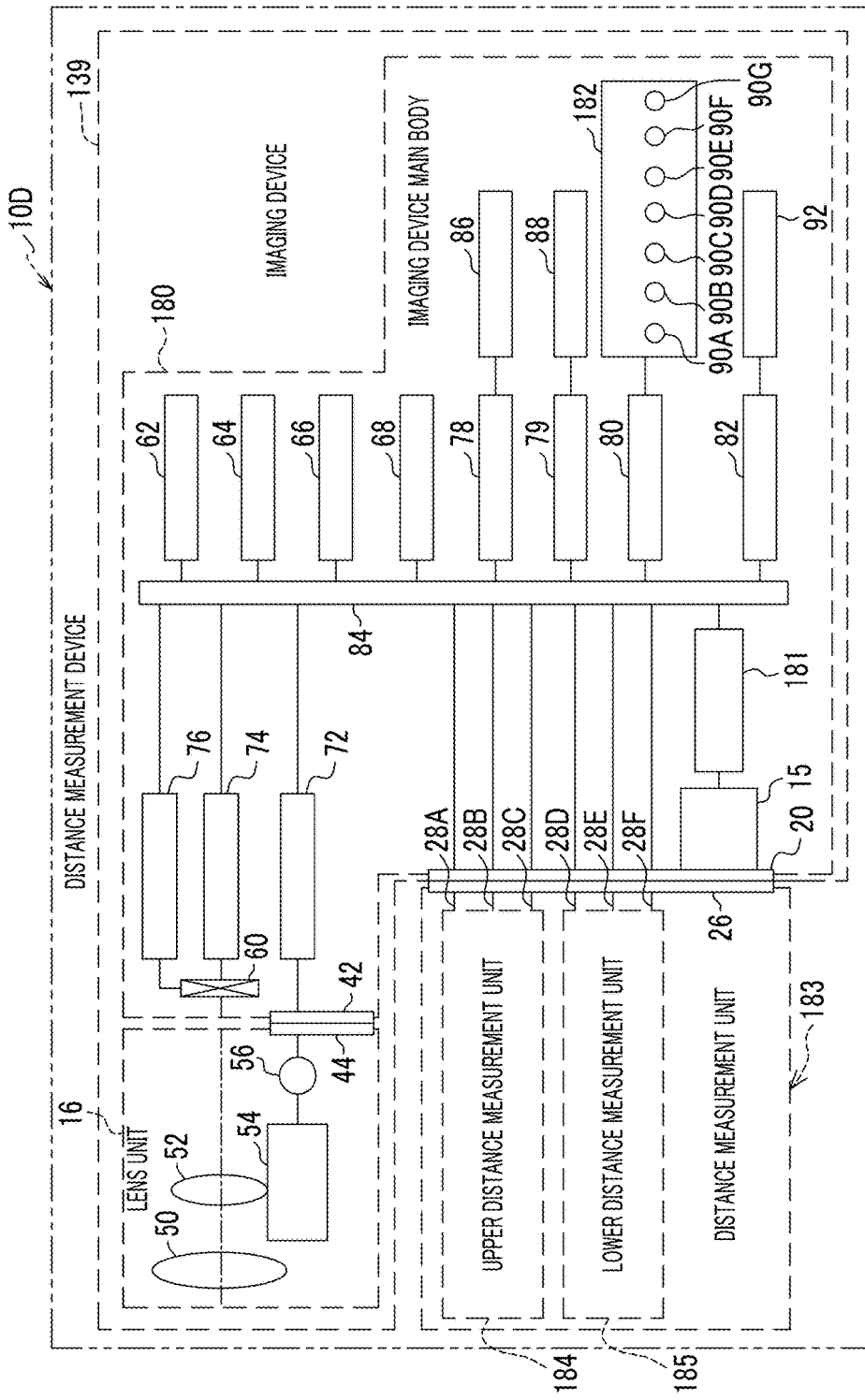
FIG. 34 is a block diagram showing an example of a hardware configuration of main parts of the distance measurement device according to the fourth embodiment.

For example, as shown in FIG. 34, a distance measurement device 10D according to the fourth embodiment is different from the distance measurement device 10C in that the imaging device 139 instead of the imaging device 14 is provided. The imaging device 139 is different from the imaging device 14 in that an imaging device main body 180 instead of the imaging device main body 18 is provided. The imaging device main body 180 is different from the imaging device main body 18 in that a rotary encoder 181 is provided instead of the motor 17 and the motor driver 25. The imaging device main body 180 is different from the imaging device main body 18 in that the motor drivers 21 and 23 are not included.

The distance measurement device 10D according to the fourth embodiment is different from the distance measurement device 10C in that a reception device 182 is provided instead of the reception device 90. The reception device 182 is different from the reception device 90 in that the upper rotary switch 90H, the lower rotary switch 90I, and the longitudinal rotation rotary switch 90J are not provided.

The distance measurement device 10D according to the fourth embodiment is different from the distance measurement device 10C in that a distance measurement unit 183 is provided instead of the distance measurement unit 12. The distance measurement unit 183 is different from the distance measurement unit 12 in that an upper distance measurement unit 184 is provided instead of the upper distance measurement unit 11 and a lower distance measurement unit 185 is provided instead of the lower distance measurement unit 13. In the fourth embodiment, the upper distance measurement unit 184 and the lower distance measurement unit 185 are referred to as the "individual distance measurement unit" in a case where it is not necessary to distinguish between the upper distance measurement unit 184 and the lower distance measurement unit 185.

Figure 35:
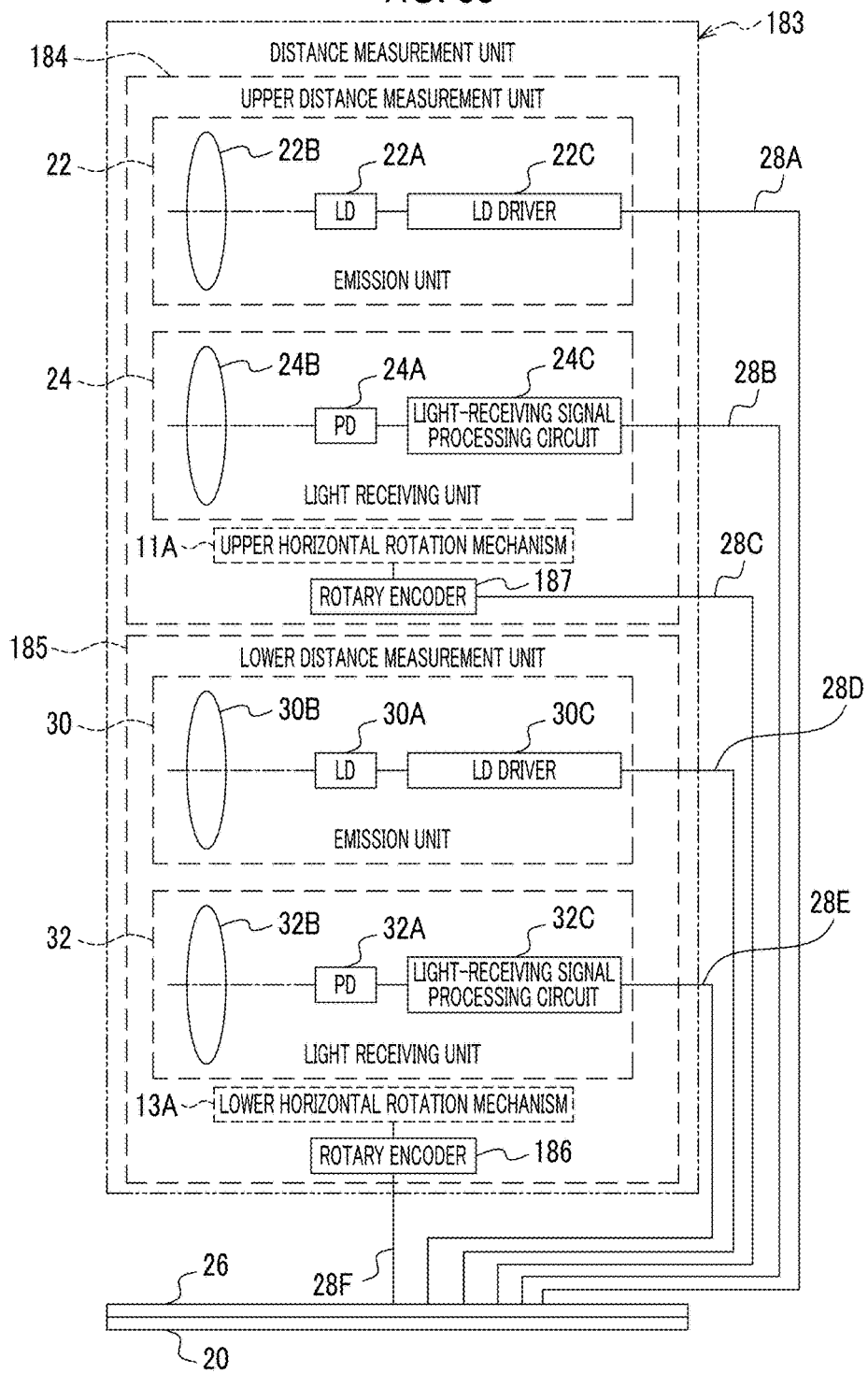
FIG. 35 is a block diagram showing an example of a hardware configuration of main parts of the distance measurement unit according to the fourth embodiment.

For example, the upper distance measurement unit 184 is different from the upper distance measurement unit 11 in that a rotary encoder 187 is provided instead of the motor 11B, as shown in FIG. 35. The lower distance measurement unit 185 is different from the lower distance measurement unit 13 in that a rotary encoder 186 is provided instead of the motor 13B.

The rotary encoder 181 is connected to the longitudinal rotation mechanism 15 and the busline 84, and detects the rotation direction and the rotation amount of the hot shoe 20 rotated by the longitudinal rotation mechanism 15. The main control unit 62 acquires the rotation direction and the rotation amount detected by the rotary encoder 181.

The rotary encoder 187 is connected to the upper horizontal rotation mechanism 11A. The rotary encoder 187 is connected to the connector 26 through the signal line 28C, and detects the rotation direction and the rotation amount of the upper distance measurement unit 184 rotated by the upper horizontal rotation mechanism 11A. The main control unit 62 acquires the rotation direction and the rotation amount detected by the rotary encoder 187.

The rotary encoder 186 is connected to the lower horizontal rotation mechanism 13A. The rotary encoder 186 is connected to the connector 26 through the signal line 28F, and detects the rotation direction and the rotation amount of the lower distance measurement unit 185 rotated by the lower horizontal rotation mechanism 13A. The main control unit 62 acquires the rotation direction and the rotation amount detected by the rotary encoder 186.

The distance measurement device 10D according to the fourth embodiment is different from the distance measurement device 10C in that a measurement program 136 instead of the measurement program 107 is stored in the secondary storage unit 104 (see FIG. 10).

The distance measurement device 10D according to the fourth embodiment is different from the distance measurement device 10C in that an irradiation position adjustment program 137 instead of the irradiation position adjustment program 134 is stored in the secondary storage unit 104 (see FIG. 10).

Figure 36:
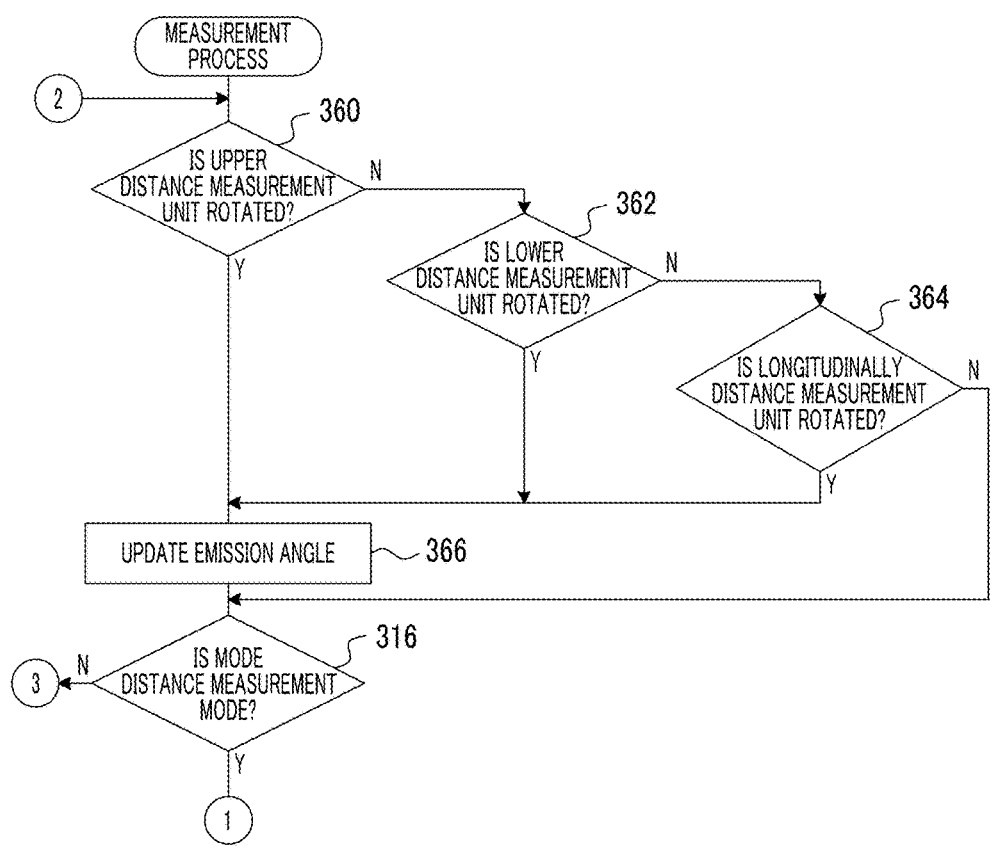
FIG. 36 is a flowchart showing an example of a flow of a measurement process according to the fourth embodiment.

A distance measurement device 10D according to the fourth embodiment is different from the distance measurement device 10C in that a measurement process shown in FIG. 36 is performed instead of the measurement process shown in FIG. 16.

Figure 37:
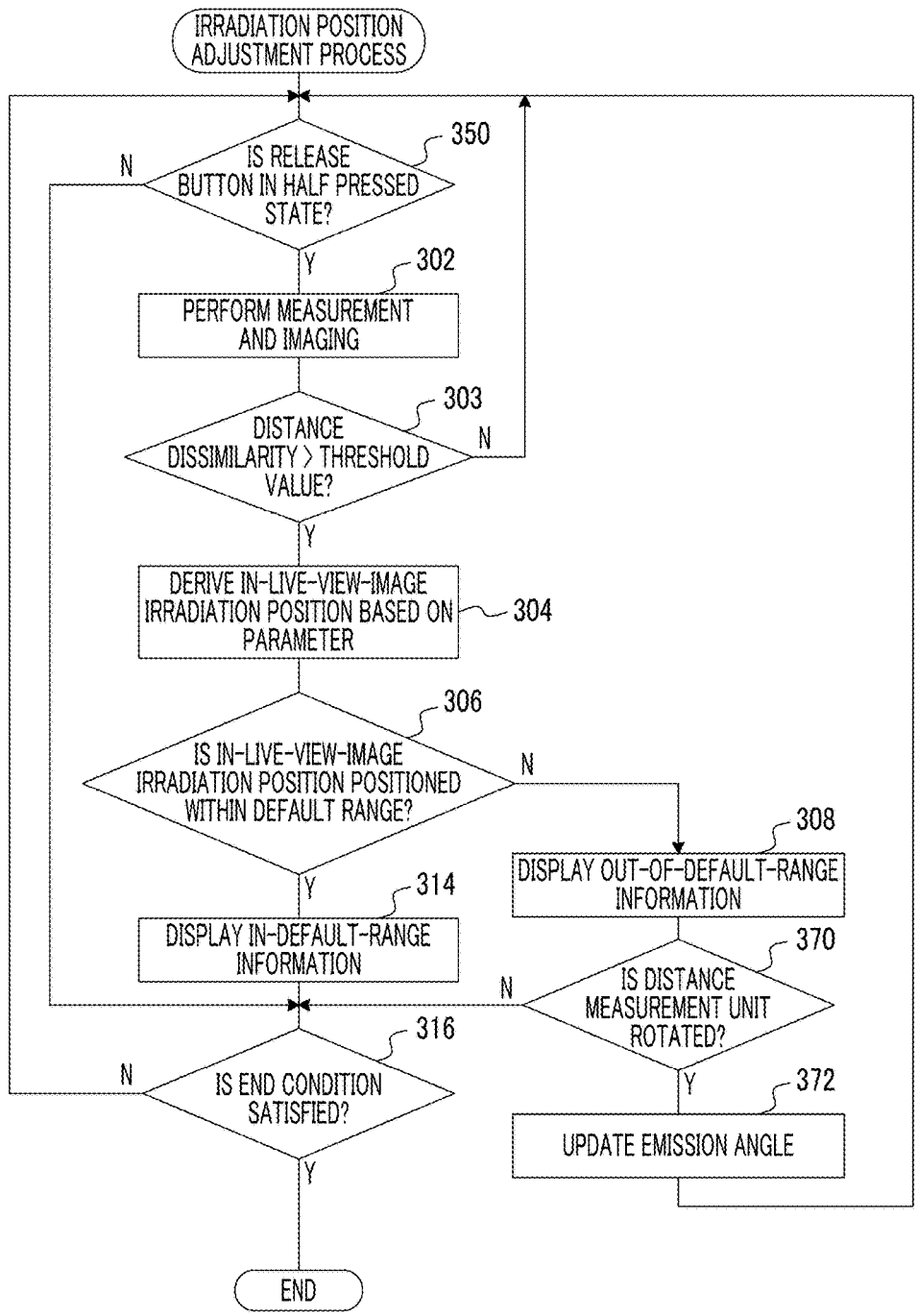
FIG. 37 is a flowchart showing an example of a flow of an irradiation position adjustment process according to the fourth embodiment.

A distance measurement device 10D according to the fourth embodiment is different from the distance measurement device 10C in that an irradiation position adjustment process shown in FIG. 37 is performed instead of the irradiation position adjustment process shown in FIG. 33.

Next, a measurement process which is realized as the action of the distance measurement device 10D by performing the measurement program 136 in the CPU 100 will be described with reference to FIG. 36. The same steps as those of the flowcharts shown in FIG. 16 will be assigned the same step numbers, and thus, the description thereof will be omitted.

For the sake of convenience in description, it will be described in the fourth embodiment on the assumption that the rotation range of the upper distance measurement unit 184 in the horizontal direction and the rotation range of the lower distance measurement unit 185 in the horizontal direction are previously restricted such that the real-space irradiation position is included in the angle of view set at a current point of time. It will be described in the fourth embodiment on the assumption that the rotation range of the distance measurement unit 183 in the longitudinal direction is also restricted such that the real-space irradiation position is included in the angle of view set at a current point of time.

The measurement process shown in FIG. 36 is different from the measurement process shown in FIG. 16 in that steps 222, 226, and 230 are not provided. The measurement process shown in FIG. 36 is different from the measurement process shown in FIG. 16 in that step 360 is provided instead of step 220, step 362 is provided instead of step 224, and step 364 is provided instead of step 228.

In step 360, the control unit 100A determines whether or not the upper distance measurement unit 184 is rotated. In a case where the upper distance measurement unit 184 is not rotated in step 360, the determination result is negative, and the process proceeds to step 362. In a case where the upper distance measurement unit 184 is rotated in step 360, the determination result is positive, and the process proceeds to step 366.

In step 362, the control unit 100A determines whether or not the lower distance measurement unit 185 is rotated. In a case where the lower distance measurement unit 185 is not rotated in step 362, the determination result is negative, and the process proceeds to step 364. In a case where the lower distance measurement unit 185 is rotated in step 362, the determination result is positive, and the process proceeds to step 366.

In step 366, the control unit 100A updates the emission angle β according to the rotation direction and the rotation amount of the individual distance measurement unit. Thereafter, the process proceeds to step 316.

Next, an irradiation position adjustment process which is realized as the action of the distance measurement device 10D by performing the irradiation position adjustment program 137 in the CPU 100 will be described with reference to FIG. 37. The same steps as those of the flowcharts shown in FIG. 33 will be assigned the same step numbers, and thus, the description thereof will be omitted.

The irradiation position adjustment process shown in FIG. 37 is different from the irradiation position adjustment process shown in FIG. 33 in that step 370 is provided instead of step 310 and step 372 is provided instead of step 312.

In step 370, the control unit 100A determines whether or not the individual distance measurement unit is rotated. In a case where the individual distance measurement unit is not rotated in step 370, the determination result is negative, and the process proceeds to step 316. In a case where the individual distance measurement unit is rotated in step 370, the determination result is positive, and the process proceeds to step 372.

In step 372, the control unit 100A updates the emission angle β according to the rotation direction and the rotation amount of the individual distance measurement unit. Thereafter, the process proceeds to step 350.

As described above, in the distance measurement device 10D, the individual distance measurement unit is manually rotated, and the measurement process is performed based on the rotation amount and the rotation direction of the individual distance measurement unit.

In the distance measurement device 10D, in a case where the individual distance measurement unit is manually rotated and the in-live-view-image irradiation position is out of the frame 127, the distance is measured by the distance measurement control unit 68 until the in-live-view-image irradiation position is positioned within the frame 127. The in-live-view-image irradiation position is derived by the deriving unit 100B based on the measured distance and the emission angle β.

Therefore, according to the distance measurement device 10D, it is possible to easily reflect an intention of the user on the change of the emission angle β compared to a case where the individual distance measurement unit is not able to be manually rotated.

Fifth Embodiment

Although it has been described in the first embodiment that the parameter is derived and the in-actual-image irradiation position is derived based on the derived parameter, it will be described in a fifth embodiment that the in-actual-image irradiation position is derived without deriving the parameter. In the fifth embodiment, since the same constituent elements as the constituent elements described in the first embodiment will be assigned the same references, the description thereof will be omitted, and only portions different from those of the first embodiment will be described.

The distance measurement device 10E (see FIGS. 1 and 5) according to the fifth embodiment is different from the distance measurement device 10A in that a measurement program 138 instead of the measurement program 107 is stored in the secondary storage unit 104 (see FIG. 10).

Next, a measurement process which is realized as the action of the distance measurement device 10E by performing the measurement program 138 in the CPU 100 in a case where a power switch of the distance measurement device 10E is turned on will be described with reference to FIGS. 38 and 39. The same steps as those of the flowcharts shown in FIGS. 17 and 18 will be assigned the same step numbers, and thus, the description thereof will be omitted.

Figure 38:
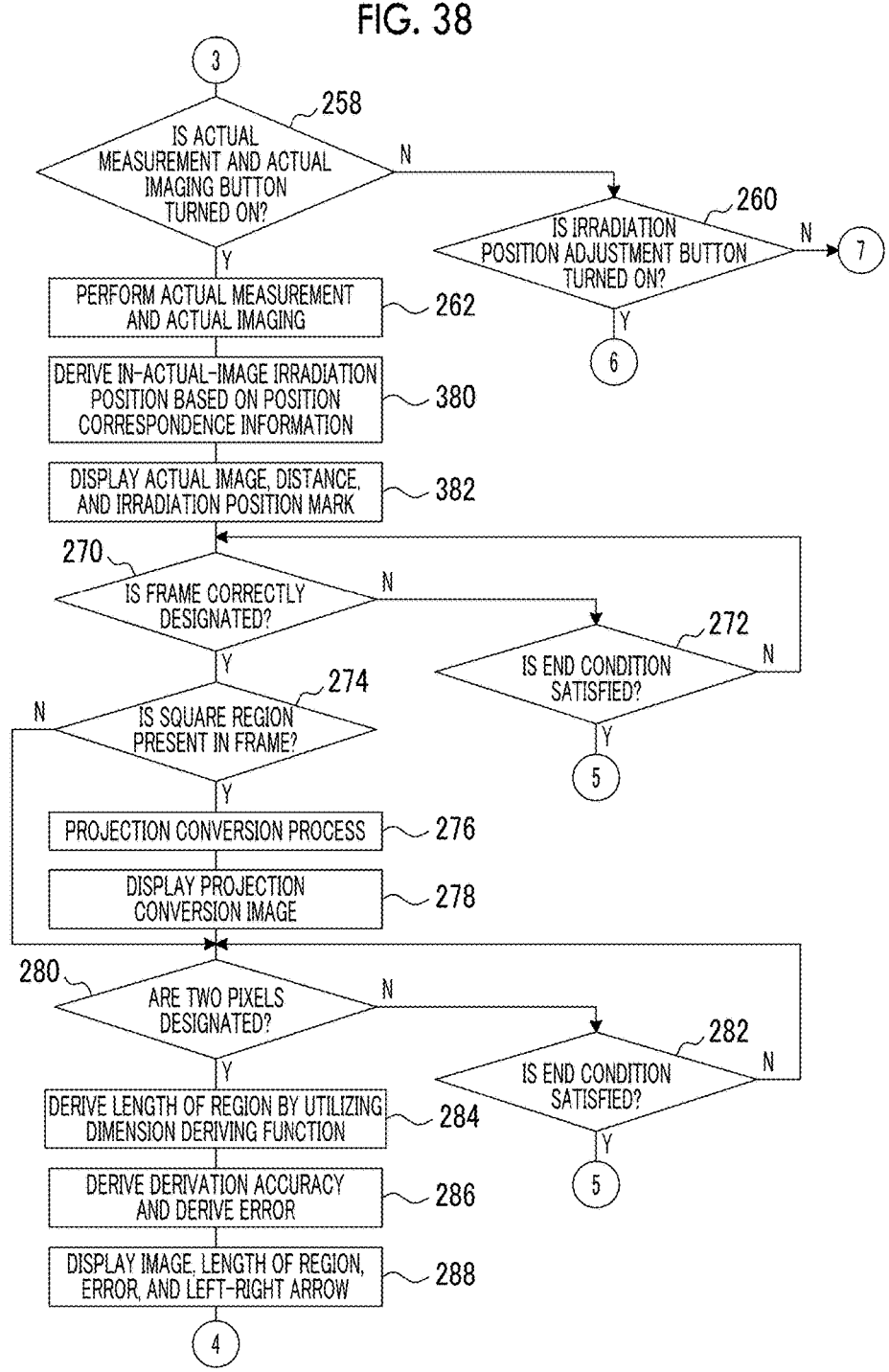
FIG. 38 is a flowchart showing an example of a flow of the measurement process according to the fifth embodiment, and is also a flowchart subsequent to the flowchart shown in FIG. 16.

The flowchart shown in FIG. 38 is different from the flowchart shown in FIG. 17 in that step 380 is provided instead of steps 264 and 266. The flowchart shown in FIG. 38 is different from the flowchart shown in FIG. 17 in that step 382 is provided instead of step 268.

Figure 39:
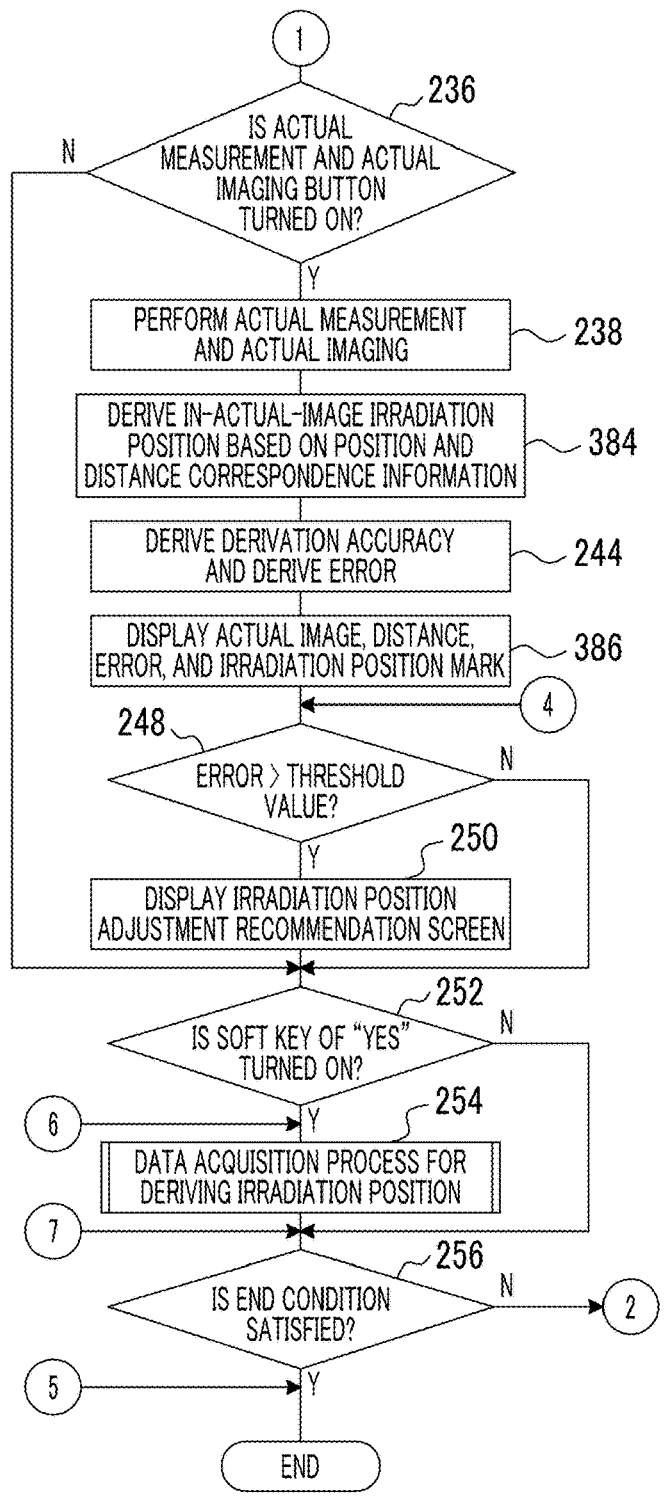
FIG. 39 is a flowchart showing an example of a flow of the measurement process according to the fifth embodiment, and is also a flowchart subsequent to the flowchart shown in FIG. 16.

The flowchart shown in FIG. 39 is different from the flowchart shown in FIG. 18 in that step 384 is provided instead of steps 240 and 242. The flowchart shown in FIG. 39 is different from the flowchart shown in FIG. 18 in that step 386 is provided instead of step 246.

In step 380 shown in FIG. 38, the deriving unit 100B derives the in-actual-image irradiation position for every individual distance measurement unit based on the position and distance correspondence information. Thereafter, the process proceeds to step 382.

Figure 40:
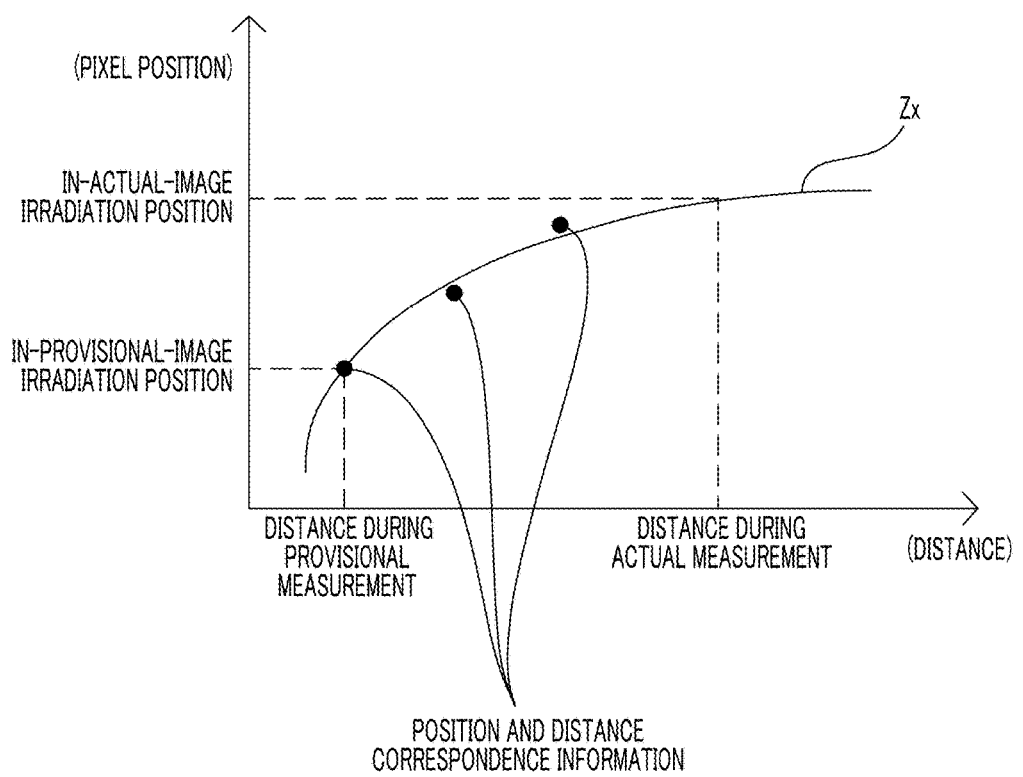
FIG. 40 is a graph showing an example of an approximate curve related to the latest position and distance correspondence information.

For example, in step 380, an approximate curve $Z_X$ is created for every individual distance measurement unit based on the position and distance correspondence information, as shown in FIG. 40. The in-actual-image irradiation position corresponding to the distance acquired by performing the actual measurement in step 262 is derived for every individual distance measurement unit from the approximate curve $Z_X$. That is, in step 380, the in-actual-image irradiation position is derived for every individual distance measurement unit from the relation between the approximate curve $Z_X$ prescribed by the position and distance correspondence information which is an example of the information indicating the first correspondence relation according to the technology of the present disclosure and the distance acquired by performing the actual measurement.

For example, in step 382, the deriving unit 100B displays the actual image, the distance, and the irradiation position marks 116A and 116B on the display unit 86 for every individual distance measurement unit, as shown in FIG. 25. Thereafter, the process proceeds to step 270.

The irradiation position marks 116A and 116B displayed on the display unit 86 by performing the process of step 382 are marks indicating the in-actual-image irradiation position derived for the individual distance measurement units by performing the process of step 380.

In step 384 shown in FIG. 39, the deriving unit 100B derives the in-actual-image irradiation position for every individual distance measurement unit based on the position and distance correspondence information. Thereafter, the process proceeds to step 244.

For example, in step 384, an approximate curve $Z_X$ is created based on the position and distance correspondence information, as shown in FIG. 40. The in-actual-image irradiation position corresponding to the distance acquired by performing the actual measurement in step 238 is derived from the approximate curve $Z_X$. That is, in step 384, the in-actual-image irradiation position is derived for every individual distance measurement unit from the relation between the approximate curve $Z_X$ prescribed by the position and distance correspondence information which is an example of the information indicating the first correspondence relation according to the technology of the present disclosure and the distance acquired by performing the actual measurement.

For example, in step 386, the deriving unit 100B displays the actual image, the distance, the error, and the irradiation position marks 116A and 116B on the display unit 86 as shown in FIG. 21. Thereafter, the process proceeds to step 248.

The irradiation position marks 116A and 116B displayed on the display unit 86 by performing the process of step 386 are marks indicating the in-actual-image irradiation position derived by performing the process of step 384 for the individual distance measurement units.

As described above, in the distance measurement device 10E, the in-actual-image irradiation position is derived for every individual distance measurement unit from the relation between the approximate curve prescribed by the position and distance correspondence information and the distance acquired through the actual measurement. Therefore, according to the distance measurement device 10E, it is possible to derive the in-actual-image irradiation position with a simple configuration compared to a case where the in-actual-image irradiation position is derived for every individual distance measurement unit without using the approximate curve prescribed by the position and distance correspondence information.

Sixth Embodiment

Although it has been described in the first embodiment that the distance measurement device 10A is realized by the distance measurement unit 12 and the imaging device 14, a distance measurement device 10F (FIG. 41) realized by including a smart device 402 will be described in a sixth embodiment. In the sixth embodiment, since the same constituent elements as those of the above-described embodiments will be assigned the same references, the description thereof will be omitted, and only portions different from those of the above-described embodiments will be described.

In the sixth embodiment, the measurement programs 107, 136, and 137 are referred to as the "measurement program" without being assigned the references for the sake of convenience in description in a case where it is not necessary to distinguish between these measurement programs. In the sixth embodiment, the irradiation position adjustment programs 108, 132, 134, and 137 are referred to as the "irradiation position adjustment program" without being assigned the references for the sake of convenience in description in a case where it is not necessary to distinguish between the irradiation position adjustment programs. In the sixth embodiment, the factor storing program 106, the measurement programs, and the irradiation position adjustment programs are simply referred to as the "program" in a case where it is not necessary to distinguish between these programs.

Figure 41:
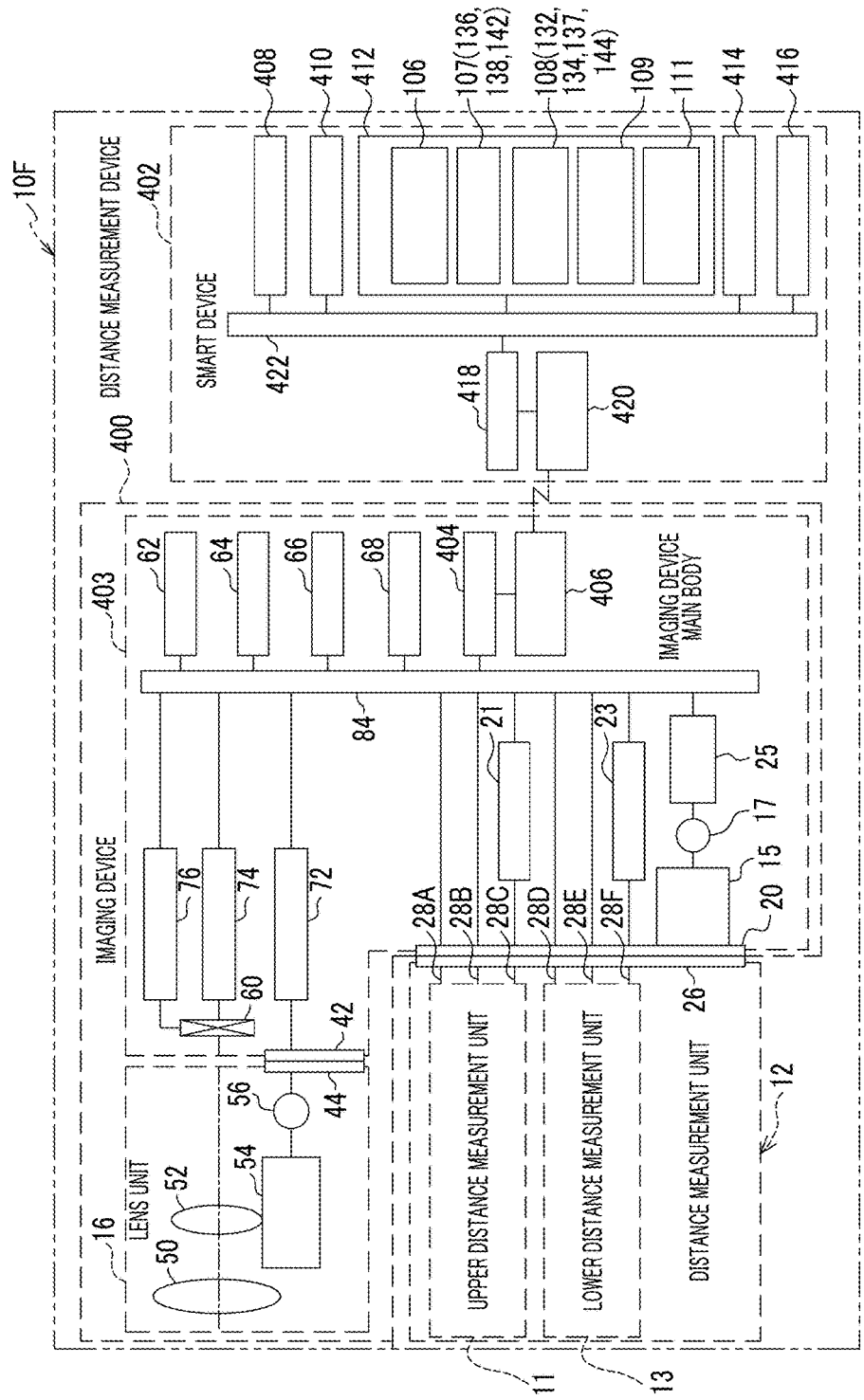
FIG. 41 is a block diagram showing an example of a hardware configuration of main parts of the distance measurement device according to the sixth embodiment.

For example, as shown in FIG. 41, the distance measurement device 10F according to the sixth embodiment is different from the distance measurement device 10A according to the first embodiment in that an imaging device 400 is provided instead of the imaging device 14. The distance measurement device 10F is different from the distance measurement device 10A in that the smart device 402 is provided.

The imaging device 400 is different from the imaging device 14 in that an imaging device main body 403 is provided instead of the imaging device main body 18.

The imaging device main body 403 is different from the imaging device main body 18 in that a wireless communication unit 404 and a wireless communication antenna 406 are provided.

The wireless communication unit 404 is connected to the busline 84 and the wireless communication antenna 406. The main control unit 62 outputs transmission target information which is information of a target transmitted to the smart device 402 to the wireless communication unit 404.

The wireless communication unit 404 transmits, as a radio wave, the transmission target information input from the main control unit 62 to the smart device 402 through the wireless communication antenna 406. In a case where a radio wave from the smart device 402 is received by the wireless communication antenna 406, the wireless communication unit 404 acquires a signal corresponding to the received radio wave, and outputs the acquired signal to the main control unit 62.

The smart device 402 includes a CPU 408, a primary storage unit 410, and a secondary storage unit 412. The CPU 408, the primary storage unit 410, and the secondary storage unit 412 are connected to a busline 422.

The CPU 408 controls the entire distance measurement device 10F including the smart device 402. The primary storage unit 410 is a volatile memory used as a work area in a case where various programs are executed. A RAM is used as an example of the primary storage unit 410. The secondary storage unit 412 is a non-volatile memory that stores various parameters and/or control programs for controlling the entire operation of the distance measurement device 10F including the smart device 402. A flash memory and/or an EEPROM are used as an example of the secondary storage unit 412.

The smart device 402 includes a display unit 414, a touch panel 416, a wireless communication unit 418, and a wireless communication antenna 420.

The display unit 414 is connected to the busline 422 through a display control unit (not shown), and displays various information items under the control of the display control unit. For example, the display unit 414 is realized by a LCD.

The touch panel 416 is layered on a display screen of the display unit 414, and senses touch using a pointer. The touch panel 416 is connected to the busline 422 through a touch panel I/F (not shown), and outputs positional information indicating a position touched by the pointer. The touch panel I/F activates the touch panel according to an instruction of the CPU 408, and the touch panel I/F outputs the positional information input from the touch panel 416 to the CPU 408.

The soft keys corresponding to the actual measurement and actual imaging button 90A, the provisional measurement and provisional imaging button 90B, the imaging system operation mode switching button 90C, the wide angle instruction button 90D, and the telephoto instruction button 90E described in the first embodiment are displayed on the display unit 414. The soft keys corresponding to the measurement system operation mode switching button 90F and the irradiation position adjustment button 90G described in the first embodiment are displayed on the display unit 414.

Figure 42:
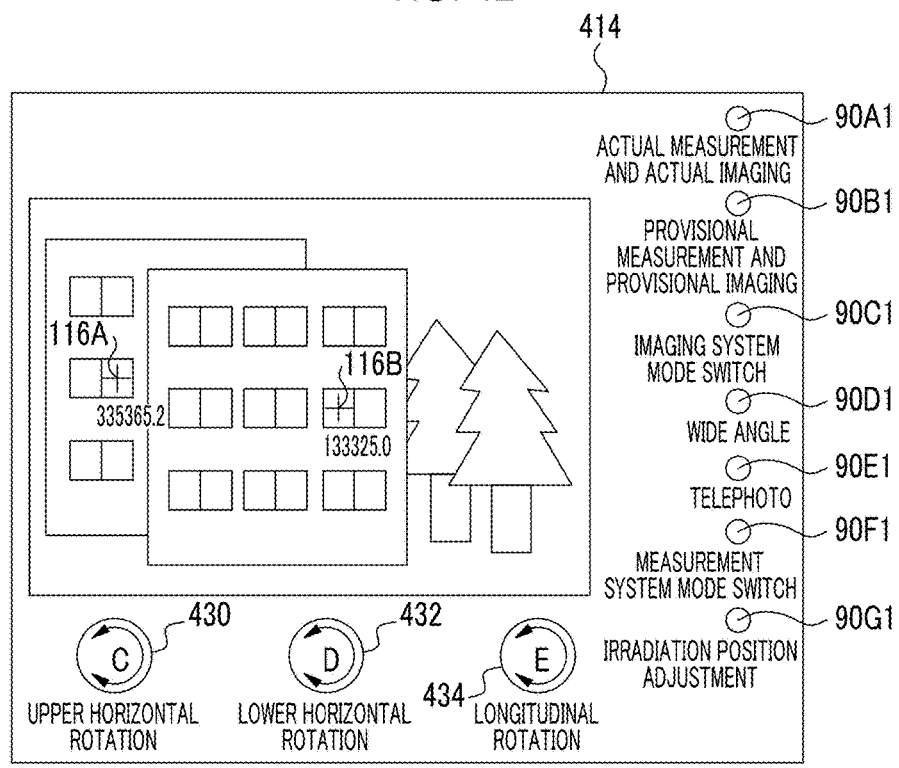
FIG. 42 is a screen diagram showing an example of a screen including an actual measurement and actual imaging button, a provisional measurement and provisional imaging button, an imaging system operation mode switching button, a wide angle instruction button, a telephoto instruction button, a measurement system operation mode switching button, an irradiation position adjustment button, an upper horizontal rotation touchpad, a lower horizontal rotation touchpad, and a longitudinal rotation touchpad displayed as soft keys on a display unit of a smart device according to the sixth embodiment.

For example, as shown in FIG. 42, an actual measurement and actual imaging button 90A1 functioning as the actual measurement and actual imaging button 90A is displayed as a soft key on the display unit 414, and is pressed by the user through the touch panel 416. For example, a provisional measurement and provisional imaging button 90B1 functioning as the provisional measurement and provisional imaging button 90B is displayed as a soft key on the display unit 414, and is pressed by the user through the touch panel 416. For example, an imaging system operation mode switching button 90C1 functioning as the imaging system operation mode switching button 90C is displayed as a soft key on the display unit 414, and is pressed by the user through the touch panel 416.

For example, a wide angle instruction button 90D1 functioning as the wide angle instruction button 90D is displayed as a soft key on the display unit 414, and is pressed by the user through the touch panel 416. For example, a telephoto instruction button 90E1 functioning as the telephoto instruction button 90E is displayed as a soft key on the display unit 414, and is pressed by the user through the touch panel 416.

For example, a measurement system operation mode switching button 90F1 functioning as the measurement system operation mode switching button 90F is displayed as a soft key on the display unit 414, and is pressed by the user through the touch panel 416. For example, an irradiation position adjustment button 90G1 functioning as the irradiation position adjustment button 90G is displayed as a soft key on the display unit 414, and is pressed by the user through the touch panel 416.

For example, an upper horizontal rotation touchpad 430, a lower horizontal touchpad 432, and a longitudinal rotation touchpad 434 are displayed on the display unit 414, as shown in FIG. 42.

The upper horizontal rotation touchpad 430 is a circular touchpad functioning as the upper rotary switch 90H. For example, as shown in FIG. 42, an arc-shaped trajectory is drawn inside the display region of the upper horizontal rotation touchpad 430 through the touch panel 416, and thus, the rotation amount and the rotation direction of the upper distance measurement unit 11 in the horizontal direction are determined.

That is, the rotation amount of the upper distance measurement unit 11 in the horizontal direction is determined depending on a length of the trajectory drawn inside the display region of the upper horizontal rotation touchpad 430. For example, the length of the trajectory drawn inside the display region of the upper horizontal rotation touchpad 430 corresponds to a sliding amount of a pointer (for example, user's finger) that slides on the touch panel in a state in which the pointer touches the touch panel 416.

The rotation direction of the upper distance measurement unit 11 is determined depending on a direction (a direction of an arrow C in the example shown in FIG. 42) in which the trajectory inside the display region of the upper horizontal rotation touchpad 430 is drawn. For example, the direction in which the trajectory inside the display region of the upper horizontal rotation touchpad 430 is drawn corresponds to a sliding direction of the pointer that slides on the touch panel in a state in which the pointer touches the touch panel 416.

The lower horizontal rotation touchpad 432 is a circular touchpad functioning as the lower rotary switch 90I. For example, as shown in FIG. 42, an arc-shaped trajectory is drawn inside the display region of the lower horizontal rotation touchpad 432 through the touch panel 416, and thus, the rotation amount and the rotation direction of the lower distance measurement unit 13 in the horizontal direction are determined.

That is, the rotation amount of the lower distance measurement unit 13 in the horizontal direction is determined depending on a length of the trajectory drawn inside the display region of the lower horizontal rotation touchpad 432. For example, the length of the trajectory drawn inside the display region of the lower horizontal rotation touchpad 432 corresponds to a sliding amount of the pointer that slides on the touch panel in a state in which the pointer touches the touch panel 416.

The rotation direction of the lower distance measurement unit 13 is determined depending on a direction (a direction of an arrow D in the example shown in FIG. 42) in which the trajectory inside the display region of the lower horizontal rotation touchpad 432 is drawn. For example, the direction in which the trajectory inside the display region of the lower horizontal rotation touchpad 432 is drawn corresponds to a sliding direction of the pointer that slides on the touch panel in a state in which the pointer touches the touch panel 416.

The longitudinal rotation touchpad 434 is a circular touchpad functioning as the longitudinal rotation rotary switch 90J. For example, as shown in FIG. 42, an arc-shaped trajectory is drawn inside the display region of the longitudinal rotation touchpad 434 through the touch panel 416, and thus, the rotation amount and the rotation direction of the distance measurement unit 12 in the longitudinal direction are determined.

That is, the rotation amount of the distance measurement unit 12 in the longitudinal direction is determined depending on a length of the trajectory drawn inside the display region of the longitudinal rotation touchpad 434. For example, the length of the trajectory drawn inside the display region of the longitudinal rotation touchpad 434 corresponds to a sliding amount of the pointer that slides on the touch panel in a state in which the pointer touches the touch panel 416.

The rotation direction of the distance measurement unit 12 is determined depending on a direction (a direction of an arrow E in the example shown in FIG. 42) in which the trajectory inside the display region of the longitudinal rotation touchpad 434 is drawn. For example, the direction in which the trajectory inside the display region of the longitudinal rotation touchpad 434 is drawn corresponds to a sliding direction of the pointer that slides on the touch panel in a state in which the pointer touches the touch panel 416.

The wireless communication unit 418 is connected to the busline 422 and the wireless communication antenna 420. The wireless communication unit 418 transmits, as a radio wave, a signal input from the CPU 408 to the imaging device main body 403 through the wireless communication antenna 420. In a case where a radio wave from the imaging device main body 403 is received by the wireless communication antenna 420, the wireless communication unit 418 acquires a signal corresponding to the received radio wave, and outputs the acquired signal to the CPU 408. Accordingly, the imaging device main body 403 is controlled by the smart device 402 by performing wireless communication with the smart device 402.

The secondary storage unit 412 stores a program. The CPU 408 is operated as the control unit 100A, the deriving unit 100B, and the output unit 100C according to the technology of the present disclosure by reading the program out of the secondary storage unit 412, loading the readout program into the primary storage unit 410, and executing the program. For example, the CPU 408 executes the factor storing program 106, and the factor storing process described in the first embodiment is realized. The CPU 408 executes the measurement program, and the measurement process described in the above-described embodiments is realized. For example, the CPU 408 executes the irradiation position adjustment program, and thus, the irradiation position adjustment process described in the above-described embodiments is realized.

As described above, in the distance measurement device 10F, the factor storing process, the measurement process, and the irradiation position adjustment process are performed by the CPU 408. Therefore, according to the distance measurement device 10F, it is possible to reduce a load applied to the imaging device 400 in acquiring the effects described in the above-described embodiments compared to a case where the factor storing process, the measurement process, and the irradiation position adjustment process are performed by the imaging device 400.

Seventh Embodiment

Although it has been described in the above-described embodiments that the subject is irradiated with the laser beams by the individual units, a case where the subject is scanned with laser beams by one distance measurement unit 450 (FIG. 43) will be described in a seventh embodiment. In the seventh embodiment, since the same constituent elements as those of the above-described embodiments will be assigned the same references, the description thereof will be omitted, and only portions different from those of the first embodiment will be described.

Figure 43:
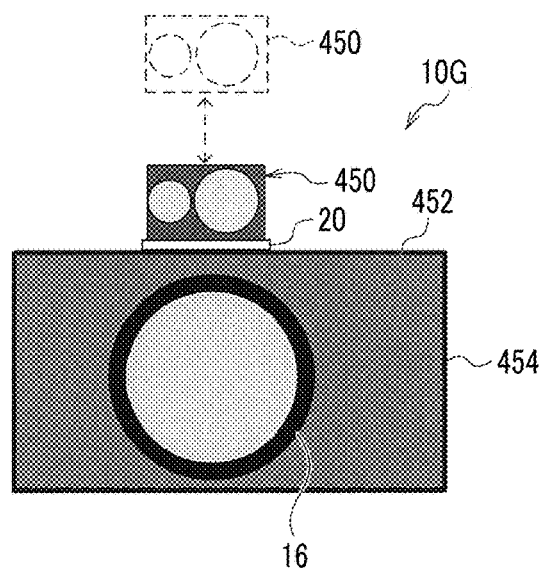
FIG. 43 is a front view showing an example of an external appearance of a distance measurement device according to the seventh embodiment.

For example, as shown in FIG. 43, a distance measurement device 10G according to the seventh embodiment is different from the distance measurement device 10A in that the distance measurement unit 450 is provided instead of the distance measurement unit 12. The distance measurement device 10G is different from the distance measurement device 10A in that an imaging device 452 is provided instead of the imaging device 14. The imaging device 452 is different from the imaging device 14 in that an imaging device main body 454 is provided instead of the imaging device main body 18.

Figure 44:
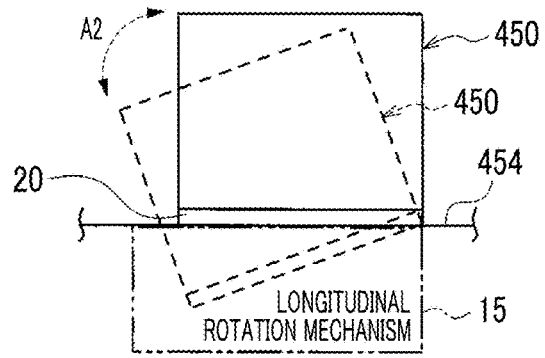
FIG. 44 is a conceptual diagram (schematic side view) showing an example of a schematic configuration of a distance measurement unit and a longitudinal rotation mechanism according to the seventh embodiment.

For example, the imaging device main body 454 includes a longitudinal rotation mechanism 15 as shown in FIG. 44. The longitudinal rotation mechanism 15 receives a power generated by a motor 17, and rotates the hot shoe 20 in a longitudinal direction with a front end portion of the hot shoe 20 as a rotation axis. Accordingly, the hot shoe 20 to which the distance measurement unit 450 is attached is rotated by the longitudinal rotation mechanism 15 in the longitudinal direction, and thus, an orientation of the distance measurement unit 450 is changed in the longitudinal direction (for example, an A2 direction represented in FIG.

44). For the sake of convenience in description, although it has been described in the example shown in FIG. 44 that the hot shoe 20 is rotated in the longitudinal direction such that a rear end portion of the hot shoe 20 is buried within the imaging device main body 454, the technology of the present disclosure is not limited thereto. For example, the hot shoe 20 may be rotated in the longitudinal direction such that the rear end of the hot shoe 20 is pushed up from the imaging device main body 454.

Figure 45:
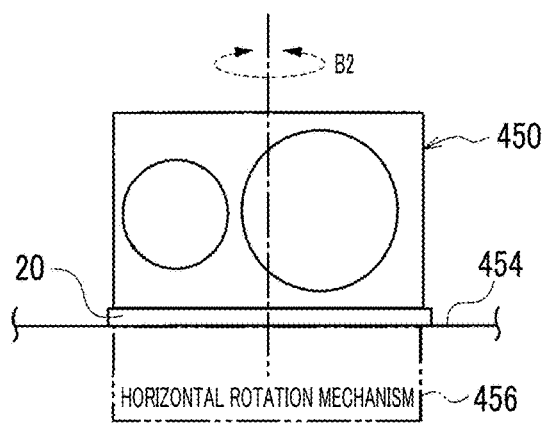
FIG. 45 is a conceptual diagram (schematic front view) showing an example of a distance measurement unit and a horizontal rotation mechanism according to the seventh embodiment.

For example, the imaging device main body 454 includes a horizontal rotation mechanism 456, as shown in FIG. 45. The horizontal rotation mechanism 456 receives a power generated by a motor 458 (see FIG. 47) to be described below, and rotates the hot shoe 20 in a horizontal direction with a central point of the hot shoe 20 in plan view as a rotation axis. Accordingly, the hot shoe 20 to which the distance measurement unit 450 is attached is rotated by the horizontal rotation mechanism 456 in the horizontal direction, and thus, an orientation of the distance measurement unit 450 is changed in the horizontal direction (for example, a B2 direction represented in FIG. 45).

In the seventh embodiment, the longitudinal rotation mechanism and the horizontal rotation mechanism are referred to as a "rotation mechanism" without being assigned the reference for the sake of convenience in description in a case where it is not necessary to distinguish between the longitudinal rotation mechanism 15 and the horizontal rotation mechanism 456.

Figure 46:
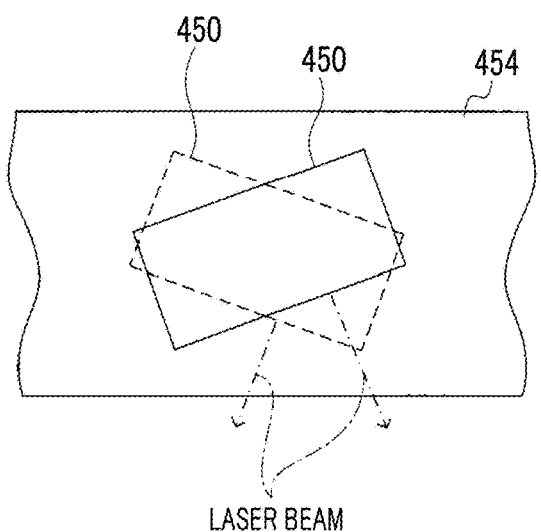
FIG. 46 is a conceptual diagram (schematic plan view) showing an example of a scanning aspect using the distance measurement unit according to the seventh embodiment.

For example, as shown in FIG. 46, in the distance measurement device 10G a plurality of laser beams is emitted to the subject in different directions by activating the rotation mechanism and by scanning the subject with the laser beams. In the seventh embodiment, the scanning means that the laser beams are emitted at predetermined time intervals while changing the orientation of the distance measurement unit 450 in the horizontal direction at a predetermined speed (in other words, the subject is intermittently irradiated with the laser beams).

Hereinafter, for the sake of convenience in description, it will be described on the assumption that the scanning is realized by changing the orientation of the distance measurement unit 450 in the horizontal direction, the technology of the present disclosure is not limited thereto. For example, the scanning may be realized by intermittently emitting the laser beams while changing the orientation of the distance measurement unit 450 in the longitudinal direction or the diagonal direction.

Figure 47:
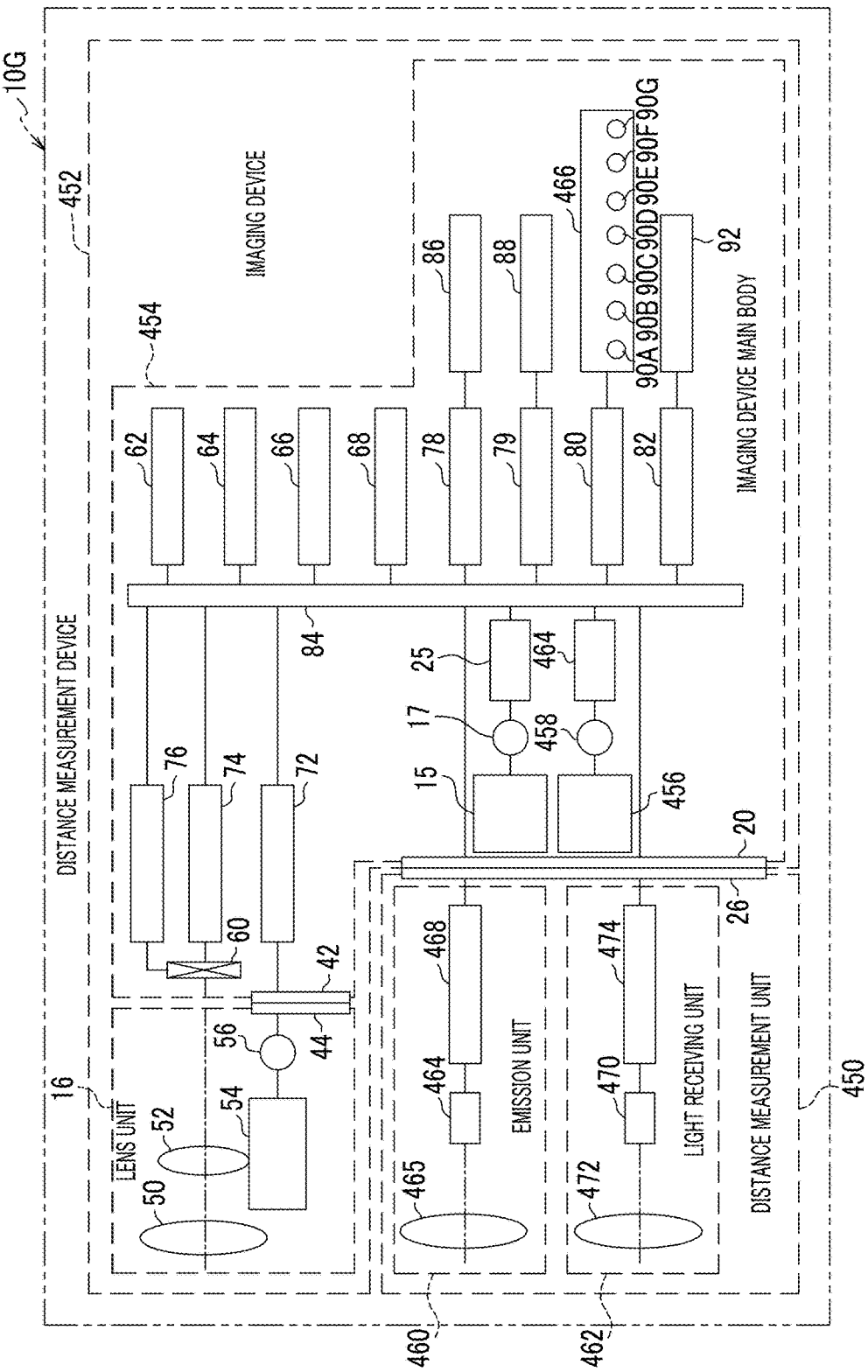
FIG. 47 is a block diagram showing an example of a hardware configuration of main parts of the distance measurement device according to the seventh embodiment.

For example, the distance measurement unit 450 includes an emission unit 460, a light receiving unit 462, and a connector 26, as shown in FIG. 47.

The emission unit 460 includes an LD 464, a condenser lens (not shown), an object lens 465, and an LD driver 468. For example, the LD 464 has the same function as that of the LD 22A, and the condenser lens has the same function as that of the condenser lens included in the emission unit 22 described in the first embodiment. For example, the object lens 465 has the same function as that of the object lens 22B, and the LD driver 468 has the same function as that of the LD driver 22C.

The light receiving unit 462 includes a PD 470, an object lens 472, and a light-receiving signal processing circuit 474. For example, the PD 470 has the same function as that of the PD 24A, the object lens 472 has the same function as that of the object lens 24B, and the light-receiving signal processing circuit 474 has the same function as that of the light-receiving signal processing circuit 24C.

The motor 458 is connected to the horizontal rotation mechanism 456, and the horizontal rotation mechanism 456 receives the power of the motor 458 and rotates the hot shoe 20 in the horizontal direction. For example, the distance measurement unit 450 is rotated in the direction of an arrow B2, as shown in FIG. 45.

The reception device 466 is different from the reception device 90 in that the upper rotary switch 90H, the lower rotary switch 90I, and the longitudinal rotation rotary switch 90J are not provided.

For example, as shown in FIG. 10, the secondary storage unit 104 stores the factor storing program 140, the measurement program 142, the irradiation position adjustment program 144, the position and distance table 109, and the factor and accuracy table 111. The factor storing program 140, the measurement program 142, and the irradiation position adjustment program 144 is an example of the distance measurement program according to the technology of the present disclosure.

In the seventh embodiment, the factor storing program 140, the measurement program 142, and the irradiation position adjustment program 144 are referred to as the "program" without being assigned the references for the sake of convenience in description in a case where it is not necessary to distinguish between these programs.

For example, as shown in FIG. 12, the CPU 100 is operated as the control unit 500A, a deriving unit 500B, and an output unit 500C by reading the program out of the secondary storage unit 104, loading the readout program into the primary storage unit 102, and executing the program.

In the seventh embodiment, portions of the control unit 500A different from those of the control unit 100A will be described, portions of the deriving unit 500B different from those of the deriving unit 100B will be described, and portions of the output unit 500C different from those of the output unit 100C will be described.

Although it has been described in the above-described embodiments that the position and distance correspondence information related to the corresponding individual distance measurement unit is stored in the position and distance table 109, position and distance correspondence information items for all directions of the laser beams are stored in the position and distance table 109 in the seventh embodiment. That is, for example, position and distance correspondence information items related to a first direction and a second direction to be described below are stored in the position and distance table 109 in the seventh embodiment, as shown in FIG. 13.

In the seventh embodiment, the position and distance correspondence information is information acquired by associating the in-provisional-image irradiation position with the distance acquired by performing the processes of step 622D and 622E for every in-provisional-image irradiation position specified by performing the process of step 622I.

In the example shown in FIG. 13, the in-provisional-image irradiation positions $X_1$, $X_2$, and $X_3$ and the distances $D_1$, $D_2$, and $D_3$ are associated with the first direction, and the in-provisional-image irradiation positions $X_1$, $X_2$, and $X_3$ and the distances $D_1$, $D_2$, and $D_3$ are updated whenever the data acquisition process for deriving the irradiation position is performed. In the example shown in FIG. 13, the in-provisional-image irradiation positions $X_4$, $X_5$, and $X_6$ and the distances $D_4$, $D_5$, and $D_6$ are associated with the second direction, and the in-provisional-image irradiation positions $X_4$, $X_5$, and $X_6$ and the distances $D_4$, $D_5$, and $D_6$ are updated whenever the data acquisition process for deriving the irradiation position is performed.

Next, the actions of the distance measurement device 10G will be described.

Initially, a factor storing process realized by executing the factor storing program 140 in the CPU 100 in a case where a power switch of the distance measurement device 10G is turned on will be described with reference to FIG. 15. Hereinafter, the same steps as those of the factor storing process according to the first embodiment will be assigned the same step numbers, and thus, the description thereof will be omitted.

The factor storing process according to the seventh embodiment is different from the factor storing process according to the first embodiment in that step 502 is provided instead of step 202.

In step 502 shown in FIG. 15, the output unit 500C stores the factor information items in the secondary storage unit 104 in a sequence of time. Thereafter, the process proceeds to step 208.

That is, although it has been described in the first embodiment the factor information items related to the individual distance measurement units are stored in the secondary storage unit 104, the factor information related to the distance measurement unit 450 is stored in the secondary storage unit 104 by performing the process of step 502 in the seventh embodiment.

Hereinafter, a measurement process realized by executing the measurement program 142 in the CPU 100 in a case where a power switch of the distance measurement device 10G is turned on will be described with reference to FIGS. 48, 18, and 19. Hereinafter, the same steps as those of the measurement process according to the first embodiment will be assigned the same step numbers, and thus, the description thereof will be omitted. Hereinafter, for the sake of convenience in description, it will be described on the assumption that the position of the imaging device 452 is fixed except that the provisional measurement and the provisional imaging are performed in a data acquisition process for deriving the irradiation position according to the seventh embodiment to be described below.

Figure 48:
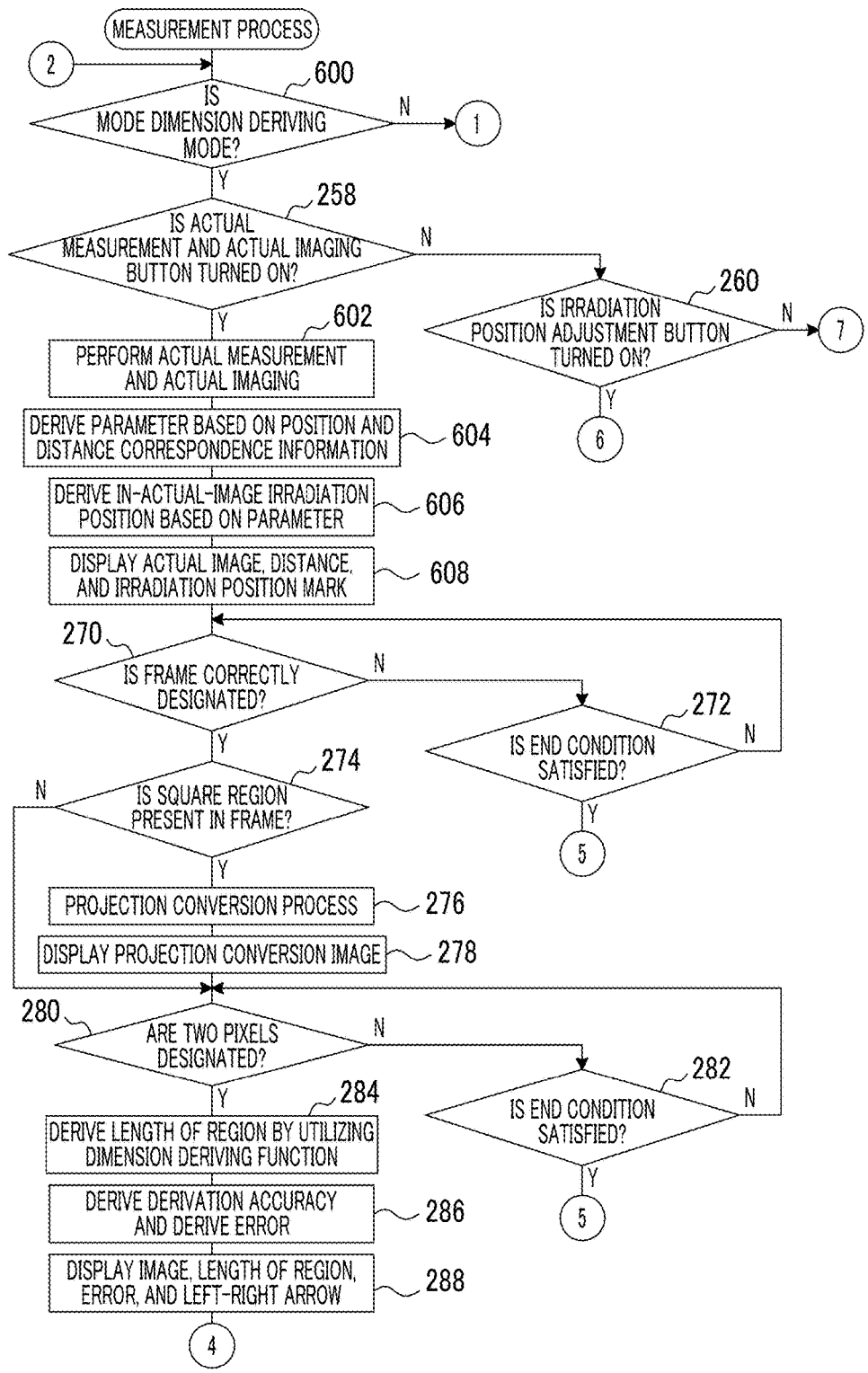
FIG. 48 is a flowchart showing an example of a flow of a measurement process according to the seventh embodiment.

The flowchart shown in FIG. 48 is different from the flowcharts shown in FIGS. 16 and 17 in that steps 220 to 232 are not provided. The flowchart shown in FIG. 48 is different from the flowcharts shown in FIGS. 16 and 17 in that step 600 is provided instead of step 234. The flowchart shown in FIG. 48 is different from the flowcharts shown in FIGS. 16 and 17 in that steps 602 to 608 are provided instead of steps 262 to 268.

The measurement process according to the seventh embodiment is different from the measurement process according to the first embodiment in that steps 610 to 620 are provided instead of steps 238 to 248 and step 622 is provided instead of step 254 (see FIG. 18).

The data acquisition process for deriving the irradiation position according to the seventh embodiment is different from the data acquisition process for deriving the irradiation position according to the first embodiment in that step 622D is provided instead of step 254D. The data acquisition process for deriving the irradiation position according to the seventh embodiment is different from the data acquisition process for deriving the irradiation position according to the first embodiment in that step 622E is provided instead of step 254E. The data acquisition process for deriving the irradiation position according to the seventh embodiment is different from the data acquisition process for deriving the irradiation position according to the first embodiment in that step 622G is provided instead of step 254G.

The data acquisition process for deriving the irradiation position according to the seventh embodiment is different from the data acquisition process for deriving the irradiation position according to the first embodiment in that step 622I is provided instead of step 254I. The data acquisition process for deriving the irradiation position according to the seventh embodiment is different from the data acquisition process for deriving the irradiation position according to the first embodiment in that step 622J is provided instead of step 254J.

In the measurement process shown in FIG. 48, in step 600, the deriving unit 500B determines whether or not the dimension deriving mode is set. In a case where the distance deriving mode is set in step 600, the determination result is negative, and the process proceeds to step 236 shown in FIG. 18. In a case where the dimension deriving mode is set in step 600, the determination result is positive, and the process proceeds to step 258.

In step 602, the deriving unit 500B emits the laser beams in the first direction and the second direction and perform the actual measurement based on the laser beams by controlling the distance measurement control unit 68. The deriving unit 500B performs the actual imaging while matching the emission timings of the laser beams by controlling the imaging element driver 74 and the image signal processing circuit 76. Thereafter, the process proceeds to step 604.

The emission of the laser beams in the first direction and the second direction is realized by scanning the subject with the laser beams by the distance measurement unit 450 by activating the rotation mechanism.

The first direction and the second direction are directions defined with a predetermined angle difference (for example, 10 degrees in the horizontal direction) separated therebetween in a range in which the real-space irradiation position is included in the angle of view set at the current point of time, and are directions fixed for the imaging device 452. For example, the first direction is a direction corresponding to the emission direction of the laser beam in a case where the laser beam is emitted by the upper distance measurement unit 11 by performing the process of step 262 of the measurement process according to the first embodiment. For example, the second direction is a direction corresponding to the emission direction of the laser beam in a case where the laser beam is emitted by the lower distance measurement unit 13 by performing the process of step 262 of the measurement process according to the first embodiment.

The "predetermined angle difference" may be an angle difference designated by the user through the touch panel 88 in the range in which the real-space irradiation position is included in the angle of view set at the current point of time.

IN step 604, the deriving unit 500B derives the parameters based on the position and distance correspondence information items stored in the position and distance table 109 in the first direction and the second direction. Therefore, the process proceeds to step 606.

In step 606, the deriving unit 500B derives the in-actual-image irradiation positions based on the parameters derived in step 604 in the first direction and the second direction. Thereafter, the process proceeds to step 608.

For example, in step 608, the deriving unit 500B displays the actual image, the distance, and the irradiation position marks 116A and 116B on the display unit 86 as shown in FIG. 25.

In the example shown in FIG. 25, the actual image displayed on the display unit 86 is one image acquired through the actual imaging by performing the process of step 602. The technology of the present disclosure is not limited thereto. For example, the actual image may be a combination image acquired by combining two images acquired through the actual imaging in the irradiation timings of the laser beams by performing the process of step 602.

In the example shown in FIG. 25, the irradiation position mark 116A is a mark indicating the in-actual-image irradiation position derived by performing the process of step 606 based on the laser beam emitted in the first direction. In the example shown in FIG. 25, the irradiation position mark 116B is a mark indicating the in-actual-image irradiation position derived by performing the process of step 606 based on the laser beam emitted in the second direction.

In a case where the process of step 608 is performed, the distance measured based on the laser beam emitted in the first direction and the distance measured based on the laser beam emitted in the second direction are displayed on the display unit 86. In the example shown in FIG. 25, a value of "42351.2" corresponds to the distance measured by performing the process of step 602 based on the laser beam emitted in the first direction. In the example shown in FIG. 25, a value of "4361.3" corresponds to the distance measured by performing the process of step 602 based on the laser beam emitted in the second direction.

In step 610 shown in FIG. 18, the deriving unit 500B emits the laser beams in the first direction and the second direction and performs the actual measurement based on the laser beams by controlling the distance measurement control unit 68. The deriving unit 500B performs the actual imaging while matching the emission timings of the laser beams by controlling the imaging element driver 74 and the image signal processing circuit 76. Thereafter, the process proceeds to step 612.

In step 612, the deriving unit 500B derives the parameters based on the position and distance correspondence information items stored in the position and distance table 109 in the first direction and the second direction. Thereafter, the process proceeds to step 614.

In step 614, the deriving unit 500B derives the in-actual-image irradiation positions based on the parameters derived in step 612 in the first direction and the second direction. Thereafter, the process proceeds to step 616.

In step 616, the output unit 500C derives the derivation accuracy associated with the specific assumption factor from the factor and accuracy correspondence information items for the in-actual-image irradiation positions derived in the first direction and the second direction. The output unit 500C derives the error of the in-actual-image irradiation position derived by the deriving unit 500B for the in-actual-image irradiation positions derived in the first and second directions based on the derived derivation accuracy. Thereafter, the process proceeds to step 618.

The error derived by performing the process of step 616 is derived by the output unit 500C for the in-actual-image irradiation positions derived in the first direction and the second direction by performing the process of step 614.

For example, in step 616, in a case where the specific assumption factors are the change in the angle of view (1) and the manufacturing variation as stated above, the derivation accuracy $\delta_1$ and $\lambda$ are integrated. The error of the in-actual-image irradiation position based on the integrated derivation accuracy is derived for every in-actual-image irradiation position derived in the first direction and the second direction by performing the process of step 614.

For example, in a case where the specific assumption factor is only the manufacturing variation, the error of the in-actual-image irradiation position is derived in the first direction and the second direction by performing the process of step 614 for every in-actual-image irradiation position based on the derivation accuracy $\lambda$. That is, in a case where the actual measurement process is performed by activating the distance measurement device 10G for the first time after the shipment of the distance measurement device 10G, the error of the in-actual-image irradiation position is derived for every in-actual-image irradiation position derived in the first direction and the second direction based on the derivation accuracy $\lambda$.

For example, in step 618, the deriving unit 500B displays the actual image, the distance, the error, and the irradiation position marks 116A and 116B on the display unit 86 as shown in FIG. 21. Thereafter, the process proceeds to step 620.

In the example shown in FIG. 21, the actual image displayed on the display unit 86 is one image acquired through the actual imaging by performing the process of step 610. The technology of the present disclosure is not limited thereto. For example, the actual image may be a combination image acquired by combining two images acquired through the actual imaging in the irradiation timings of the laser beams by performing the process of step 610.

The irradiation position mark 116A is a mark indicating the in-actual-image irradiation position derived by performing the process of step 614 based on the laser beam emitted in the first direction. The irradiation position mark 116B is a mark indicating the in-actual-image irradiation position derived by performing the process of step 614 based on the laser beam emitted in the second direction.

For example, in a case where the process of step 618 is performed, the distances measured based on the laser beams emitted in the first direction and the second direction are displayed on the display unit 86, as shown in FIG. 21.

In the example shown in FIG. 21, a value of "325414.2" corresponds to the distance measured based on the laser beam emitted in the first direction by performing the process of step 610. In the example shown in FIG. 21, a value of "133325.0" corresponds to the distance measured based on the laser beam emitted in the second direction by performing the process of step 610.

For example, in a case where the process of step 618 is performed, the errors for the in-actual-image irradiation positions derived in the first direction and the second direction are displayed on the display unit 86, as shown in FIG. 21.

In the example shown in FIG. 21, a value of "±16.3" corresponds to the error of the in-actual-image irradiation position derived in the first direction by performing the process of step 614. In the example shown in FIG. 21, a value of "±15.2" corresponds to the error of the in-actual-image irradiation position derived in the second direction by performing the process of step 614.

In step 620, the output unit 100C determines whether or not at least one of the errors derived in the first direction and the second direction by performing the process of step 616 or step 286 exceeds to a threshold value. The threshold value is a preferable value on which the data acquisition process for deriving the irradiation position (see FIG. 19) is to be performed, and is a value previously acquired based on a result of computer simulation based on a design specification of the distance measurement device 10G and/or examination using a real machine of the distance measurement device 10G. In step 620, a case where the error derived by performing the process of step 616 or step 286 exceeds the threshold value means that the derivation accuracy of the in-actual-image irradiation position using the deriving unit 500B is less than predetermined derivation accuracy.

In a case where all the errors derived in the first direction and the second direction by performing the process of step 616 or step 286 are equal to or less than the threshold value in step 620, the determination result is negative, and the process proceeds to step 252. In a case where at least one of the errors derived by performing the process of step 616 or step 286 exceeds the threshold value in step 620, the determination result is positive, and the process proceeds to step 250.

For example, in step 622, the deriving unit 500B performs the data acquisition process for deriving the irradiation position shown in FIG. 19. Thereafter, the process proceeds to step 256.

In the data acquisition process for deriving the irradiation position shown in FIG. 19, in step 622D, the deriving unit 500B emits the laser beams in the first direction and the second direction and performs the provisional measurement based on the laser beams by controlling the distance measurement control unit 68. The deriving unit 500B performs the provisional imaging while matching the emission timings of the laser beams by controlling the imaging element driver 74 and the image signal processing circuit 76. Thereafter, the process proceeds to step 622E. The provisional measurement and the provisional imaging are performed while changing the imaging direction whenever the provisional measurement and provisional imaging button 90B is turned on. For example, the orientation of the distance measurement device 10G may be changed in order to change the imaging direction.

In step 622E, the deriving unit 500B stores the provisional image which is the image acquired by performing the provisional imaging and the distance acquired by performing the provisional measurement in the primary storage unit 102 in the first direction and the second direction. Thereafter, the process proceeds to step 254F. The provisional image and the distance acquired in the first direction and the provisional image and the distance acquired in the second direction are distinguishably stored in the primary storage unit 102 by performing the process of step 622E.

In a case where the determination result in step 254F is positive, the deriving unit 500B determines whether or not the relation between the plurality of provisionally measured distances (for example, three distances) is not a predetermined relation satisfying that these distances do not effectively contribute to the construction of the position and distance correspondence information used in the deriving of the in-actual-image irradiation position in the first direction and the second direction. That is, in step 622G, the deriving unit 500B determines whether or not three distances stored in the primary storage unit 102 in step 622E are effective distances in the first direction and the second direction.

In a case where the three distances stored in the primary storage unit 102 in step 622E are not the effective distances in at least one direction of the first direction or the second direction in step 622G, the determination result is negative, and the process proceeds to step 254H. In a case where the three distances stored in the primary storage unit 102 in step 622E are the effective distances in both of the first direction and the second direction in step 622G the determination result is positive, the process proceeds to step 622I.

In step 622I, the deriving unit 500B specifies the in-provisional-image irradiation positions for the provisional images stored in the primary storage unit 102 in step 622E in the first direction and the second direction. Thereafter, the process proceeds to step 622J.

In step 622J, the deriving unit 500B updates the position and distance table 109 in the first direction and the second direction by generating the position and distance correspondence information and overwriting the generated position and distance correspondence information in the position and distance table 109 in the first direction and the second direction.

Next, the irradiation position adjustment process realized by executing the irradiation position adjustment program 144 in the CPU 100 in a case where the irradiation position adjustment button 90G is pressed in a state in which the live view image is displayed on the display unit 86 will be described with reference to FIG. 28. Hereinafter, the same steps as those of the irradiation position adjustment process according to the first embodiment will be assigned the same step numbers, and thus, the description thereof will be omitted.

The irradiation position adjustment process according to the seventh embodiment is different from the irradiation position adjustment process according to the first embodiment in that step 632 is provided instead of step 302 and step 634 is provided instead of step 304. The irradiation position adjustment process according to the seventh embodiment is different from the irradiation position adjustment process according to the first embodiment in that step 636 is provided instead of step 306 and step 640 is provided instead of step 310. The irradiation position adjustment process according to the seventh embodiment is different from the irradiation position adjustment process according to the first embodiment in that step 642 is provided instead of step 312.

In step 632, the control unit 500A emits the laser beams in the first direction and the second direction and performs the actual measurement based on the laser beams by controlling the distance measurement control unit 68. The control unit 500A performs the actual imaging while matching the emission timings of the laser beams by controlling the imaging element driver 74 and the image signal processing circuit 76. Thereafter, the process proceeds to step 306.

In step 634, the control unit 500A causes the deriving unit 500B to derive the in-live-view-image irradiation positions in the first direction and the second direction based on the latest parameter. Therefore, the process proceeds to step 636.

In step 636, the control unit 500A determines whether or not all the in-live-view-image irradiation positions derived by the deriving unit 500B by performing the process of step 634 are in the default range.

In a case where at least one of the in-live-view-image irradiation positions is out of the default range in step 636, the determination result is negative, and the process proceeds to step 308. In a case where all the in-live-view-image irradiation positions are in the default range in step 636, the determination result is positive, and the process proceeds to step 314.

In step 640, the control unit 500A rotates the distance measurement unit 450 to a default direction by a default rotation amount and adjusts a scanning start position by controlling the rotation mechanisms through the motor drivers 25 and 464. Thereafter, the process proceeds to step 642.

In step 642, the control unit 500A updates the emission angle $\beta$ according to the rotation direction and the rotation amount of the distance measurement unit 450 rotated by performing the process of step 640. Thereafter, the process proceeds to step 300.

As described above, in the distance measurement device 10Q the laser beams are emitted in the first direction and the second direction by scanning the subject with the laser beams by the distance measurement unit 450 (step 602). The control unit 500A controls the imaging device 14 to perform the imaging in the angle of view which includes the real-space irradiation positions of the laser beams in the first direction and the second direction (step 602). The deriving unit 500B derives the in-actual-image irradiation positions as the positions corresponding to the real-space irradiation positions in the first direction and the second direction (step 606). The length of the region corresponding to the interval between the two pixels associated with the region-length deriving target image for every in-actual-image irradiation position is derived based on the distance measured by utilizing the distance measurement system function, the interval between the designated two pixels, and the focal length of the imaging device 14 (step 284). Therefore, according to the distance measurement device 10G it is possible to rapidly derive the lengths of the plurality of regions compared to a case where one region is designated whenever the imaging and the distance measurement are performed once.

In the distance measurement device 10G the position and distance correspondence information items are generated in the first direction and the second direction (step 622J), and the in-actual-image irradiation positions are derived in the first direction and the second direction based on the generated position and distance correspondence information items (steps 264 and 266). Therefore, according to the distance measurement device 10G it is possible to derive the in-actual-image irradiation positions related to the first direction and the second direction with high accuracy compared to a case where the in-actual-image irradiation positions are derived in the first direction and the second direction without generating the position and distance correspondence information items.

Although the difference from the first embodiment has been mainly described in the seventh embodiment, the second to sixth embodiments may be applied to the distance measurement device 10G according to the seventh embodiment. In this case, the above-described embodiments may be understood by replacing the laser beam applied by the upper distance measurement unit 11 (184) with the laser beam applied in the first direction and replacing the laser beam applied by the lower distance measurement unit 13 (185) with the laser applied in the second direction.

Although it has been described in the seventh embodiment that the subject is irradiated with the laser beams by the distance measurement unit 450 in the first direction and the second direction, the technology of the present disclosure is not limited thereto. For example, the laser beams are emitted in three or more directions set such that the real-space irradiation positions are included in the angle of view and the in-actual-image irradiation positions, the distances, the dimensions, and the errors may be derived and output in the directions based on the laser beams emitted in the directions.

Although it has been described in the above-described embodiments that the information indicating that the distance measured through the actual measurement is out of the range of the distance specified from the position and distance correspondence information in a measurable range according to the distance measurement system function is not displayed, the technology of the present disclosure is not limited. For example, as shown in FIG. 49, the CPU 100 may determine whether or not the measurable range is in a correspondence information distance range (an example of the range of the distance specified from the first correspondence relation according to the technology of the present disclosure), and the determination result may be displayed on the display unit 86.

Figure 49:
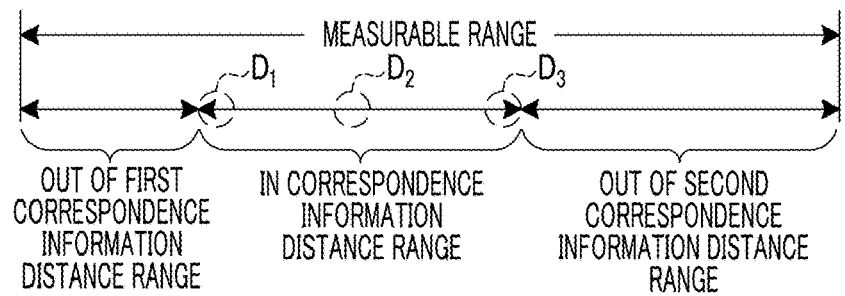
FIG. 49 is a conceptual diagram showing an example in which a distance is in a correspondence information distance range, is out of a first correspondence information distance range, and is out of a second correspondence information distance range according to the embodiments.

For example, in this example, the measurable range is distinguished between a case where the distance is in the correspondence information distance range and a case where the distance is out of the correspondence information distance range, as shown in FIG. 49. The case where the distance is in the correspondence information distance range means that the information is in the range of the distance specified from the latest position and distance correspondence information generated by performing the process of step 254J (622J). In contrast, the case where the distance is out of the correspondence information distance range means that the information is out of the range of the distance specified from the latest position and distance correspondence information generated by performing the process of step 254J (622J).

The case where the distance is out of the correspondence information distance range is distinguished between a case where the distance is out of a first correspondence information distance range and a case where the distance is out of a second correspondence information distance range. In a case where a magnitude relation between the distances $D_1$, $D_2$, and $D_3$ specified from the latest position and distance correspondence information items is "$D_1 < D_2 < D_3$", the case where the distance is in the correspondence information distance range and the case where the distance is out of the correspondence information distance range are defined as follows.

That is, in the example shown in FIG. 49, the case where the distance is in the correspondence information distance range corresponds to a range of the distance $D_1$ or more and the distance $D_3$ or less. The case where the distance is out of the first correspondence information distance range corresponds to a range of less than the distance $D_1$. The case where the distance is out of the second correspondence information distance range corresponds to a range of more than the distance $D_3$. The case where the distance is out of the correspondence information distance range is an example of a "case where the distance is out of a range of a distance specified by the first correspondence relation" according to the technology of the present disclosure.

Figure 50:
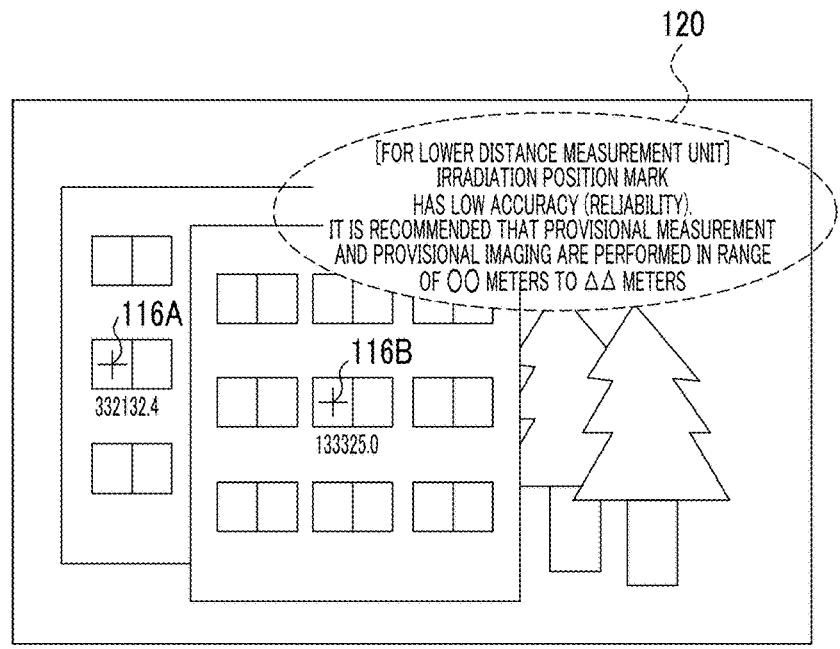
FIG. 50 is a screen diagram showing an example of a screen in which an actual image, a distance, an error, an irradiation position mark, and a warning and recommendation message are displayed on the display unit according to the first to sixth embodiments.

For example, in a case where the distance acquired by performing the actual measurement in step 238 or step 262 is out of the correspondence information distance range, the CPU 100 may display a warning and recommendation message 120 on the display unit 86 such that this message is superimposed on the actual image as shown in FIG. 50. Therefore, according to the distance measurement device 10A according to the first embodiment, it is possible to increase the accuracy of the in-actual-image irradiation position compared to a case where the warning and recommendation message 120 is not displayed.

The CPU 100 is an example of a performing unit according to the technology of the present disclosure. In a case where the distance acquired through the actual measurement is out of the range of the distance specified by the position and distance correspondence information which is an example of the information indicating the first correspondence relation according to the technology of the present disclosure, the performing unit according to the technology of the present disclosure performs a predetermined process as a process of suppressing a decrease in accuracy of the in-actual-image irradiation position.

The warning and recommendation message 120 is a message for warning the user that there is a high possibility that the laser beam will not be applied to a position in the real space which corresponds to the position of the irradiation position mark 116 and recommending the performing of the data acquisition process for deriving the irradiation position to the user. The process of displaying the warning and recommendation message 120 is an example of a "predetermined process as a process of suppressing a decrease in accuracy of the in-image irradiation position" according to the technology of the present disclosure.

The warning and recommendation message 120 may be displayed only in a case where there is a high possibility that the positions in the real space corresponding to the positions of the irradiation position marks 116A and 116B will not be irradiated with the laser beams. The warning and recommendation message 120 may be displayed only in a case where there is a high possibility that the position in the real space corresponding to any of the irradiation position marks 116A and 116B will not be irradiated with the laser beam.

In the example shown in FIG. 50, a warning message of "the irradiation position mark has low accuracy (reliability)" is included in the warning and recommendation message 120. In the example shown in FIG. 50, a recommendation message of "it is recommended that the provisional measurement and the provisional imaging are performed in a range of ∘∘ meters to ΔΔ meters" is included in the warning and recommendation message 120.

The "range of ∘∘ meters to ΔΔ meters" included in the recommendation message is a range out of the first correspondence information distance range or a range out of the second correspondence information distance range. That is, in a case where the distance acquired by performing the actual measurement in step 238 or step 262 is out of the first correspondence information distance range, a default range out of the first correspondence information distance range is employed. In a case where the distance acquired by performing the actual measurement in step 238 or step 262 is out of the second correspondence information distance range, a default range out of the second correspondence information distance range is employed.

The default range means a range of the distance recommended in the provisional measurement based on the relation between the distance acquired by performing the actual measurement in step 238 or step 262 and the correspondence information distance range. For example, the default range is a range which is uniquely determined from a predetermined table or calculation expression depending on a degree of deviation of the distance acquired by performing the actual measurement in step 238 or step 262 from a specific value in the correspondence information distance range. The specific value in the correspondence information distance range may be a center value or an average value in the correspondence information distance range. For example, the default range out of the first correspondence information distance range may be a range which is uniquely determined depending on a difference between the distance $D_2$ shown in FIG. 49 and the distance acquired by performing the actual measurement in step 238 or step 262.

For example, the default range out of the second correspondence information distance range may be a range which is uniquely determined depending on a difference between the distance $D_2$ shown in FIG. 49 and the distance acquired by performing the actual measurement in step 238 or step 262. Instead of the "default range", a "plurality of default distances" may be used. For example, three or more distances separated from each other at equal spaces within the default range acquired as described above may be used as the plurality of default distances, and a plurality of distances recommended in the provisional measurement may be used.

Although the warning and recommendation message 120 is presented to the user in step 246 by being visually displayed on the display unit 86, the technology of the present disclosure is not limited thereto. For example, the message may be presented to the user by being output as sound by a sound playback device (not shown) provided at the distance measurement device 10A, or may be displayed through visual display and audible indication.

Figure 51:
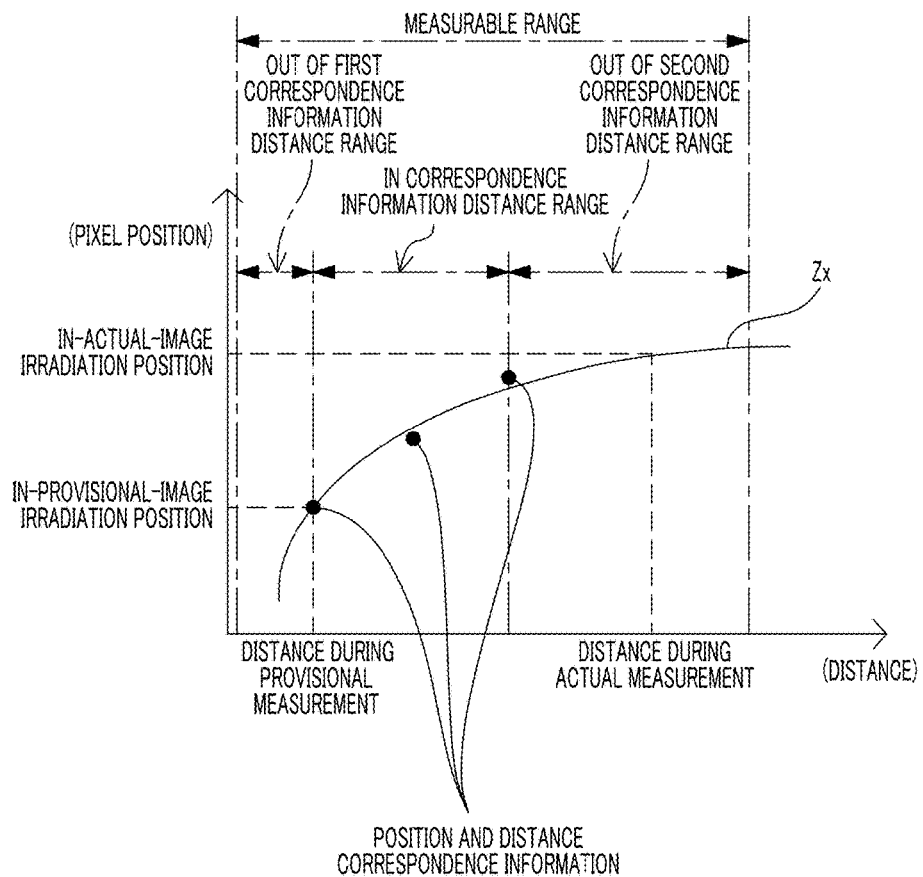
FIG. 51 is a conceptual diagram showing an example in which a distance is in a correspondence information distance range, is out of a first correspondence information distance range, and is out of a second correspondence information distance range used in a case where an in-image irradiation position is derived by using an approximate curve according to the fifth embodiment.

For example, as shown in FIG. 51, even in a case where the in-actual-image irradiation position is derived by using the approximate curve $Z_X$, the measurable range is distinguished between a case where the distance is in the correspondence information distance range and a case where the distance is out of the correspondence information distance range.

In the example shown in FIG. 51, the case where the distance is in the correspondence information distance range means that the distance in the range of the distance specified by the latest position and distance correspondence information generated by performing the process of step 254J (622J). In contrast, the case where the distance is out of the correspondence information distance range means that the distance is out of the range of the distance specified by the latest position and distance correspondence information generated by performing the process of step 254J (622J). The case where the distance is out of the correspondence information distance range is distinguished between a case where the distance is out of a first correspondence information distance range and a case where the distance is out of a second correspondence information distance range.

For example, in the example shown in FIG. 51, the case where the distance is out of the first correspondence information distance range means that the distance is a range of which is less than a minimum value of the distance specified by the latest position and distance correspondence information. For example, in the example shown in FIG. 51, the case where the distance is out of the second correspondence information distance range means that the distance exceeds a maximum value of the distance specified by the latest position and distance correspondence information.

In the example shown in FIG. 51, a case where the distance acquired by performing the actual measurement in step 238 or step 262 is out of the second correspondence information distance range is illustrated. Accordingly, as shown in FIG. 51, in a case where the distance acquired by performing the actual measurement in step 238 or step 262 is out of the second correspondence information distance range, the warning and recommendation message 120 is displayed for every individual distance measurement unit on the display unit 86 as shown in FIG. 50. Therefore, according to the distance measurement device 10E according to the fifth embodiment, it is possible to increase the accuracy of the in-actual-image irradiation position compared to a case where the process of suppressing the decrease in accuracy of the in-actual-image irradiation position is not performed.

In a case where the distance acquired by performing the actual measurement in step 238 or step 262 is in the correspondence information distance range, the warning and recommendation message 120 is not displayed on the display unit 86.

Although it has been described in the example shown in FIG. 50 that both the warning message and the recommendation message are displayed, the technology of the present disclosure is not limited thereto. For example, only the warning message of the warning message and the recommendation message may be displayed.

Although it has been described in the example shown in FIG. 50 that the warning and recommendation message 120 is displayed for the lower distance measurement unit 13, the warning and recommendation message 120 is displayed for the upper distance measurement unit 11 so as to be distinguished from the lower distance measurement unit 13 if necessary. The warning and recommendation messages 120 are displayed in the first direction and the second direction described in the seventh embodiment so as to be distinguished between the first direction and the second direction.

Although it has been described in the example shown in FIG. 50 that the irradiation position mark 116 is displayed even though the distance acquired by performing the actual measurement is out of the correspondence information distance range, the technology of the present disclosure is not limited thereto. For example, in a case where the distance acquired by performing the actual measurement is the distance out of the first correspondence information distance range and a difference between the distance acquired by performing the actual measurement and a minimum distance included in the correspondence information distance range is equal to or greater than a threshold value, the irradiation position mark 116 may not be displayed. For example, in a case where the distance acquired by performing the actual measurement is the distance out of the second correspondence information distance range and a difference between the distance acquired by performing the actual measurement and a maximum distance included in the correspondence information distance range is equal to or greater than the threshold value, the irradiation position mark 116 may not be displayed. In the present configuration, it is possible to prevent the irradiation position mark 116 having low accuracy from being referred to by the user compared to a case where the irradiation position mark 116 is displayed even though the difference between the distance acquired by performing the actual measurement and the distance included in the correspondence information distance range is equal to or greater than the threshold value.

Although it has been described in the above-described embodiments that the in-actual-image irradiation position, the in-provisional-image irradiation position, and the in-live-view-image irradiation position, and the length of the region are derived by the CPU 100 (408), the technology of the present disclosure is not limited thereto. For example, one of the in-actual-image irradiation position, the in-provisional-image irradiation position, and the in-live-view-image irradiation position, and the length of the region is derived by the CPU 100, and the other may be derived by another CPU (not shown). For example, the process of step 266 may be performed by a CPU other than the CPU 100, the process of step 284 may be performed by the CPU 100.

One or two of the in-actual-image irradiation position, the in-provisional-image irradiation position, and the in-live-view-image irradiation position may be derived by the CPU 100, and the remaining one may be derived by another CPU (not shown). One or two of the in-actual-image irradiation position, the in-provisional-image irradiation position, and the in-live-view-image irradiation position and the length of the region may be derived by the CPU 100, and the remaining one of the in-actual-image irradiation position, the in-provisional-image irradiation position, and the in-live-view-image irradiation position may be derived by another CPU (not shown).

Figure 52:
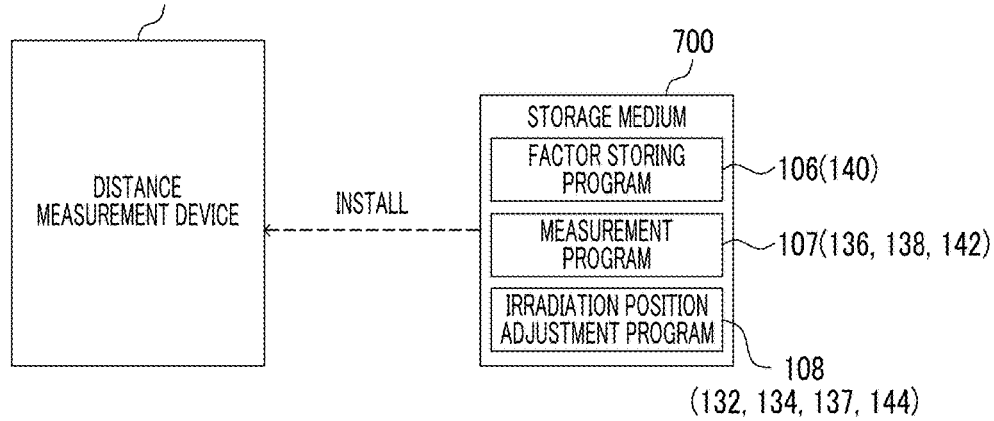
FIG. 52 is a conceptual diagram showing an example of an aspect in which a program is installed in the distance measurement device from a storage medium that stores a program according to the first to seventh embodiments.

Although it has been described in the above-described embodiments that the program is read out of the secondary storage unit 104 (412), it is not necessary to store the program in the secondary storage unit 104 (412) from the beginning. For example, as shown in FIG. 52, the program may be stored in an arbitrary portable storage medium 700 such as a solid state drive (SSD) or a universal serial bus (USB) memory. In this case, the program stored in the storage medium 700 is installed on the distance measurement device 10A, 10B, 10C, 10D, 10E, 10D, or 10G (hereinafter, referred to as the distance measurement device 10A or the like), and the installed program is executed by the CPU 100 (408).

The program may be stored in a storage unit of another computer or a server device connected to the distance measurement device 10A or the like through a communication network (not shown), or the program may be downloaded according to a request of the distance measurement device 10A or the like. In this case, the downloaded program is executed by the CPU 100 (408).

Although it has been described in the above-described embodiments that various information items such as the actual image, the provisional image, the distance, the length of the region, the error, the in-actual-image irradiation position, and the provisional measurement and provisional imaging guide screen 112 are displayed on the display unit 86 (414), the technology of the present disclosure is not limited thereto. For example, various information items may be displayed on a display unit of an external device used while being connected to the distance measurement device 10A or the like. A personal computer or an eyeglass type or wristwatch type wearable terminal device is used as an example of the external device.

Although it has been described in the above-described embodiments that various information items are visually displayed by the display unit 86 (414), the technology of the present disclosure is not limited thereto. For example, audible indication of an output of sound from a sound playback device may be audibly displayed or a permanent visual display of an output of a printed article from a printer may be performed instead of the visual display. Alternatively, at least two of the visual display, the audible indication, or the permanent visual display may be performed.

Although it has been described in the above-described embodiments that the distance, the irradiation position mark 116, the length of the region, and the error in addition to various screens such as the irradiation position adjustment recommendation screen 110 and the provisional measurement and provisional imaging guide screen 112 are displayed on the display unit 86 (414), the technology of the present disclosure is not limited thereto. For example, various screens may be displayed on a display unit (not shown) different from the display unit 86 (414), and the distance, the length of the region, the error, and the irradiation position mark 116 may be displayed on the display unit 86 (414). Various screens such as the irradiation position adjustment recommendation screen 110 and the provisional measurement and provisional imaging guide screen 112 may be individually displayed on a plurality of display units including the display unit 86 (414).

Although it has been described in the above-described embodiments that the laser beam is used as the light for distance measurement, the technology of the present disclosure is not limited thereto. Directional light which is light having directivity may be used. For example, the measurement light may be directional light acquired by light emitting diode (LED) or a super luminescent diode (SLD). It is preferable that the directivity of the directional light is directivity having the same degree as that of the directivity of the laser beam. For example, it is preferable that the directivity of the directional light is directivity capable of being used in the distance measurement in a range of several meters to several kilometers.

The factor storing process, the measurement process, and the irradiation position adjustment process described in the above-described embodiments are merely examples. Accordingly, an unnecessary step may be removed, a new step may be added, or a process procedure may be switched without departing from the gist. The processes included in the factor storing process, the measurement process, and the irradiation position adjustment process may be realized by only the hardware configuration such as ASIC, or may be realized by the combination of the software configuration and the hardware configuration using the computer.

The disclosures of Japanese Patent Application No. 2015-190355 filed on Sep. 28, 2015 are hereby incorporated by reference in their entireties.

All documents, patent applications, and technical standards described in the present specification are herein incorporated by reference to the same extent as if such individual document, patent application, and technical standard were specifically and individually indicated to be herein incorporated by reference.

The above-described embodiments are further disclosed in the following appendices.

APPENDIX 1

A distance measurement device comprises an imaging unit that images a subject image indicating a subject, a measurement unit that measures a plurality of distances to the subject by emitting a plurality of directional light rays which are light rays each having directivity to the subject and receiving reflection light rays of the directional light rays by corresponding light receiving unit, a control unit that controls the imaging unit to image the subject in an angle of view which includes irradiation positions of the directional light rays used in the measurement of the plurality of distances by the measurement unit onto the subject, and a deriving unit that derives a dimension of a real-space region corresponding to an interval between a plurality of pixels associated with the in-image irradiation positions based on distances which are related to in-image irradiation positions derived as positions corresponding to the irradiation positions within a captured image acquired by imaging the subject by the imaging unit, among the plurality of distances measured by the measurement unit, the interval for each distance within the captured image, and a focal length of the imaging unit.

APPENDIX 2

A distance measurement device comprises an imaging unit that images a subject image indicating a subject, a measurement unit that measures a plurality of distances to the subject by emitting directional light rays which are light rays each having directivity to the subject in a plurality of directions through scanning of the subject with the directional light rays and receiving reflection light rays of the directional light rays in the plurality of directions, a control unit that controls the imaging unit to image the subject in an angle of view which includes irradiation positions of the directional light rays used in the measurement of the plurality of distances by the measurement unit onto the subject, and a deriving unit that derives a dimension of a real-space region corresponding to an interval between a plurality of pixels associated with the in-image irradiation positions based on distances which are related to in-image irradiation positions derived as positions corresponding to the irradiation positions within a captured image acquired by imaging the subject by the imaging unit, among the plurality of distances measured by the measurement unit, the interval for each distance within the captured image, and a focal length of the imaging unit.

What is claimed is:

1. A distance measurement device comprising:
    an imaging unit that images a subject;
    a measurement unit that measures a plurality of distances to the subject by emitting a plurality of directional light rays which are light rays each having directivity to the subject and receiving reflection light rays of the directional light rays by corresponding light receiving units;
    a control unit that controls the imaging unit to image the subject in an angle of view which includes irradiation positions of the directional light rays used in the measurement of the plurality of distances by the measurement unit onto the subject; and
    a deriving unit that derives a dimension of a real-space region corresponding to an interval between a plurality of pixels associated with the in-image irradiation positions based on distances which are related to in-image irradiation positions derived as positions corresponding to the irradiation positions within a captured image acquired by imaging the subject by the imaging unit, among the plurality of distances measured by the measurement unit, the interval for each distance within the captured image, and a focal length of the imaging unit,
    wherein the measurement unit includes a plurality of sets each having an emission unit that emits the directional light ray and a light receiving unit that receives a reflection light ray of the directional light ray emitted by the corresponding emission unit,
    wherein an angle at which the directional light ray is emitted is able to be changed for each set of the emission unit and the light receiving unit in a state in which a positional relation between the emission unit and the light receiving unit in each set is fixed, and
    wherein the deriving unit (i) acquires a first correspondence relation between in-provisional-image irradiation positions corresponding to the irradiation positions within a provisional image acquired by provisionally imaging the subject by the imaging unit whenever each of a plurality of distances is provisionally measured by the measurement unit and distances which are provisionally measured by the measurement unit by using the directional light rays corresponding to the in-provisional-image irradiation positions for each set, (ii) derives factors which influence the irradiation positions for each set based on the acquired first correspondence relation, and (iii) derives the in-image irradiation positions for each set based on the derived factors and a distance obtained at an actual measurement by the measurement unit.

2. The distance measurement device according to claim 1, further comprising:
    a performing unit that performs a predetermined process as a process of suppressing a decrease in accuracy of the in-image irradiation position in a case where a distance which is actually measured by the measurement unit is out of a range of a distance specified by the first correspondence relation related to the corresponding set.

3. The distance measurement device according to claim 1, further comprising:
an output unit that derives derivation accuracy corresponding to an actually present factor based on a second correspondence relation between assumption factors assumed as factors influencing the in-image irradiation positions and derivation accuracy derived by the deriving unit, and outputs information based on the derived derivation accuracy.

4. The distance measurement device according to claim 3, wherein different derivation accuracy are associated with different assumption factors in the second correspondence relation, and
the output unit derives the derivation accuracy associated with the assumption factor corresponding to the actually present factor.

5. The distance measurement device according to claim 4, wherein, in a case where the actually present factor is in plural, the output unit derives the derivation accuracy by integrating the derivation accuracy associated with the assumption factors corresponding to the plurality of actually present factors.

6. The distance measurement device according to claim 1, further comprising:
a change unit that is capable of changing an angle at which the directional light ray is emitted,
wherein, in a case where the in-image irradiation position is out of a default range within the captured image, the control unit controls the measurement unit to measure the distance until the in-image irradiation position falls in a default range, and controls the deriving unit to derive the in-image irradiation position based on the distance measured by the measurement unit and the angle changed by the change unit.

7. The distance measurement device according to claim 6, wherein, in a case where the in-image irradiation position is out of the default range, the control unit controls the measurement unit to measure the distance until the in-image irradiation position falls in the default range, controls the change unit to change an angle by driving a power source, and controls the deriving unit to derive the in-image irradiation position based on the distance measured by the measurement unit and the angle changed by the change unit.

8. The distance measurement device according to claim 1, wherein a frame including the in-image irradiation positions is designated for each in-image irradiation position within the captured image,
the plurality of pixels is designated inside the frame for each frame, and
the deriving unit derives the dimension of the real-space region corresponding to an interval between the plurality of designated pixels based on distances related to the corresponding in-image irradiation positions among the plurality of distances measured by the measurement unit, the interval, and the focal length for each frame.

9. The distance measurement device according to claim 1, wherein the subject includes a plurality of planar regions of which at least one of an orientation or a position is different, and
the measurement unit measures distances to the plurality of planar regions by emitting the directional light rays to the plurality of planar regions and receiving reflection lights of the directional light rays emitted to the plurality of planar regions.

10. A distance measurement device comprising:
an imaging unit that images a subject;
a measurement unit that measures a plurality of distances to the subject by emitting directional light rays which are light rays each having directivity to the subject in a plurality of directions through scanning of the subject with the directional light rays and receiving reflection light rays of the directional light rays in the plurality of directions;
a control unit that controls the imaging unit to image the subject in an angle of view which includes irradiation positions of the directional light rays used in the measurement of the plurality of distances by the measurement unit onto the subject; and
a deriving unit that derives a dimension of a real-space region corresponding to an interval between a plurality of pixels associated with the in-image irradiation positions based on distances which are related to in-image irradiation positions derived as positions corresponding to the irradiation positions within a captured image acquired by imaging the subject by the imaging unit, among the plurality of distances measured by the measurement unit, the interval for each distance within the captured image, and a focal length of the imaging unit,
wherein the deriving unit (i) acquires a first correspondence relation between in-provisional-image irradiation positions corresponding to the irradiation positions within a provisional image acquired by provisionally imaging the subject by the imaging unit whenever each of a plurality of distances is provisionally measured by the measurement unit and distances which are provisionally measured by the measurement unit by using the directional light rays corresponding to the in-provisional-image irradiation positions for each direction, (ii) derives factors which influence the irradiation positions for each direction based on the acquired first correspondence relation, and (iii) derives the in-image irradiation positions for each direction based on the derived factors and a distance obtained at an actual measurement by the measurement unit.

11. The distance measurement device according to claim 10, further comprising:
a performing unit that performs a predetermined process as a process of suppressing a decrease in accuracy of the in-image irradiation position in a case where a distance which is actually measured by the measurement unit is out of a range of a distance specified by the first correspondence relation related to the corresponding direction.

12. A distance measurement method comprising:
controlling an imaging unit which images a subject to image the subject in an angle of view which includes irradiation positions of a plurality of directional light rays which are light rays each having directivity used in measurement of a plurality of distances by a measurement unit which measures the plurality of distances to the subject by emitting the directional light rays to the subject and receiving reflection light rays of the directional light rays by corresponding light receiving units, onto the subject, the imaging unit and the measurement unit being included in a distance measurement device; and
deriving a dimension of a real-space region corresponding to an interval between a plurality of pixels associated with the in-image irradiation positions based on distances which are related to in-image irradiation positions derived as positions corresponding to the irradiation positions within a captured image acquired by the imaging unit, among the plurality of distances measured by the measurement unit, the interval for each distance within the captured image, and a focal length of the imaging unit, wherein the measurement unit includes a plurality of sets each having an emission unit that emits the directional light ray and a light receiving unit that receives a reflection light ray of the directional light ray emitted by the corresponding emission unit, wherein an angle at which the directional light ray is emitted is able to be changed for each set of the emission unit and the light receiving unit in a state in which a positional relation between the emission unit and the light receiving unit in each set is fixed, and the method further comprising;

(i) acquiring a first correspondence relation between in-provisional-image irradiation positions corresponding to the irradiation positions within a provisional image acquired by provisionally imaging the subject by the imaging unit whenever each of a plurality of distances is provisionally measured by the measurement unit and distances which are provisionally measured by the measurement unit by using the directional light rays corresponding to the in-provisional-image irradiation positions for each set, (ii) deriving factors which influence the irradiation positions for each set based on the acquired first correspondence relation, and (iii) deriving the in-image irradiation positions for each set based on the derived factors and a distance obtained at an actual measurement by the measurement unit.

13. A distance measurement method comprising:

controlling an imaging unit which images a subject to image the subject in an angle of view which includes irradiation positions of a plurality of directional light rays which are light rays each having directivity used in measurement of a plurality of distances by a measurement unit which measures the plurality of distances to the subject by emitting the directional light rays to the subject and receiving reflection light rays of the directional light rays by corresponding light receiving units, onto the subject, the imaging unit and the measurement unit being included in a distance measurement device; and deriving a dimension of a real-space region corresponding to an interval between a plurality of pixels associated with the in-image irradiation positions based on distances which are related to in-image irradiation positions derived as positions corresponding to the irradiation positions within a captured image acquired by imaging the subject by the imaging unit, among the plurality of distances measured by the measurement unit, the interval for each distance within the captured image, and a focal length of the imaging unit, and the method further comprising;

(i) acquiring a first correspondence relation between in-provisional-image irradiation positions corresponding to the irradiation positions within a provisional image acquired by provisionally imaging the subject by the imaging unit whenever each of a plurality of distances is provisionally measured by the measurement unit and distances which are provisionally measured by the measurement unit by using the directional light rays corresponding to the in-provisional-image irradiation positions for each direction, (ii) deriving factors which influence the irradiation positions for each direction based on the acquired first correspondence relation, and (iii) deriving the in-image irradiation positions for each direction based on the derived factors and a distance obtained at an actual measurement by the measurement unit.

14. A non-transitory computer readable medium storing a program that causes a computer to execute a process for a distance measurement, the process comprising:

controlling an imaging unit which images a subject to image the subject in an angle of view which includes irradiation positions of a plurality of directional light rays which are light rays each having directivity used in measurement of a plurality of distances by a measurement unit which measures the plurality of distances to the subject by emitting the directional light rays to the subject and receiving reflection light rays of the directional light rays by corresponding light receiving units, onto the subject, the imaging unit and the measurement unit being included in a distance measurement device; and deriving a dimension of a real-space region corresponding to an interval between a plurality of pixels associated with the in-image irradiation positions based on distances which are related to in-image irradiation positions derived as positions corresponding to the irradiation positions within a captured image acquired by imaging the subject by the imaging unit, among the plurality of distances measured by the measurement unit, the interval for each distance within the captured image, and a focal length of the imaging unit, wherein the measurement unit includes a plurality of sets each having an emission unit that emits the directional light ray and a light receiving unit that receives a reflection light ray of the directional light ray emitted by the corresponding emission unit, wherein an angle at which the directional light ray is emitted is able to be changed for each set of the emission unit and the light receiving unit in a state in which a positional relation between the emission unit and the light receiving unit in each set is fixed, and the process further comprising;

(i) acquiring a first correspondence relation between in-provisional-image irradiation positions corresponding to the irradiation positions within a provisional image acquired by provisionally imaging the subject by the imaging unit whenever each of a plurality of distances is provisionally measured by the measurement unit and distances which are provisionally measured by the measurement unit by using the directional light rays corresponding to the in-provisional-image irradiation positions for each set, (ii) deriving factors which influence the irradiation positions based on the acquired first correspondence relation for each set, and (iii) deriving the in-image irradiation positions for each set based on the derived factors and a distance obtained at an actual measurement by the measurement unit.

15. A non-transitory computer readable medium storing a program that causes a computer to execute a process for a distance measurement, the process comprising:

controlling an imaging unit which images a subject to image the subject in an angle of view which includes irradiation positions of a plurality of directional light rays which are light rays each having directivity used in measurement of a plurality of distances by a measurement unit which measures the plurality of distances to the subject by emitting the directional light rays to the subject and receiving reflection light rays of the directional light rays by corresponding light receiving units, onto the subject, the imaging unit and the measurement unit being included in a distance measurement device; and deriving a dimension of a real-space region corresponding to an interval between a plurality of pixels associated with the in-image irradiation positions based on distances which are related to in-image irradiation positions derived as positions corresponding to the irradiation positions within a captured image acquired by imaging the subject by the imaging unit, among the plurality of distances measured by the measurement unit, the interval for each distance within the captured image, and a focal length of the imaging unit, and the process further comprising;

(i) acquiring a first correspondence relation between in-provisional-image irradiation positions corresponding to the irradiation positions within a provisional image acquired by provisionally imaging the subject by the imaging unit whenever each of a plurality of distances is provisionally measured by the measurement unit and distances which are provisionally measured by the measurement unit by using the directional light rays corresponding to the in-provisional-image irradiation positions for each direction, (ii) deriving factors which influence the irradiation positions for each direction based on the acquired first correspondence relation, and (iii) deriving the in-image irradiation positions for each direction based on the derived factors and a distance obtained at an actual measurement by the measurement unit.

* * * * *